US009377533B2

(12) United States Patent
Smits

(10) Patent No.: US 9,377,533 B2
(45) Date of Patent: Jun. 28, 2016

(54) THREE-DIMENSIONAL TRIANGULATION AND TIME-OF-FLIGHT BASED TRACKING SYSTEMS AND METHODS

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 14/823,668

(22) Filed: Aug. 11, 2015

(65) Prior Publication Data

US 2016/0041266 A1 Feb. 11, 2016

Related U.S. Application Data

(60) Provisional application No. 62/070,011, filed on Aug. 11, 2014.

(51) Int. Cl.
*G01S 3/08* (2006.01)
*G01S 17/66* (2006.01)
*G01S 17/10* (2006.01)
(Continued)

(52) U.S. Cl.
CPC ............... *G01S 17/66* (2013.01); *G01S 7/4815* (2013.01); *G01S 7/4817* (2013.01); *G01S 7/4863* (2013.01); *G01S 17/10* (2013.01); *G01S 17/42* (2013.01); *G01S 17/48* (2013.01); *G01S 7/497* (2013.01)

(58) Field of Classification Search
CPC .......... G01S 17/66; G01S 7/481; G01S 17/06
See application file for complete search history.

(56) References Cited

U.S. PATENT DOCUMENTS 4,019,262 A 4/1977 Breglia et al.
4,340,274 A 7/1982 Spooner
(Continued)

FOREIGN PATENT DOCUMENTS

EP 0722109 A1 7/1996
JP 11119184 A 4/1999
(Continued)

OTHER PUBLICATIONS

International Search Report and Written Opinion for PCT/US2015/044691 mailed on Nov. 18, 2015, 12 pages.
(Continued)

*Primary Examiner* — Luke Ratcliffe
*Assistant Examiner* — Samantha K Abraham
(74) *Attorney, Agent, or Firm* — John W. Branch; Lowe Graham Jones PLLC

(57) ABSTRACT

A three-dimension position tracking system is presented. The system includes transmitters and receivers. A transmitter scans continuous or pulsed coherent light beams across a target. The receiver detects the reflected beams. The system recursively determines the location of the target, as a function of time, via triangulation and observation of the time-of-flight of the incoming and outgoing beams. The transmitter includes ultra-fast scanning optics to scan the receiver's field-of-view. The receiver includes arrays of ultra-fast photosensitive pixels. The system determines the angles of the incoming beams based on the line-of-sight of the triggered pixels. By observing the incoming angles and correlating timestamps associated with the outgoing and incoming beams, the system accurately, and in near real-time, determines the location of the target. By combining the geometry of the scattered beams, as well as the beams' time-of-flight, ambiguities inherent to triangulation and ambiguities inherent to time-of-flight location methods are resolved.

24 Claims, 21 Drawing Sheets

(51) Int. Cl.

| | |
|---|---|
| ***G01S 17/42*** | (2006.01) |
| ***G01S 17/48*** | (2006.01) |
| ***G01S 7/481*** | (2006.01) |
| ***G01S 7/486*** | (2006.01) |
| *G01S 7/497* | (2006.01) |

(56) References Cited

U.S. PATENT DOCUMENTS

| | | | | |
|---|---|---|---|---|
| 5,052,820 | A | 10/1991 | McGinniss et al. | |
| 5,107,122 | A | 4/1992 | Barkan et al. | |
| 5,115,230 | A | 5/1992 | Smoot | |
| 5,521,722 | A | 5/1996 | Colvill et al. | |
| 5,559,322 | A | 9/1996 | Jacoby et al. | |
| 5,572,251 | A | 11/1996 | Ogawa | |
| 5,580,140 | A | 12/1996 | Katz et al. | |
| 5,661,506 | A | 8/1997 | Lazzouni et al. | |
| 5,812,664 | A | 9/1998 | Bernobich et al. | |
| 5,914,783 | A | 6/1999 | Barrus | |
| 6,115,022 | A | 9/2000 | Mayer, III et al. | |
| 6,195,446 | B1 | 2/2001 | Skoog | |
| 6,404,416 | B1 | 6/2002 | Kahn et al. | |
| 6,545,670 | B1 | 4/2003 | Pryor | |
| 6,670,603 | B2 | 12/2003 | Shimada et al. | |
| 6,704,000 | B2 | 3/2004 | Carpenter | |
| 6,710,767 | B1 | 3/2004 | Hasegawa et al. | |
| 6,766,066 | B2 | 7/2004 | Kitazawa | |
| 6,982,683 | B2 | 1/2006 | Stanton | |
| 7,119,965 | B1 | 10/2006 | Rolland et al. | |
| 7,144,117 | B2 | 12/2006 | Kojima | |
| 7,182,465 | B2 | 2/2007 | Fuchs et al. | |
| 7,232,229 | B2 | 6/2007 | Peeters et al. | |
| 7,262,765 | B2 | 8/2007 | Brown et al. | |
| 7,289,110 | B2 | 10/2007 | Hansson | |
| 7,303,289 | B2 | 12/2007 | Fujiwara | |
| 7,511,847 | B2 | 3/2009 | Silverbrook et al. | |
| 7,787,134 | B2* | 8/2010 | Kohnen | G01B 11/14 356/3.1 |
| 7,911,444 | B2 | 3/2011 | Yee | |
| 8,170,329 | B2 | 5/2012 | Seko et al. | |
| 8,282,222 | B2 | 10/2012 | Smits | |
| 8,297,758 | B2 | 10/2012 | Choi et al. | |
| 8,430,512 | B2 | 4/2013 | Smits | |
| 8,493,573 | B2 | 7/2013 | Chinn et al. | |
| 8,573,783 | B2 | 11/2013 | Smits | |
| 8,773,512 | B1 | 7/2014 | Rafii | |
| 2001/0043165 | A1 | 11/2001 | Stanton | |
| 2002/0067466 | A1 | 6/2002 | Covannon et al. | |
| 2003/0010888 | A1 | 1/2003 | Shimada et al. | |
| 2003/0045034 | A1 | 3/2003 | Davis et al. | |
| 2003/0156260 | A1 | 8/2003 | Putilin et al. | |
| 2003/0202234 | A1 | 10/2003 | Taylor et al. | |
| 2003/0202679 | A1 | 10/2003 | Rodriguez | |
| 2003/0214710 | A1 | 11/2003 | Takahashi et al. | |
| 2003/0222849 | A1 | 12/2003 | Starkweather | |
| 2004/0006424 | A1* | 1/2004 | Joyce | G01S 5/0027 701/408 |
| 2004/0054359 | A1 | 3/2004 | Ruiz et al. | |
| 2004/0114834 | A1 | 6/2004 | Fisher | |
| 2004/0218155 | A1 | 11/2004 | Schenk et al. | |
| 2005/0035943 | A1 | 2/2005 | Kojima | |
| 2005/0052635 | A1 | 3/2005 | Xie et al. | |
| 2005/0099664 | A1 | 5/2005 | Yamaoka | |
| 2005/0195387 | A1 | 9/2005 | Zhang et al. | |
| 2005/0219530 | A1 | 10/2005 | Horibe et al. | |
| 2005/0273830 | A1 | 12/2005 | Silver et al. | |
| 2006/0028374 | A1* | 2/2006 | Fullerton | F41G 5/08 345/67 |
| 2006/0028622 | A1 | 2/2006 | Nojima et al. | |
| 2006/0132447 | A1 | 6/2006 | Conrad | |
| 2006/0132472 | A1 | 6/2006 | Peeters et al. | |
| 2006/0132729 | A1 | 6/2006 | Engle | |
| 2007/0138371 | A1* | 6/2007 | Marshall | G01S 7/4812 250/201.3 |
| 2007/0273610 | A1 | 11/2007 | Baillot | |
| 2008/0266169 | A1 | 10/2008 | Akita | |
| 2008/0291213 | A1 | 11/2008 | Bhogal | |
| 2008/0317077 | A1 | 12/2008 | Hoving et al. | |
| 2009/0096994 | A1 | 4/2009 | Smits | |
| 2009/0147239 | A1 | 6/2009 | Zhu et al. | |
| 2009/0285590 | A1 | 11/2009 | Orsley | |
| 2010/0002154 | A1 | 1/2010 | Hua | |
| 2010/0142856 | A1 | 6/2010 | Takeuchi et al. | |
| 2011/0211243 | A1 | 9/2011 | Smits | |
| 2012/0017147 | A1 | 1/2012 | Mark | |
| 2012/0132713 | A1 | 5/2012 | Chaum | |
| 2012/0140231 | A1 | 6/2012 | Knox et al. | |
| 2012/0187296 | A1 | 7/2012 | Hollander et al. | |
| 2012/0250152 | A1 | 10/2012 | Larson et al. | |
| 2013/0021271 | A1 | 1/2013 | Guo | |
| 2013/0088465 | A1 | 4/2013 | Geller et al. | |
| 2013/0176561 | A1 | 7/2013 | Hidaka | |
| 2013/0229669 | A1 | 9/2013 | Smits | |
| 2013/0239057 | A1 | 9/2013 | Ubillos et al. | |
| 2013/0300637 | A1 | 11/2013 | Smits et al. | |
| 2013/0300670 | A1 | 11/2013 | Besperstov et al. | |
| 2013/0342813 | A1 | 12/2013 | Wang | |
| 2014/0215841 | A1 | 8/2014 | Danbury et al. | |
| 2014/0267620 | A1* | 9/2014 | Bridges | G01S 17/003 348/46 |
| 2014/0273752 | A1* | 9/2014 | Bajaj | B24B 37/042 451/6 |
| 2015/0066196 | A1 | 3/2015 | Wooldridge et al. | |
| 2015/0091815 | A1 | 4/2015 | Michaelis | |

FOREIGN PATENT DOCUMENTS

| | | | |
|---|---|---|---|
| JP | 2003029201 | A | 1/2003 |
| JP | 2004132914 | A | 4/2004 |
| JP | 2011197674 | A | 10/2011 |
| WO | 92/18971 | A1 | 10/1992 |
| WO | 00/34818 | A1 | 6/2000 |
| WO | 2006/063577 | A1 | 6/2006 |
| WO | 2009/049272 | A2 | 4/2009 |
| WO | 2011/109402 | A2 | 9/2011 |
| WO | 2012/054231 | A2 | 4/2012 |

OTHER PUBLICATIONS

Savage, P., "GDC 2013: Valy's Michael Abrash on the challenges of VR—'a new world is emerging'," PCGamer, Apr. 2, 2013, 6 pages.

European Search Report for European Patent Application No. 08837063.0 mailed Nov. 19, 2010.

Communication Pursuant to Article 94(3) EPC in European Patent Application No. 08837063.0 mailed Dec. 27, 2011.

Communication Pursuant to Article 94(3) EPC in European Patent Application No. 08837063.0 mailed Oct. 22, 2012.

International Search Report and Written Opinion in International Patent Application No. PCT/US2008/079663 mailed Apr. 30, 2009.

International Search Report and Written Opinion in International Patent Application No. PCT/US2011/026691 mailed Oct. 24, 2011.

International Search Report in International Patent Application No. PCT/US2011/054751 mailed Jan. 30, 2012.

International Preliminary Report on Patentability in International Patent Application No. PCT/US2008/079663 mailed Jan. 25, 2010.

International Preliminary Report on Patentability issued in PCT/US2011/026691 on Sep. 4, 2012.

International Preliminary Report on Patentability issued in PCT/US2011/054751 on Apr. 9, 2013.

Official Communication for U.S. Appl. No. 12/249,899 mailed Sep. 14, 2011.

Official Communication for U.S. Appl. No. 12/249,899 mailed Mar. 13, 2012.

Official Communication for U.S. Appl. No. 12/249,899 mailed Jun. 6, 2012.

Official Communication for U.S. Appl. No. 13/037,949 mailed Nov. 2, 2012.

Official Communication for U.S. Appl. No. 13/037,949 mailed Aug. 26, 2013.

Official Communication for U.S. Appl. No. 13/605,948 mailed Dec. 31, 2012.

(56) References Cited

OTHER PUBLICATIONS

Official Communication for U.S. Appl. No. 13/858,762 mailed Sep. 13, 2013.
Official Communication for U.S. Appl. No. 13/877,652 mailed Mar. 12, 2015.
Official Communication for U.S. Appl. No. 14/046,374 mailed Feb. 20, 2014.
European Supplementary Search Report for European Patent Application No. 11834848.1 mailed Feb. 21, 2014.
Official Communication for U.S. Appl. No. 13/858,762 mailed Jan. 31, 2014.
Official Communication for U.S. Appl. No. 14/048,954 mailed Feb. 26, 2014.
Official Communication for U.S. Appl. No. 14/048,954 mailed Oct. 22, 2014.
International Search Report and Written Opinion for application PCT/US2015/023184 mailed Jun. 29, 2015.
Official Communication for U.S. Appl. No. 13/877,652 mailed Aug. 18, 2015.
Official Communication for Application 14,636,062 mailed on Sep. 25, 2015.
Official Communication for U.S. Appl. No. 14/671,904 mailed Sep. 22, 2015.
Official Communication for U.S. Appl. No. 14/636,062 mailed on Jun. 2, 2015.

* cited by examiner

THREE-DIMENSIONAL TRIANGULATION AND TIME-OF-FLIGHT BASED TRACKING SYSTEMS AND METHODS

CROSS-REFERENCE TO RELATED APPLICATIONS

This application is a Utility Patent application based on a previously filed U.S. Provisional Patent Application U.S. Ser. No. 62/070,011 filed on Aug. 11, 2014, the benefit of the filing date of which is hereby claimed under 35 U.S.C. §119(e) and which is further incorporated by reference in its entirety.

TECHNICAL FIELD

The present invention relates generally to three-dimensional tracking systems, and more particularly, but not exclusively, to employing collimated light beam transmitters and receivers to determine the location of a target in real-time via triangulation and time-of-flight (ToF) methods.

BACKGROUND

Tracking systems may be employed to track the position and/or trajectory of a remote object, such as an aircraft, missile, a baseball, a vehicle, and the like. The tracking may be performed based on the detection of photons, or other signals, emitted by the target of interest. Some tracking systems illuminate the target with electromagnetic waves, or light beams, emitted by the tracking system. These systems detect a portion of the light beams that are reflected, or scattered, by the target. A detection of the reflected light beam indicates that the transmitted beam hits a target. It is with respect to these and other considerations that the present disclosure is provided.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
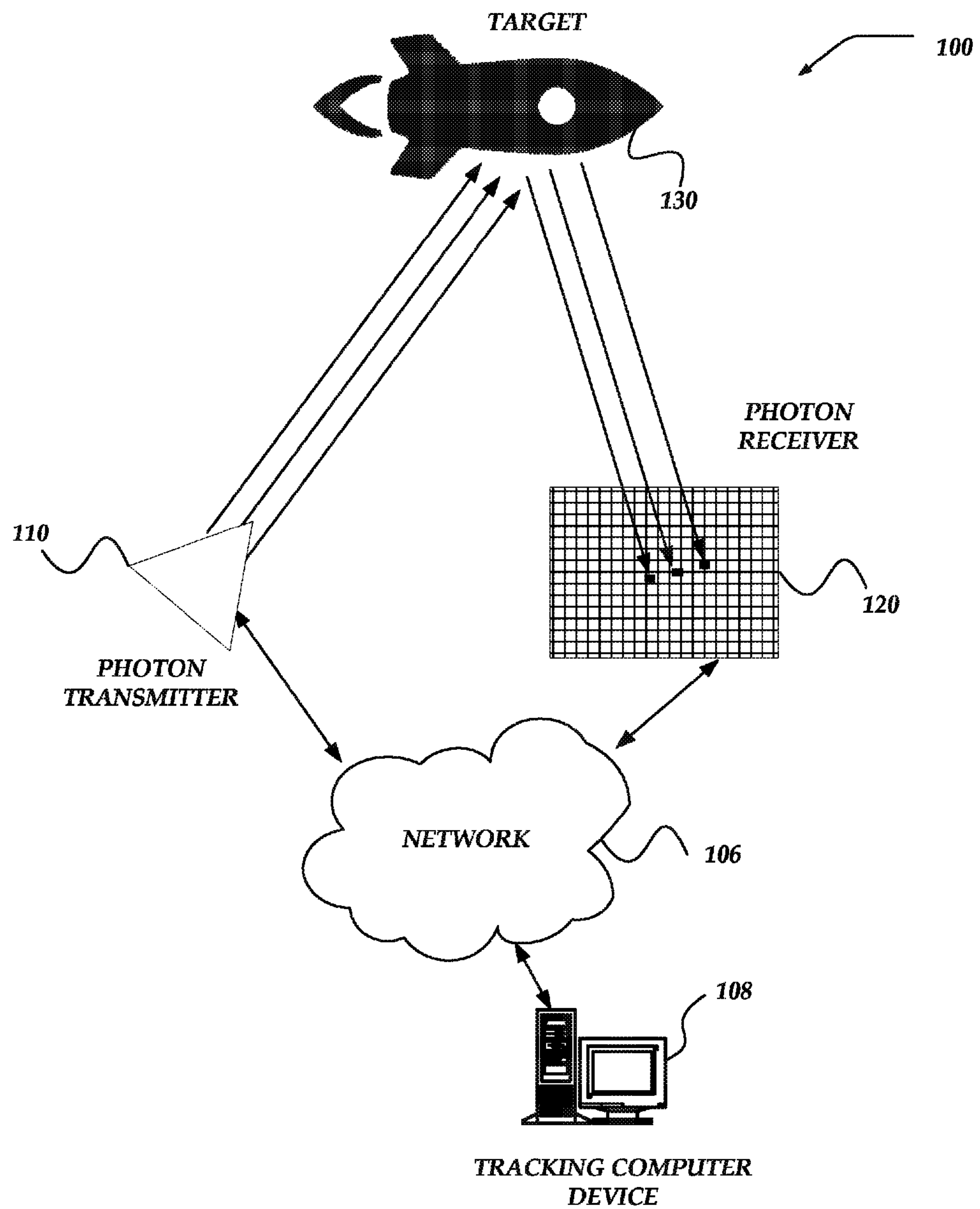
FIG. 1 is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of"a," "an," and "the" include plural references. The meaning of "in" includes "in" and "on."

As used herein, the terms "photon beam," "light beam," "electromagnetic beam," or "beam" refer to a somewhat localized (in time and space) beam or bundle of photons or electromagnetic (EM) waves of any frequency or wavelength within the EM spectrum. An outgoing light beam is a beam that is transmitted by any of the various embodiments disclosed herein. An incoming light beam is a beam that is detected by and of the various embodiments disclosed herein.

As used herein, the terms "light source," "photon source," or "source" refer to any device that is capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or any other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of any wavelength or frequency.

As used herein, the terms "photon detector," "light detector," or "detector" refer to any device that is sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of at least one photon. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include any photon-sensitive technology, such as active-pixel sensors (APS), charge-coupled devices (CCDs), Single Photon Avalanche Detector (SPAD) (operated in avalanche mode), photovoltaic cells, phototransistors, and the like. A photon detector may detect one or more incoming light beams.

As used herein, the term "target" is any 2D or 3D body that reflects or scatters at least a portion of incident light, EM waves, or photons. For instance, a target may scatter or reflect an outgoing light beam that is transmitted by any of the various embodiments disclosed herein.

Briefly stated, various embodiments of systems and methods for tracking a remote target are disclosed herein. Tracking a target may include determining a distance of the target, i.e. how far away the target is from the tracking system. The distance may be a range of the target. In some embodiments, tracking the target includes determining a precision location of the target. A proximate location of the target may be determined based on the location or the velocity of the target. Successive determinations of the proximate location, via recursion and/or iterations based on data provided by the tracking system, quickly and accurately converges on the precision location of the target.

The various embodiments employ one or more transmitters that illuminate the target with an outgoing light beam, i.e. an outgoing light beam. One or more receivers are employed to detect a portion of the outgoing light that is reflected, or scattered, from the target. The embodiments track the target by employing triangulation methods, time-of-flight (ToF) methods, or a combination thereof. Essentially, the embodiments determine the location of the target based on predetermined geometries and optical configurations of the one or more transmitters and receivers, observed angles between the transmitted and detected beams, and a time delay between the transmission and detection of the beams. Such embodiments provide a precision determination of the location of the target in real-time or near real-time, as well as other target-related information, such as the target's expected trajectory, size, and three-dimensional shape.

Tracking a target may include determining a distance of the target, i.e. how far away the target is from the tracking system. The distance may be a range of the target. In at least one embodiment, tracking a target includes determining two-dimensional (2D tracking) or three-dimensional (3D tracking) coordinates for one or more points on the target. The coordinates may be expressed in Cartesian, polar, cylindrical, spherical, or any other appropriate coordinate system. In at least one embodiment, tracking includes determining the location of the target at a plurality of times, i.e. a trajectory of the target is determined as a function of time.

Various embodiments of transmitters include a bright light source, such as a laser or a light-emitting diode (LED). Optical systems within the transmitters may collimate a light beam in one or more directions transverse to the direction of transmission. For instance, collimating the light beam in two orthogonal directions that are each orthogonal to the direction of transmission generates a "pencil" or "fine-tipped" light beam. In some embodiments, a light beam is collimated in one direction that is orthogonal to the transmission direction, but is fanned-out in another direction that is orthogonal to both the collimated and the transmission direction, resulting in a "light blade" characterized by an opening angle.

The optical systems of the transmitter enable a scanning of the outgoing light beam across one or two angular dimensions to define a field-of-scanning (FoS) of the transmitter. As such, the transmitters may scan 2D or 3D targets located within the transmitters' FoS. One or more feedback loops in the optical systems of the transmitter provide precision determinations of the angular position of the scanning beam within the transmitter's FOS, as a function of time. Thus, the outgoing angles of the outgoing light beams may be determined via these position feedback loops.

Various embodiments of a receiver include one or more light detectors. The light detectors may include one or more arrays of photon-sensitive pixels. In preferred embodiments, the arrays include single-photon avalanche diode (SPAD) pixels or other pixels that are operative to detect a single photon, such as avalanche photodiodes (APD) operated in Geiger-mode. By scanning the target, the incoming light beam (that has bene reflected from the target) sequentially illuminates pixels (or scan lines) of the receiver. The incoming angles of incoming light beams are determined based on the line-of-sight of the illuminated pixels with the field-of-view (FoV) of the receiver. At a sufficient distance from the transmitter/receiver pair (compared to the offset distance between the transmitter and receiver), a significant overlap between the FoS and FoV exists. Transmitting of the outgoing light beams and detecting of the incoming light beams may be performed at substantially the same location. The transmitter may be co-located with the receiver. In some embodiments, at least one the transmitter or the receiver is a transceiver that is operative to both transmit and detect light beams.

The target may be tracked by triangulating the target. A triangulation value may be determined based on at least one of the angles of the incoming light beams, the angles of the outgoing light beams, or the distance between the transmitter/receiver pair. A triangulation value may include at least a proximate or a precision distance (a range) between the target and the transmitter/receiver pair. In at least one embodiment, the triangulation value includes proximate or precision coordinates of one or more points located on the target.

In at least one embodiment, stereoscopic pairs of receivers are employed. In such embodiments, the target may be triangulated based on the two (or more) incoming angles of two (or more) incoming light beams detected at two receivers and the distance between the two receivers. Each of the two incoming light beams may correspond to the same outgoing light beam that is reflected from the target. Such embodiments obviate the need for knowledge of the angles of the outgoing light beams. Accordingly, the design of the system is simplified because the position feedback loops to determine the angular position of the outgoing light beam are not required.

In some embodiments, for instance, when the target distance is sufficient (or the offset distance between a transmitter/receiver pair is insufficient for a given the target distance), a ToF corresponding to the transmittance and detection of the incoming/outgoing light beams is used to track the target. In some embodiments, a determination of the location of the target is based on both the triangulation value and the ToF time interval corresponding to the outgoing and incoming light beams. In some embodiments, triangulation is employed to track a short-ranged target (short-range mode), ToF is employed to track a long-range target (long-range mode), and a combination of triangulation and ToF is employed to track a medium-ranged target (medium-range mode).

The same hardware configurations disclosed herein may perform both triangulation-based tracking and ToF-based tracking. Real-time data streams are combined, such that the various embodiments, track the target based on the relative geometry/positioning of the transmitter, the receiver, and the target, as well as the time interval corresponding to the lag between the transmittance of the outgoing light beam and the detection of the incoming light beam upon reflection from the target. Additionally, the various embodiments enable a determination of the location of the target, as a function of time, as well an increased three-dimensional tracking accuracy over a greater FoV, with high acquisition rates and low computational latencies.

The location of the target may be determined by employing recursive feedback between the triangulation-based and the ToF-based location determinations, i.e. successive determinations of a series of proximate locations with increasing accuracy that converge on a precision location of the target. For instance, ambiguities associated with triangulation-based determinations (triangulation values) are resolved using ToF-related data (time intervals). Similarly, ambiguities associated with ToF-based determinations (time intervals) are resolved using triangulation-related data (triangulation values). Triangulation may be used to determine the angular location of the target within the FoV, while ToF is used to determine the absolute target distance. The incoming angles of the incoming light beams may be combined with the estimated trajectory of the target to reduce ToF ambiguities. The trajectory may be estimated via previous successive illuminating scans of the target.

Multiple transmitters may transmit multiple outgoing light beams to scan the target with different wavelengths. The multiple outgoing light beams may be trailing beams. For instance, a first outgoing light beam may be an active trigger beam, that when reflected back from the target, triggers the transmission of one or more additional outgoing light beams.

The various embodiments may be deployed within any application where tracking short-ranged, medium-ranged, or long-ranged targets is desired. For instance, the various embodiments may be deployed in vehicle applications. Such embodiments enable detecting an oncoming vehicle or other object that is on a trajectory that may collide with another vehicle. Detecting such an object, prior to a collision, enables mitigation or avoidance of the collision. A system may be included in a vehicle. In other embodiments, a stationary system may simultaneously track multiple moving vehicles.

The embodiments may also be employed to track missiles, satellites, or other objects within the sky. The embodiments may be deployed in spaced-based environments, such as satellites, or deep-space probes to track stars, planets, or other astronomical bodies. The embodiments may include telescopic optical systems and/or may be deployed in terrestrial or spaced-based observatories.

Illustrated Operating Environment

FIG. 1 shows components of one embodiment of an environment in which various embodiments of the invention may be practiced. Not all of the components may be required to practice the invention, and variations in the arrangement and type of the components may be made without departing from the spirit or scope of the invention. As shown, system 100 of FIG. 1 includes network 106, photon transmitter 110, photon receiver 120, target 130, and tracking computer device 108. Target 130 may be a three-dimensional target. Target 130 is not an idealized black body, i.e. it reflects or scatters at least a portion of incident photons. In various embodiments, target 130 is translating relative to photon transmitter 110 and/or photon receiver 120.

Photon transmitter 110 is described in more detail below. Briefly, however, photon transmitter 110 may include one or more photon sources for transmitting light or photon beams. A photon source may provide continuous or pulsed light beams of a predetermined frequency, or range of frequencies. The provided light beams may be coherent light beams. A photon source may be a laser. Photon transmitter 110 also includes an optical system that includes optical components to direct, focus, and scan the transmitted, or outgoing light beams. The optical systems aim and shape the spatial and temporal beam profiles of outgoing light beams. The optical system may collimate, fan-out, or otherwise manipulate the outgoing light beams. At least a portion of the outgoing light beams are aimed at and are reflected by the target 130. In at least one embodiment, photon transmitter 110 includes one or more photon detectors for detecting incoming photons reflected from target 130, i.e. transmitter 110 is a transceiver.

Photon receiver 120 is described in more detail below. Briefly, however, photon receiver 120 may include one or more photon-sensitive, or photon-detecting, arrays of pixels. An array of pixels detects continuous or pulsed light beams reflected from target 130. The array of pixels may be a one dimensional-array or a two-dimensional array. The pixels may include SPAD pixels or other photo-sensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by photon transmitter 110 and relatively insensitive to other frequencies. Photon receiver 120 also includes an optical system that includes optical components to direct, focus, and scan the received, or incoming, beams, across the array of pixels. In at least one embodiment, photon receiver 120 includes one or more photon sources for emitting photons toward the target 130, i.e. receiver 120 is a transceiver.

One embodiment of tracking computer device 108 is described in more detail below in conjunction with FIG. 2, i.e. tracking computer device 108 may be an embodiment of network computer 200 of FIG. 2. Briefly, however, tracking computer device 108 includes virtually any network device capable of determining tracking target 130 based on the detection of photons reflected from one or more surfaces of target 130, as described herein. Based on the detected photons or light beams, tracking computer device 108 may alter or otherwise modify one or more configurations of photon transmitter 110 and photon receiver 120. It should be understood that the functionality of tracking computer device 108 may be performed by photon transmitter 110, photon receiver 120, or a combination thereof, without communicating to a separate device.

Network 106 may be configured to couple network computers with other computing devices, including photon transmitter 110, photon receiver 120, and tracking computer device 108. Network 106 may include virtually any wired and/or wireless technology for communicating with a remote device, such as, but not limited to, USB cable, Bluetooth, Wi-Fi, or the like. In some embodiments, network 106 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computer 103-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between photon transmitter 110, photon receiver 120, and tracking computer device 108, as well as other computing devices not illustrated.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Network Computer

Figure 2:
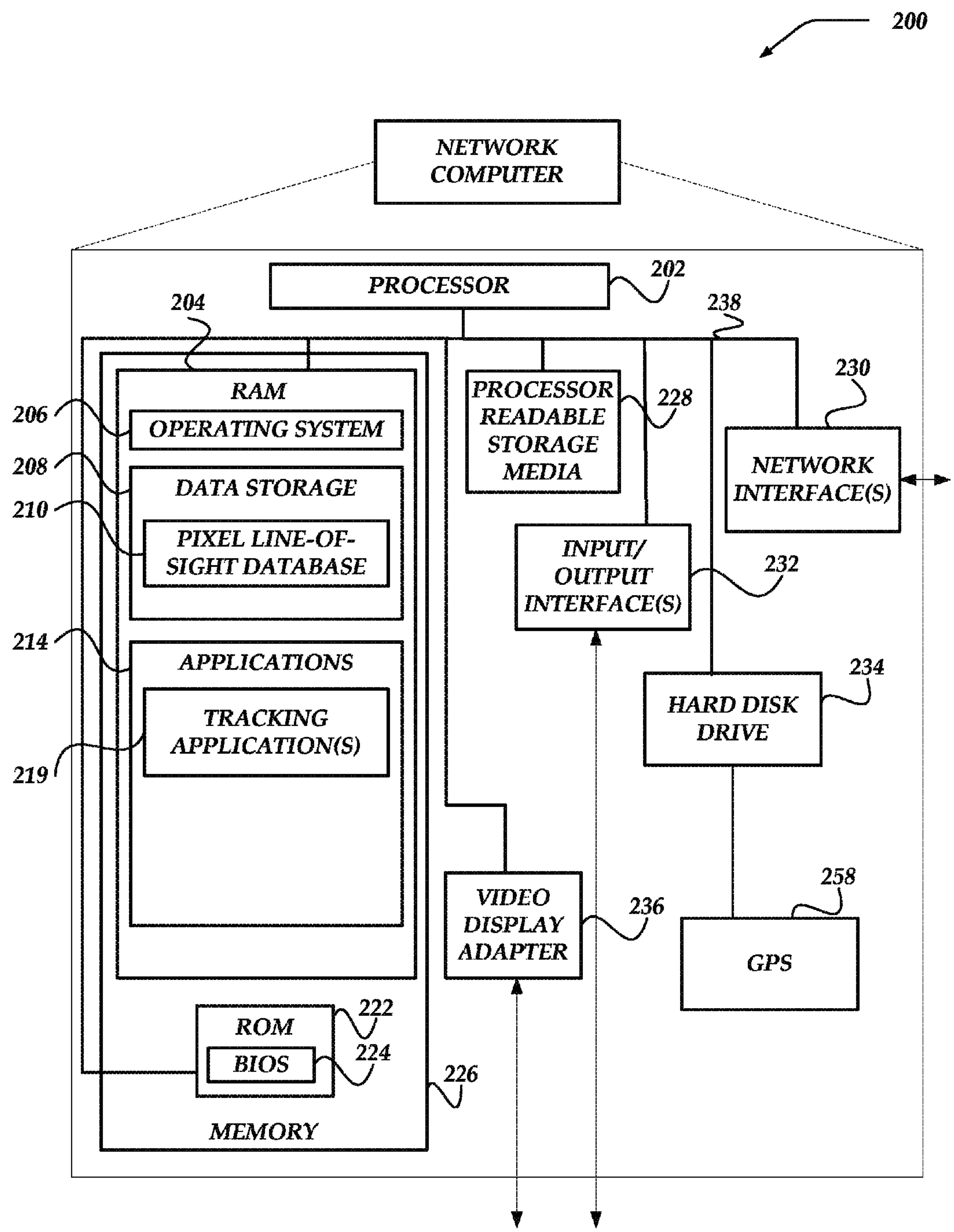
FIG. 2 shows an embodiment of a network computer that may be included in a system such as that shown in FIG. 1.

FIG. 2 shows one embodiment of a network computer 200, according to one embodiment of the invention. Network computer 200 may include many more or less components than those shown. The components shown, however, are sufficient to disclose an illustrative embodiment for practicing the invention. Network computer 200 may be configured to operate as a server, client, peer, a host, or any other device. Network computer 200 may represent, for example tracking computer device 108 of FIG. 1, and/or other network devices.

Network computer 200 includes processor 202, processor readable storage media 228, network interface unit 230, an input/output interface 232, hard disk drive 234, video display adapter 236, and memory 226, all in communication with each other via bus 238. In some embodiments, processor 202 may include one or more central processing units.

As illustrated in FIG. 2, network computer 200 also can communicate with the Internet, or some other communications network, via network interface unit 230, which is constructed for use with various communication protocols including the TCP/IP protocol. Network interface unit 230 is sometimes known as a transceiver, transceiving device, or network interface card (NIC).

Network computer 200 also comprises input/output interface 232 for communicating with external devices, such as a keyboard, or other input or output devices not shown in FIG. 2. Input/output interface 232 can utilize one or more communication technologies, such as USB, infrared, Bluetooth™, or the like.

Memory 226 generally includes RAM 204, ROM 222 and one or more permanent mass storage devices, such as hard disk drive 234, tape drive, optical drive, and/or floppy disk drive. Memory 226 stores operating system 206 for controlling the operation of network computer 200. Any general-purpose operating system may be employed. Basic input/output system (BIOS) 224 is also provided for controlling the low-level operation of network computer 200.

Although illustrated separately, memory 226 may include processor readable storage media 228. Processor readable storage media 228 may be referred to and/or include computer readable media, computer readable storage media, and/or processor readable storage device. Processor readable storage media 228 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 226 further includes one or more data storage 208, which can be utilized by network computer 200 to store, among other things, applications 214 and/or other data. Data storage 208 may be employed to pixel line-of-sight (LoS) database 210. Pixel LoS database 210 may include lookup tables that map each photo-sensitive pixel in the one or more receivers to a range of angles (a range in both the azimuth and the elevation angles) in the receiver's field-of-view (FoV). A receiver may provide the network computer device 200, one or more triggered pixels and corresponding incoming timestamps. Accordingly, the look-up tables in pixel LoS database 210 may be consulted to determine the incoming angles of the detected light beams at the receiver.

Data storage 208 may further include program code, data, algorithms, and the like, for use by a processor, such as processor 202 to execute and perform actions. In one embodiment, at least some of data store 208 might also be stored on another component of network computer 200, including, but not limited to, processor-readable storage media 228, hard disk drive 234, or the like.

Applications 214 may include computer executable instructions, which may be loaded into mass memory and run on operating system 206. Applications 214 may include tracking application(s) 219. Tracking application(s) 219 may be operative to perform any of the methods, determinations, and the like disclosed herein. Via a communication network, tracking application(s) 219 may coordinate, monitor, and manage the activities of transmitters and receivers, such as transmitting and detecting light beams, scanning frequencies and directions, updating in real time the FoS of transmitters and the FoV of receivers, generating outgoing and incoming timestamps, correlating outgoing and incoming light beams, detecting trigger events, and the like. At least some of these functions may be embedded in one or more transmitters or receivers, such that the receivers or transmitters are somewhat autonomous.

GPS transceiver 258 can determine the physical coordinates of the systems, transmitters, receivers, network computer device 200, and the like on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of transmitters and receivers on the surface of the Earth. It is understood that under different conditions, GPS transceiver 258 can determine a physical location for network computer device 200. In at least one embodiment, however, network computer device 200 may, through other components, provide other information that may be employed to determine a physical location of the systems, including for example, a Media Access Control (MAC) address, IP address, and the like.

Illustrative Local System Architecture

Figure 3:
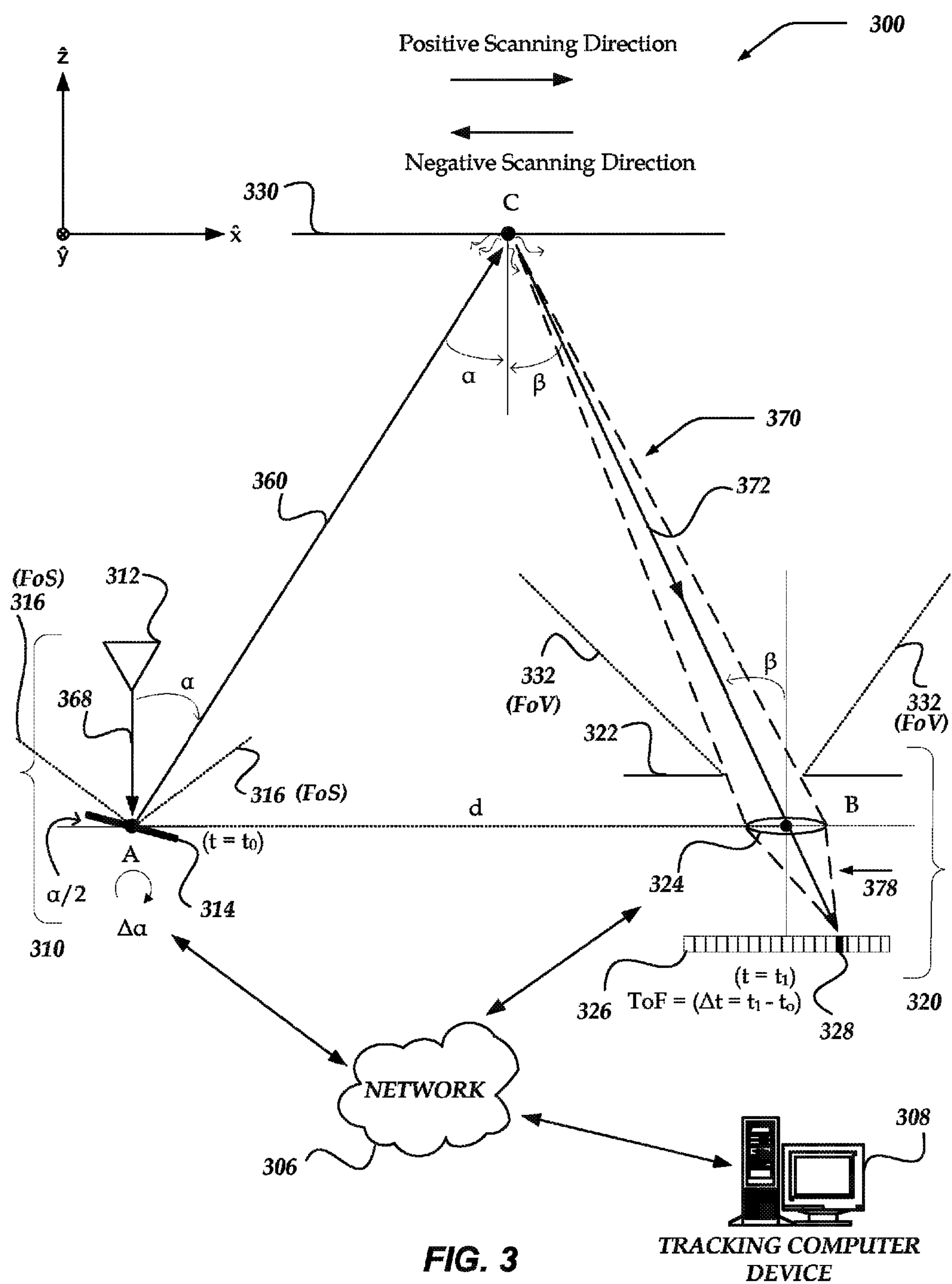
FIG. 3 illustrates an exemplary embodiment of a position tracking system that is consistent with the embodiments disclosed herein.

FIG. 3 illustrates an exemplary embodiment of a position tracking system 300 that is consistent with the embodiments disclosed herein. A right-handed Cartesian coordinate system is shown in the upper-left corner of FIG. 3. Orthonormal vectors $\hat{x}$, $\hat{y}$, and $\hat{z}$ ($\hat{y}$ extending out of the page, towards the reader) characterize the coordinate system.

Position tracking system 300 includes a photon transmitter 310, a photon receiver 320, and a tracking computer device 308. Each of photon transmitter 310, photon receiver, and tracking computer device 308 are communicatively coupled over network 306. Tracking computer device 308 may include similar features to network computer of FIG. 2 or tracking computer device 108 of FIG. 1. Network 306 may include similar features to network 106 of FIG. 1.

Photon transmitter 310, or simply the transmitter, is operative to transmit one or more beams of photons, i.e. outgoing light beam 360. Photon transmitter 310 is also operative to scan the outgoing light beam 360 through a range of outgoing angles within the transmitter's 310 field of scanning (FoS) 316. Outgoing light beam 360 may be a continuous or pulsed beam. As discussed herein, transmitter 310 is operative to selectively shape both the temporal and spatial beam profiles of outgoing light beam 360.

Photon receiver 320, or simply the receiver, is operative to detect photons that are received within a range of incoming angles within the receiver's 320 field of view (FoV) 332, i.e. incoming light beam 370. System 300 is operative to determine the incoming angles of the detected incoming light beam 370. FIG. 3 shows system 300 in a planar geometry, i.e. photon transmitter 310, photon receiver 320, target 330, outgoing light beam 360, and incoming light beam 370 are within the $\hat{x}$-$\hat{z}$ plane. As such, each of the outgoing and incoming angles are characterized by an single angle, i.e. an outgoing/incoming azimuth angle (as denoted by $\alpha$) with respect to the $\hat{z}$ axis. However, in other embodiments where the outgoing/incoming light beams include an out-of-plane component, two angles are required to characterize the outgoing/incoming angles, i.e. the azimuth angle and another angle with respect to the $\hat{x}$-$\hat{z}$ plane (the elevation or altitude angle, as denoted by $\epsilon$). In planar geometries, FoV 332 may be described by a FoV a central azimuth angle, as well as a range of FoV azimuth angles centered around the FoV central azimuth angle, e.g. azimuth FoV=0°±20°, or the like. In 3D geometries, the elevation (out of plane) range is included, e.g. elevation FoV=0°±20°, or the like. Similarly, the FoS is described by a azimuth and elevation FoS range.

If the incoming light beam 370 corresponds to the outgoing light beam 360, i.e. outgoing light beam 360 is scattered from a target 330 and is detected by the receiver 320 as the incoming light beam 370, then system 300 is operative to temporally and spatially correlate and compare the incoming light beam 370 with the outgoing light beam 360. Such a correlation, correspondence, and/or comparison enables the precise and accurate tracking of target 330. For instance, a determination of the outgoing angle(s) of the outgoing light beam 360 and a determination of the incoming angle(s) of incoming light beam 370 enables a determination of a current location of target 330. Additionally, an offset or difference between the time that transmitter 310 transmits the outgoing light beam 360 and the time that receiver 320 detects the incoming light beam 370 enables another determination of the current location of target 330. A comparison between the two determinations of target's 330 location provides a more accurate and precision determination of the target's 330 location.

Photon transmitter 310 is positioned approximately at point A and photon receiver 320 is positioned approximately at point B. In the embodiment shown in FIG. 3, points A ($A_x$, $A_y$, $A_z$) and B ($B_x$, $B_y$, $B_z$) have substantially equivalent $\hat{z}$ and $\hat{y}$ coordinates, i.e. $A_y \approx B_y$ and $A_z \approx B_z$. Other embodiments are not so constrained. An absolute difference between the $\hat{x}$ coordinate of photon transmitter 310 and the $\hat{x}$ coordinate of photon receiver 320 is approximately equivalent to the offset distance d, i.e. d is approximately equivalent to the distance between points A and B ($|Ax-Bx| \approx d$). Thus, receiver 320 is offset (along the $\hat{x}$ axis) from transmitter 310 by the transmitter/receiver pair offset distance d. In the embodiment shown in FIG. 3, the Cartesian coordinates of point A and point B are ($T_x$, 0, 0) and ($R_x$, 0, 0) respectively, where $R_x = T_x + d$, although other embodiments are not so constrained.

At point A, photon transmitter 310 transmits the outgoing light beam 360. The term outgoing is applied to light beam 360 because the beam 360 is outgoing from transmitter 310. Accordingly, point A may be the transmission origination point of outgoing light beam 360. At point C, the target 330 scatters or reflects at least a portion of outgoing light beam 360. Because point C is reflecting the outgoing light beam 360, point C may be a reflection projection point. Point C is being tracked in FIG. 3. The Cartesian coordinates of point are ($C_x$, $C_y$, $C_z$). At point B, photon receiver 320 receives and detects a portion of the backscattered or reflected photons, i.e. incoming light beam 370. The term incoming is applied to light beam 370 because incoming light beam 370 is incoming to receiver 320.

As used herein, the terms "outgoing photon beam," "outgoing beam," "incident photon beam," "incident beam," "transmitted photon beam," and "transmitted beam" refer to the light beams transmitted via transmitter 310 and are between the optical components of photon transmitter 310 and target 330. As used herein, the terms "incoming photon beam," "incoming beam," "reflected photon beam," "reflected beam," "scattered photon beam," "scattered beam," "received photon beam," "received beam," "detectable photon beam," and "detectable beam" are used to refer to the portion of the light beam that is scattered or reflected from target 330 and received by the optical elements of photon receiver 320. Thus upon being reflected, or scattered, at point C, a portion of outgoing light beam 360 becomes the incoming light beam 370. In FIG. 3, target 330 is schematically represented by a one-dimensional (1D) line. However, it should be understand that target 330 may be any physical three-dimensional (3D) structure that is not an idealized black body.

Generally, in response to (and preferably coincident with) photon transmitter 310 transmitting the outgoing light beam 360, system 300 generates an outgoing or transmission timestamp ($t=t_0$) associated with the continuous or pulsed outgoing light beam 360. The outgoing light beam 360 is incident upon target 330, such that the beam profile of outgoing light beam 360 is spatially centered at point C on target 330. Outgoing light beam 360 is incident on point C at an incident angle $\alpha$, with respect to the $\hat{z}$ axis. In various embodiments, incident angle $\alpha$ is the outgoing azimuth angle $\alpha$.

Point C on the target 330 scatters or reflects at least a portion of incident beam 360. At least a portion of the backscattered or reflected photons, i.e. incoming light beam 370, are within the range of angles corresponding to the FoV 332 of photon receiver 320. Incoming light beam 370 includes a central beam axis 372. The edges of the spatial profile of the non-collimated incoming light beam 370 are shown by the hashed boundaries. Incoming light beam 370 travels toward receiver 320 at the incoming azimuth angle $\beta$, with respect to the $\hat{z}$ axis.

As discussed further below, outgoing azimuth angle $\alpha$ is a function of the instantaneous arrangement of one or more optical elements of photon transmitter 310. In preferred embodiments, the arrangement of the optical elements of photon transmitter 310 is a function of time, and thus outgoing azimuth angle $\alpha$ is also a function of time, i.e. outgoing light beam 360 is an outgoing scanning beam. Because point C is defined as the point on the target that is currently coincident with the center of outgoing light beam's 360 beam spot, point C is a function of outgoing azimuth angle $\alpha$. Likewise, the incoming azimuth angle $\beta$ is determined via the relative positions of point C and receiver 320 (point B).

In preferred embodiments, photon transmitter 310 is a scanning photon transmitter in one or more dimensions, such that the beam spot of outgoing light beam 360 scans the target 330 as $\alpha=\alpha(t)$ varies in time. Because the outgoing azimuth angle $\alpha$ is a function of time, point $C=C(\alpha(t))=C(t)$ and incoming azimuth angle $\beta=\beta(C(\alpha(t)))=\beta(t)$ are also functions of time. As discussed below, system 300 is operative to determine incoming angle $\beta$, based on the detection of incoming light beam 370. Knowledge of incoming and outgoing azimuth angles $\alpha/\beta$, as well as the transmitter/receiver pair offset distance d, enable the precision determination of ($C_x$, $C_y$, $C_z$) via triangulation methods.

In addition, in response to the detection of incoming light beam 370, via photon receiver 320, system 300 generates an incoming or received timestamp ($t=t_1$). An incoming timestamp may be generated for each detected pulsed light beam. A fast pixel circuit included in photon receiver 320 may generate this asynchronous incoming timestamp. System 300 is further operative to correlate corresponding outgoing and incoming timestamps. Such correlation enables system 300 to determine the Time of Flight (ToF), i.e. $\Delta t=t_1-t_0$ of the correlated outgoing and incoming 360/370 light beam pair. That is, system 300 determines the time for the round-trip of the outgoing light beam 360.

As discussed throughout, the detection of a portion of the incoming light beam 370 enables precise 2D and 3D tracking of the target 330. Tracking the target 330 may include at least determining an orthogonal distance between the transmitter/receiver pair 310/320 (points A and B) and point C of the target 330, i.e. determining $C_z$ as a function of time. The tracking may be performed via triangulation methods (based on the determination of outgoing angle $\alpha$ and incoming $\beta$), Time of Flight (TOF) methods (based on the determination of $\Delta t$), or a combination thereof.

As noted above, in FIG. 3, photon transmitter 310, photon receiver 320, the target 330, and outgoing/incoming photons beams 360/370 are shown in a coplanar geometry (other embodiments are not so constrained and methods discussed herein may be readily generalized to non-coplanar geometries via scanning and determining out of plane angles, such as the elevation angles). Photon transmitter 310, photon receiver 320, and target 330 form triangle ABC within the $\hat{x}$-$\hat{z}$ plane, where point C is the position of target 330 that is currently illuminated by outgoing light beam 360. As noted above, points A and B are separated by the predetermined offset distance d. The angles of triangle ABC (that are associated with points A, B, C) are $\pi-\alpha$, $\pi-\beta$, and $\alpha+\beta$ respectively. As noted above, because point C is a function of time, the geometry of triangle ABC is a function of time. In some embodiments, more than one photon transmitter is employed. In at least one embodiment, more than one photon receiver is employed.

Photon transmitter 310 includes a photon source 312. Photon source 312 may be a coherent photon source, such as a laser. Photon source 312 may emit a predetermined wavelength, or a extremely narrow range of wavelengths centered about the predetermined wavelength. The wavelength, or range or wavelengths, emitted by photon source 312 may include virtually any wavelength of the electromagnetic (EM) spectrum. In at least some embodiments, the wavelengths (or frequencies) emitted by photon source 312 may be included in the infrared (IR) portion of the EM spectrum. In some embodiments, the wavelengths/frequencies emitted by photon source 312 may be included in the visible portion of the EM spectrum.

As shown in FIG. 3, photon transmitter 310 includes an optical system that includes at least mirror 314. Mirror 314 enables specular reflection of an upstream light beam 368 generated by photon source 312. Upon reflection via mirror 314, the beam spot of outgoing light beam 360 is centered on point C of target 330. Although not shown in FIG. 3, in some embodiments, photon transmitter 310 includes additional optical elements, or systems of optical elements, to further reflect, focus, guide, align, aim, direct, collimate, fan-out, shape, scan, raster, transmit, or otherwise manipulate the outgoing light beam 360. The ensemble of such optical elements may be collectively referred to as the transmitter's 310 optical system. Due to the optical system (including at least mirror 314) outgoing light beam 360 is transmitted towards target 330, at the outgoing azimuth angle $\alpha$. For instance, mirror 314 is rotated, about a mirror rotational axis that is substantially parallel to the $\hat{y}$ axis, at the mirror rotational angle of $\alpha/2$ (with respect to $-\hat{z}$) to direct the outgoing light beam 360 at the outgoing angle $\alpha$.

Highly collimated laser beams may transmit power over large distances, with very little dispersion, i.e. a manageable decrease in energy density of the beam spot over long-range tracking distances. Apertures and/or collimators integrated into the optical system may spatially shape outgoing light beam's 360 profile into a highly collimated "fine-tipped" beam that produces a beam spot less than 10 millimeter (mm) in diameter at a transmission distance of one kilometer (km). In some embodiments, optical elements included in photon transmitter 310 collimate the transmitted beam 360 in one direction that is transverse to the transmission axis, while producing a "fan-out" or expanding beam in another directions that is transverse to both the collimated and transmission directions. For instance, see FIG. 8.

Mirror 314, as well as other optical components included in optical system of photon transmitter 310 may be a scanning, or raster, components. Scanning components enable the outgoing light beam 360 to scan target 330 within the outgoing angular range defined by FoS 316. As shown in FIG. 3, mirror 314 rotates around the mirror rotational axis to vary the mirror rotation angle $\alpha/2$, as a function of time. Accordingly, in at least one embodiment, the upstream light beam 368 is incident upon mirror 314 near point A of triangle ABC. Point A may be positioned along the mirror rotational axis.

By varying the mirror rotation angle, as a function of time, the beam scans target 330 (along a one-dimensional scanning direction that is substantially parallel to the $\hat{x}$ axis). Rotating mirror 314 may be a micro-electrical-mechanical system (MEM). Rotating mirror 314 may be a polygonal rotational mirror. As discussed further below, rotating mirror may rotate about a plurality of orthogonal mirror rotational axes to scan target 330 in at least two-dimensions (2D). As mirror 314 is rotated about the mirror rotational axis, point C is translated along the scanning axis. Various electrical, mechanical, optical, magnetic, or other precise positions feedback loops in photon transmitter 310 enable a quick and precise determination of the mirror rotation angle $\alpha/2$ (and thus outgoing azimuth angle $\alpha$), correlated with the outgoing timestamp. Accordingly, mirror 314 may be a scanning mirror.

Mirror 314 may be a lightweight and/or small mirror (~1 mm). A reduced mass and/or reduced spatial distribution of the mass (reduced moment of inertia) enables a higher scanning frequency for mirror 314 and increased responsiveness to mirror actuation forces. For instance, the electrostatic, mechanical, or piezoelectric vibrations, within the MEMS devices, employed to rotate mirror 314 may be of a lesser amplitude than otherwise would be required.

Accordingly, system 300 may be a high-speed scanning system where the actuation energy to rotate mirror 314 (or other rotating optical elements) is relatively low. The scanning may be performed at (or near) one or more natural resonant frequencies of the MEMS devices within system 300. In one exemplary embodiment, the scanning frequency is 25 kHz or greater. In various embodiments, the scanning frequencies may vary between a few Hz to greater than 100 kHz, depending upon the MEMs devices.

A small MEMs mirror (~1 mm) is enabled to rotate within a finite range of mirror rotation or deflection angles, such as ±10° or ±5° (optical or mechanical), which generates a sufficient FoS 316 to track target 30. In preferred embodiments, the FoS 316 and the corresponding FoV 332 are paired, such that the receiver 320 is looking only at portions of the field that are scannable the transmitter 310. For instance, mirror 314 does not rotate through angles that will illuminate points that fall outside of the FoV 332, within a predetermined tracking range. Both the FoS 316 and FoV 332 may be varied, depending upon the tracking conditions.

Photon receiver 320 includes a photon detector 326. Photon detector 326 may include an array of photon detectors, such as an arrangement of a plurality of photon detecting or sensing pixels. As shown in FIG. 3, photon detector 326 is a 1D array of pixels. However, in other embodiments, photon detector may include at least a 2D array of pixels. The pixels, or photosensors, may include any photon-sensitive technology, such as active-pixel sensors (APS), charge-coupled devices (CCDs), Single Photon Avalanche Detector (SPAD) (operated in avalanche mode), photovoltaic cells, phototransistors, and the like. In at least one embodiment, the range of frequency sensitivity of photon detector 326 is tailored to or paired with the range of frequencies emitted by photon source 312. For instance, if photon source 312 emits a predetermined frequency range within the infrared (IR) spectrum, the photon detector is sensitive to the frequencies within the predetermined frequency range and relatively insensitive to frequencies outside of the frequency range. Accordingly, the signal-to-noise ratio (SNR) is increased and the false-positive detection frequency is decreased in system 300.

In preferred embodiments, photon detector 326 includes an array of avalanche photo-diodes (APDs) operated in Geiger-mode or an array of single-photon avalanche diodes (SPADs). SPADs are advantageous due to their sensitivity to a single received photon. Because the intensity of the non-collimated incoming light beam 370 drops with the inverse power law, highly sensitive photon detectors are required for long-range tracking applications. Thus, arrays of SPAD pixels are included in preferable embodiments of photon detector 326. SPAD pixels are additionally advantageous due to their relatively fast response times (~tens of picoseconds).

Photon detector 326 may be a camera or a portion of a camera. Thus, system 300 is operative to generate image data of the target 310. A plurality of photon detectors or sensor arrays array may be arranged, configured, or integrated to form a larger array of photon-sensitive pixels. In various 1D pixel array embodiments, 20 individual 1000 pixel linear arrays, may be arranged end-to-end to form a 1D array of 20,000 pixels. 2D pixel arrays may be similarly formed by arranging a plurality of 1D or 2D sensor arrays.

Photon receiver 320 includes an aperture 322 to precisely tailor photon receiver's 320 FoV 332. Inadvertent detection of photons emitted by transmitter 310 and scattered by target 310 may generate noise or jitter within system 300. Thus, a preferable aperture 322 arrangement decreases the likelihood of the detection of photons outside of the azimuth (and elevation) FoS 316 range of transmitter 310. Also in preferred embodiments, the diameter of aperture 322 is large enough such that photon receiver 320 receives and detects enough of the photons scattered from point C, within a time interval that is short enough to accommodate pixel transition based on the scanning frequency of system 300. In some embodiments, the size of aperture 322 is based on a pixel illumination time interval (on the order of a few nanoseconds or less). Because preferred embodiments employ SPAD pixels, the size of the aperture 322 is smaller than would be required utilizing other technologies that are not as sensitive to the presences of a few photons. Accordingly, system noise is decreased in preferred embodiments, Photon receiver 320 includes a receiver optical system that includes one or more optical elements, such as lens 324, to focus the beam 378 (received through aperture 322) onto photon detector 326. In some embodiments, such as shown in FIG. 3, point B is positioned near the center of focusing lens 324. Lens 324 may be positioned within or behind aperture 322. Photon detector array 320 may be located at the focal plane of lens 324. Although lens 324 is schematically represented by a single lens, lens 324 may represent receiver optical system that includes a plurality of lenses and/or other optical components. For instance, for long-range tracking, photon receiver 320 may include a telescopic optical arrangement. It should be understood that the specific arrangement of aperture 322, the optical system 324, and the photon detector 326 determine the FoV 322 of photon receiver 320. FoV 322 may be tailored or paired with FoS 316 based on a predetermined tracking range.

Focused beam 378 is incident upon, and thus is detected by one or more pixels within photon detector 326, such as pixel 328. Based on the lens system 324, as well as which pixels in the photon detector 326 are struck by the focused beam, the incoming azimuth angle $\beta$ may be determined. For instance, in the embodiment shown in FIG. 3, the spatial relationship between the "lit up" pixel 328 and the center of lens 324 may determine the incoming azimuth angle $\beta$. In other embodiments of the optical or lens system 324 of photon receiver 320, the determination of incoming angle $\beta$ may be more complicated than that represented by the geometric optics shown in FIG. 3.

Each pixel in photon detector is associated with a unique range of incoming angles with the FoV 322 (the pixel's incoming "line of sight" as determined by the receiver optical system). For an individual pixel, the central value of the incoming line of sight range corresponds to the incoming angle(s) of the pixel. The size of the range of angles corresponds to the resolution, i.e. the resolving power, of the pixel. In 3D embodiments, each pixel corresponds to a specific solid angle. In preferred embodiments, the pixels' "line of sight" covers the entire, or close to the entire, FoV 332. The FoV 332 may be varied in real time by selectively powering specific pixels. The relationship between each pixel and the correspond incoming azimuth (and elevation) central angle(s) and angular range (resolution) may be predetermined and stored in fast look-up tables, accessible by system 300.

Based on knowledge of the outgoing angle $\alpha$, as well as the observed, or determined, incoming angle $\beta$, target 330 may be tracked based on triangulation methods, i.e. $(C_x, C_y, C_z)$ may be determined based on d, $\alpha$, and $\beta$. Additionally, and in combination, tracking may be performed by correlating the outgoing timestamp of outgoing light beam 360 with the incoming timestamp of the corresponding incoming light beam 370, via ToF methods. For instance, when $d \ll C_z$, then $2*C_z \approx \Delta t/c$, where c is the speed of light in the medium that beams 360/370 are transmitted through. In embodiments where the assumption d<<Cz is not applicable, then more sophisticated ToF analyses may be employed to determine $(C_x, C_y, C_z)$.

Accordingly, system 300 may perform tracking by employing methods similar to Radio Detection and Ranging (Radar), but using electromagnetic (EM) waves with shorter wavelengths (or larger frequencies). For instance, system 300 may employ a combination of triangulation and various methods associated with incoherent Lidar to perform the tracking. The combination of triangulation- and TOF-based tracking (via highly collimated lasers and SPAD arrays) results in a significant increase in both the temporal and the spatial resolution, as well as the sensitivity and responsiveness of system 300.

It should be noted that tracking, or range finding, of target 330 via triangulation based on knowledge of the offset distance d and outgoing azimuth angle $\alpha$, as well as the determination of the incoming azimuth angle $\beta$ may introduce triangulation ambiguities into the determination of $(C_x, C_y, C_y)$. Similarly, tracking target 330 via ToF based on the measurement of $\Delta t = t_1 - t_0$ introduces ToF ambiguities into the determination of $(C_x, C_y, C_z)$. For instance, ToF, in isolation from other methods, can only track an ellipse (or an in ellipsoid in 3D), where points A and B are the foci of the ellipse and point C lies somewhere on the ellipse. However, combining triangulation and ToF methodologies enables the resolution of these tracking ambiguities.

Furthermore, the accuracy of triangulation and ToF methodologies are complimentary. The error bars and ambiguities associated with triangulation-based determinations of ($C_x$, $C_y$, $C_z$) may be smaller than the corresponding error bars and ambiguities for ToF-based determinations for short-range track, i.e. when d<<$C_z$ does not apply (AC+BC>>2*$C_z$). When $C_z$ is not large enough to accurately determine Δt (due to the response time and temporal uncertainties inherent in system 300), triangulation-based determinations may be more applicable. Conversely, when d<<Cz (AC+BC≈2*$C_z$) applies, i.e. when α≈β≈0, ToF-based determinations may be more accurate. Additionally, typical ToF ambiguities are avoided because the trajectory of the target is tracked. The direction of the target's motion is tracked, such that the correlating the previous transmission of outgoing light beams with currently detected incoming beams is performed.

A final determination of ($C_x$, $C_y$, $C_z$) (and corresponding error bars and other uncertainties) may be based on a feedback loop between triangulation-based and ToF-based methodologies of determining ($C_x$, $C_y$, $C_z$). In some embodiments, such as when tracking a short-ranged target (when d<<$C_z$ does not apply), a first determination of point C (and corresponding uncertainties) may be based on triangulation methods. A second determination of point C (and corresponding uncertainties) may be based on ToF methods. The second determination may be employed to reduce the corresponding uncertainties of the first determination (or vice versa). In some embodiments, the two determinations are combined via methods employed to resolve separate measurements of the same observable. The error bars of the two determinations may be combined to result in a final set of error bars that include reduced uncertainties. In some embodiments, such as when the target is at a greater distance, i.e. d<<$C_z$ does apply, the first determination of point C is based on ToF methods and the second determination is based on triangulation methods. The second determination is fed back to update the first determination (or vice-versa). The updated determination includes reduced error bars or other uncertainties.

As noted above, in preferred embodiments, the pixels in photon detector 326 include SPAD or Geiger-mode APD pixels. Such pixels are extremely sensitive and generate a strong and very fast binary signal (~few nanoseconds or tens of picoseconds) in response to the arrival of the first reflected photons incident on the pixel array of photon detector 326. U.S. Pat. No. 8,696,141, entitled METHOD, APPARATUS, AND MANUFACTURE FOR A TRACKING CAMERA OR DETECTOR WITH FAST ASYNCHRONOUS TRIGGERING, the contents of which are incorporated in its entirety by reference herein, describes a fast asynchronous camera with an array of SPAD type pixels. Such as camera may be employed in photon receiver 320, as at least a portion of photon detector 326.

For increased responsivity and ToF accuracy, in preferred embodiments, the optical or lens system of photon receiver 320 is configured to focus the incoming light beam 370 to a beam spot that approximately corresponds to the physical dimensions of a single pixel in photon detector 326, e.g. on the order of a few microns (μm). Sizing the focused beam spot to correspond to the area occupied by a single pixel decreases the number of pixels that are triggered, or "lit-up" per detection event, increasing the tracking accuracy of, as well as decreasing noise and other uncertainties in system 300. The resolving power of system 300 is increased when incoming light beam 370 triggers fewer pixels.

In embodiments where the beam spot of focused return beam 378 is larger than a single pixel (or is otherwise not focused to the size of a single pixel), the pixel that generates the greatest detection signal may be determined as the "hit" or "illuminated" pixel. U.S. Pat. No. 8,282,222 entitled IMAGE PROJECTOR WITH REFLECTED LIGHT TRACKING, the contents of which are incorporated in its entirety by reference herein, discloses pixel centroid auto-selection or "winner takes all" methods to determine the "hit" pixel when the beam spot of focused incoming light beam 378 is distributed over a plurality of SPAD-type pixels. For instance, the first SPAD pixel to avalanche may be determined as the illuminated pixel.

Any of these methods may be employed to determine the illuminated (or hit) pixel 328 in photon detector 326. As noted above, the determination of incoming angle β (and thus the determination of the position of point C) is based on at least the determination of the position (or incoming line of sight) of illuminated or avalanched pixel 328. Thus, system 300 is operative to track target 330 by precisely and accurately determining each of ($C_x$, $C_y$, $C_z$), in real or near-real time, for at least a portion of outgoing angles α, as the outgoing light beam 360 is scanned across points within the FoV 332 of receiver 320.

Furthermore, to increase the tracking accuracy of system 300, cylindrical optics may be included in the optical system 324 of photon receiver 320. Both of the above incorporated U.S. Pat. Nos. 8,282,222 and 8,696,141 disclose the employment of single linear sensor, in combination with cylindrical folding optics to improve the resolution of the determination of $C_x$ and $C_y$ within the FoV 332 of receiver 320.

At 25 kHz, system 300 performs a linear scan across of photon receiver's 320 FoV 320 every 20 microseconds (μs), assuming scanning is performed in both the positive and negative scanning directions. Accordingly, system 300 performs 50,000 scan lines per second (s). Thus, for a linear detector array that includes 20,000 pixels, the incoming light beam 370 illuminates each pixel for ~1 nanosecond (ns). Note that scanning across the pixel array of photon detector 326 may not be temporally linear. The illumination time is not uniform across the array of pixels. The pixels corresponding to the center of the FoV 332 will be illuminated shorter than the pixels corresponding to the edges of the FoV 332.

System 300 may be a triggered system 300. Various system configuration parameters may be initialized, varied, adjusted, and/or updated based up an initial or periodic detection of target 310. For instance, system 300 may configure or update (in real, or near real time) the scanning direction, FoS 316, the wavelength of light source 312, the intensity, the spatial and temporal profile (pulse width, intensity, duty cycle, and the like) of outgoing light beam 360 based on triggering conditions and observations of target 310. System 300 may auto-adjust or auto-configure based on the detected target's size, speed, and/or trajectory to decrease system latency and power consumption. Accordingly, such automation decreases system latency and power consumption, as well as increases the accuracy and resolution of system 300. The spatial and temporal accuracy of the resolution is further increased by transmitting outgoing light beam pulses at a high outgoing frequency and a high outgoing intensity (high powered outgoing strobe-pulses) in the vicinity of the expected/projected trajectory of target 330 when the target 330 is a fast moving target, such as a ballistic or missile.

The range of system 300 is a function of the intensity (or power density) if the outgoing pulses, the power/frequency of photon source 312, transmitter's 310 optical system, the absorbition/reflection/scattering properties of target 330 at the corresponding frequencies, receiver's 320 optical system, sensitivity and resolving power of the photon detector 326, transparency of the transmission medium, ambient EM environment (background), and the like. A digital filter employed by receiver 320 may discriminate short picosecond modulated outgoing pulses from background photons based on predetermined the predetermined periodicity as the signal signature.

By limiting the FoS 316 to a narrow angular range, transmitter 310 may emit high-peak pulses at low duty cycles, such that smaller mirrors and optical components may be employed in the optical systems. A reduction of the FoS 316 by a factor of 0.1 in 2D increases the tracking range by factor of 100 via the square power law. By targeting the outgoing light beam with a narrow FoS 316 covering the expected vicinity of target 330 also enables a reduction in the total amount of transmitted photons. Accordingly, system 300 is more "stealthy" due to the decreased likelihood that other parties could detect the incoming/outgoing 360/370 beams.

Accuracy of tracking a moving target is increased by successive observations of the target, by transmitting successive short-burst outgoing pulses. For instance, system 300 is enabled to determine a trajectory of a ballistic by and rapidly and automatically "zoom" into the trajectory by updating the FoS 316 and the FoV 332 to focus on the trajectory.

System 300 is operative to simultaneously track multiple targets with the same FoS 316 and FoV 332. In at least one embodiment, to decrease the system power requirements and likelihood of detection by other parties, system 300 turns off the outgoing beam, while scanning regions between the targets. When zooming (updating the angular range of FoS 316 and FoV 332, as well as focusing and concentrating the outgoing pulse power) system 300 has a response time on the order of a few millisecond or less, which enables to the tracking of a plurality of targets.

Generalized Operations

The operation of certain aspects of the invention will now be described with respect to FIGS. 4A-4C. In at least one of various embodiments, processes 400, 420, or 440 of FIGS. 4A, 4B, and 4B, respectively, may be implemented by and/or executed on a combination of computer devices, such as tracking computer device 108 of FIG. 1, network computer 200 of FIG. 2, tracking computer 308 of FIG. 3, and the like, as well photon transmitters, such as photon transmitter 110 of FIG. 1 or photon transmitter 310 of FIG. 3, and photon receivers, such as photon receiver 120 of FIG. 1 or photon receiver 320 of FIG. 3.

Figure 4A:
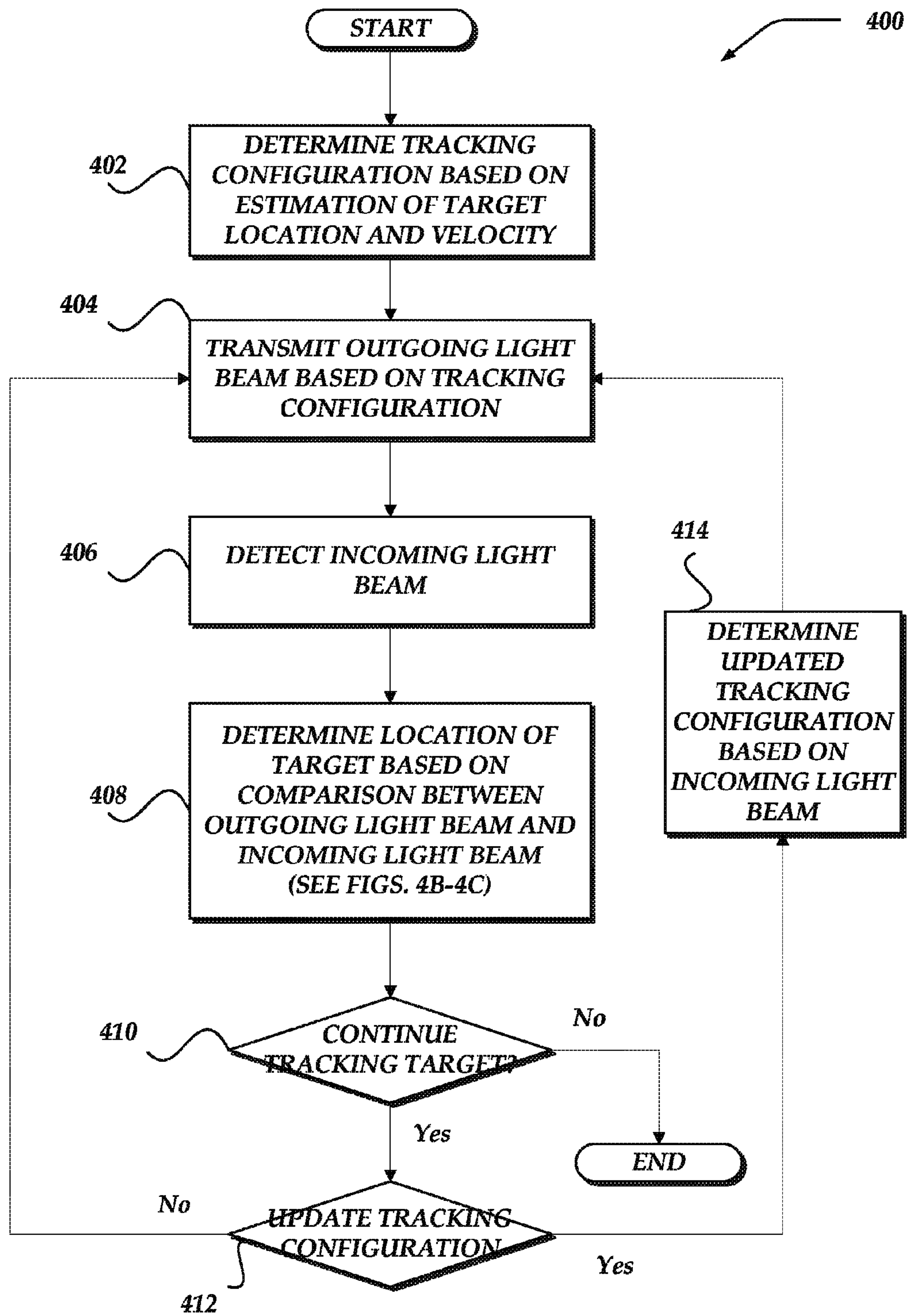
FIG. 4A illustrates a logical flow diagram generally showing one embodiment of a process for tracking a target.

FIG. 4A illustrates a logical flow diagram generally showing one embodiment of a process 400 for tracking a target. Process 400 may begin, after a start block, at block 402, where a tracking configuration is determined. The tracking configuration may include tracking settings, parameters, modes, and the like that determine the implementation of the tracking. Tracking configuration may include the transmitter's FoS (angular ranges for both azimuth and elevation angles), the receiver's FoV (angular ranges for both azimuth and elevation angles), scanning frequency (in both the azimuth and elevation angles), outgoing light beam temporal and spatial beam profiles, tracking mode (short-range tracking, medium-range tracking, long-range tracking), photon frequency of the outgoing light beams, triggering conditions, and the like. Outgoing temporal and spatial beam profile parameters may include pulse length (how long the pulse is on), period between pulses (how many outgoing pulses per second), outgoing light beam intensity, which dimensions the beam is collimated in or which dimensions the beam is fanned-out in, and the like.

As discussed throughout, the tracking configuration may be based on a proximate location of the target. For instance, the tracking configuration may vary if the target is within short-range, medium-range, or long range. Triangulation based tracking may be more preferred if the proximate location is a short-range target (short-range mode), while ToF based tracking may be more preferred if the target is a long-range target (long-range mode). A combination of triangulation and ToF may be preferred if the target is a medium-range target (medium-range mode). Accordingly, the tracking configuration may include short-range, medium-range, and long-range tracking modes.

The tracking configuration may be based on a proximate velocity, speed, direction of motion, or trajectory of the target. The tracking configuration may be based on a proximate size of the target. The tracking configuration may be based on various other factors that are discussed throughout the present disclosure. The tracking configuration may be automatically or autonomously determined, determined by a user, or a combination thereof. The tracking configuration be stored by a tracking computer device, such as tracking computer device 108 of FIG. 1.

Process 400 proceeds to block 404, where one or more outgoing light beams are transmitted. The beams may be light (or photon) beams. The one or more beams may be transmitted by photon transmitters, transceivers, or receivers specially adapted to transmit light beams. The one or more beams may be transmitted in one or more outgoing angles (azimuth and/or elevation). The beams may be scanned across the azimuth axis, the elevation axis, or a combination thereof. The outgoing angles, temporal and spatial beam profiles, intensity, and the like may be based on the tracking configuration, including at least a tracking mode, FoS, and scanning frequency. The discussion in regards to at least FIGS. 3 and 5-14C discuss various embodiments of transmitting outgoing light beams.

At block 406, one or more incoming light beams are detected. The one or more incoming light beams may be light (or photon) beams. The incoming light beams are detected at one or more incoming angles (azimuth and elevation). The incoming angles are within the detector's FoV. The one or more incoming light beams correspond to the one or more outgoing light beams, where the outgoing light beams have been reflected from the target. The one or more incoming light beams may be detected by photon receivers, transceivers, or transmitters specially adapted to detect light beams. The discussion in regards to at least FIGS. 3 and 5-14C discuss various embodiments of detecting incoming light beams.

Process 400 proceeds to block 408, where a location of the target is determined. At least the discussion in regards to FIGS. 4B-4C, as well as FIGS. 3 and 5-14C discuss various embodiments of determining a location of the target. However, briefly, determining the location of the target may be based on a comparison between one or more characteristics of the one or more outgoing light beams and the one or more incoming light beams. Such beam characteristics may include outgoing angles, incoming angles, outgoing timestamps, incoming timestamps, triggered or avalanched pixels in the detectors, and the like. The determination of the location may be based on the tracking configuration, including the tracking mode. The determination of the location may be based on triangulation methods, ToF methods, or a combination thereof. Various proximate and precision locations may be determined recursively, based on triangulation and ToF methods.

The determination of the locations may include determining a proximate location of the target based on at least the location or velocity of the target. For instance, a proximate location may include a limited portion of the transmitter's FoS and/or a limited portion of the receiver's FoV, i.e. a narrow range of angles. A proximate location may include a proximate distance or range, i.e. short-, medium-, or long-range of the target. The proximate location may be based on an approximated and/or estimated location, trajectory, velocity, or the like of the target.

Determining the location may include modifying the one or more outgoing angles based on the proximate location. For instance, if the proximate location includes a limited FoV, the outgoing angles of the outgoing light beam may be modified, such that the outgoing light beam is scanned over a limited range of the transmitter's FoS. The limited FoS range may cover only the angles corresponding to the proximate location of the target. In some embodiments, one or more outgoing light beams are transmitted at the modified one or more outgoing angles.

The determination of a precision location may be dependent upon the one or more modified outgoing angles. For instance, a triangulation value may be based on the one or more incoming light beams that correspond to the one or more outgoing light beams transmitting at the one or more modified outgoing angles. Additionally, a time interval corresponding to a time-of-flight (ToF) of the one or more outgoing light beams transmitting at the one or more modified outgoing angles may be determined. The determination of the proximate, precision, or any successively or recursively determined locations may be based on the triangulation value, the time interval, or a combination of the triangulation value and the time interval.

At decision block 410, a decision is made on whether to continue tracking the target. For instance, the scan position of the outgoing light beam may proceed to the next pixel in the receiver. If continuing to scan or track the target, process 400 proceeds to decision block 412. Otherwise, process 400 terminates.

At decision block 412, a decision is made whether to update the tracking configuration. If the tracking configuration is to be updated, process 400 flows to block 414. For instance, it may be preferred to update the tracking configuration based on the determined location, i.e. a proximate location or the precision location. Otherwise, process 400 flows back to block 404, where the outgoing light beams are transmitted based on the current tracking configuration.

At block 414, an updated tracking configuration is determined. The updated tracking configuration may be determined based on the outgoing light beams, the incoming light beams, the outgoing angles, the modified outgoing angles, the incoming angles, the proximate location, the precision location, and the like, i.e. real-time, or near teal-time, tracking data generated by the tracking system. In at least one embodiment, the precision location is iteratively used as the proximate location to update the tracking configuration. At block 414, the tracking configuration of the system is updated based on the determined updated tracking configuration. Process 400 flows back to block 404, where the outgoing light beams are transmitted based on the current tracking configuration.

Figure 4B:
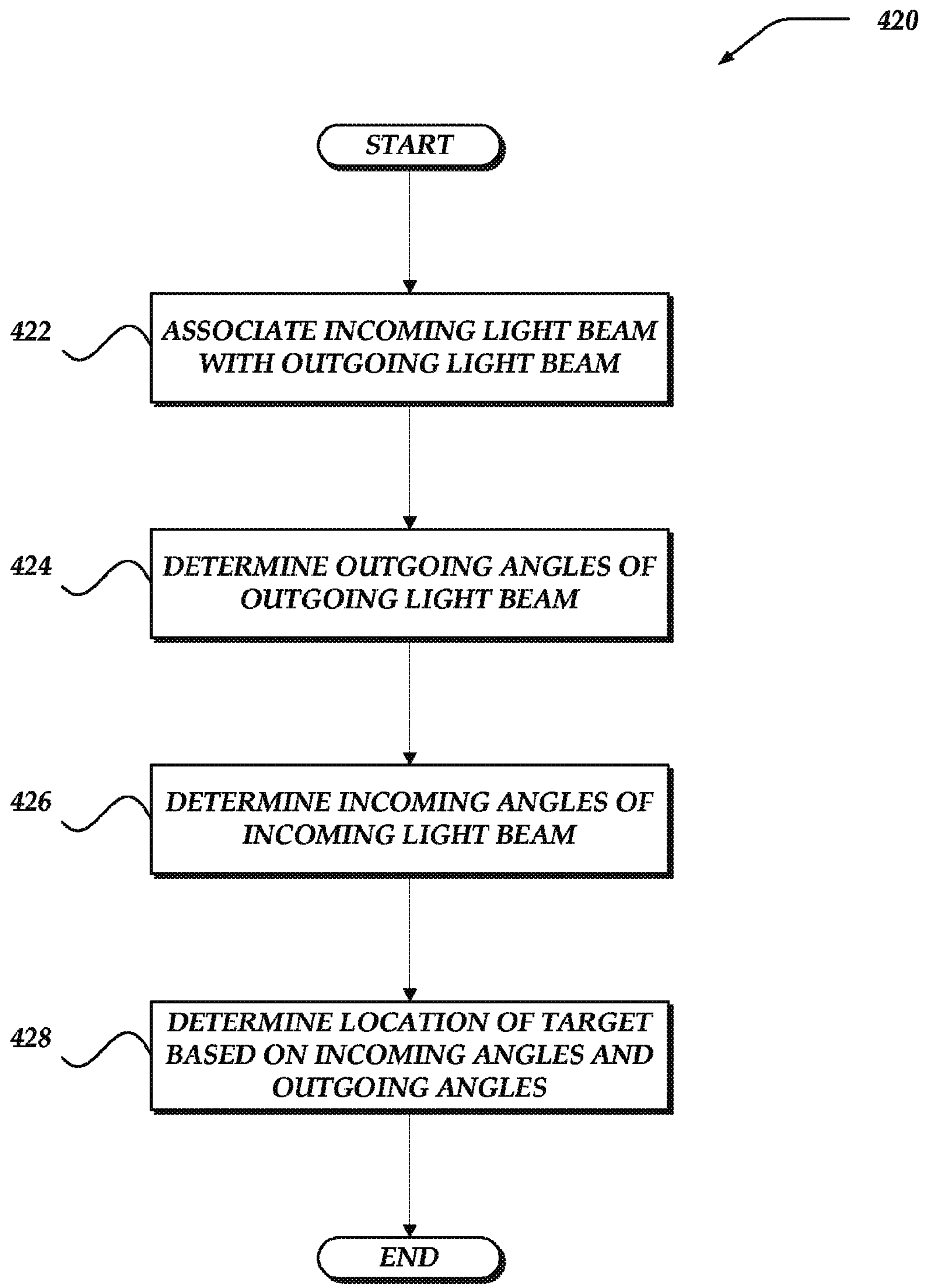
FIG. 4B shows a logical flow diagram generally showing one embodiment of a process for determining a location of a target based on triangulation of incoming light beams.

FIG. 4B shows a logical flow diagram generally showing one embodiment of a process 420 for determining a location of a target based on triangulation of incoming light beams. After a start block, process 420 begins at block 422, where an incoming light beam that is detected by one or more of the receivers or transceivers is correlated with an outgoing light beam. The incoming light beam corresponds to the outgoing light beam that was reflected at the target, i.e. the incoming light beam includes a portion of the photons of the correlated outgoing light beam. The correlation may be determined via a comparison of outgoing and incoming timestamps or other such similar methods.

At block 424, one or more outgoing angles of the correlated outgoing light beam are determined. The outgoing angles may include outgoing azimuth and/or elevation angles. The angles may include ranges or resolutions of the outgoing angles. The outgoing angles may be determined based on one or more position feedback loops implemented in one or more of the transmitters and/or receivers. The outgoing angles may correspond to an instantaneous rotation angle or phase difference of the optical components of the transmitting transmitter/transceiver at the instant that the correlated outgoing light beam was transmitted. The determination of the outgoing angles may be based on an outgoing timestamp corresponding to the correlated outgoing light beam.

At block 426, one or more incoming angles of the correlated incoming light beam are determined. The incoming angles may include incoming azimuth and/or elevation angles. The angles may include ranges or resolutions of the outgoing angles. The incoming angles may be determined based on triggered, illuminated, hit, or avalanched pixels included in the receiver and/or the transceiver that detected the incoming light beam. A relationship between a pixel index and the line-of-sight, or resolution of the line-of-sight, corresponding to the avalanched pixels may be employed to determine the incoming angles. The incoming angles may correspond to an instantaneous rotation angle or phase difference of the optical components of the receiver/transceiver at the instant that the correlated incoming light beam was detected. The determination of the incoming angles may be based on an incoming timestamp corresponding to the correlated incoming light beam.

At block 428, a location of the target is determined based on the incoming angles and the outgoing angles. The location may be a proximate or a precision location. A triangulation value may be determined. The triangulation value may correspond to any coordinate that represents the location, i.e. $\hat{x}$, $\hat{y}$, $\hat{z}$ coordinate, or any other coordinate (polar, spherical, cylindrical, and the like). The triangulation value may be based on an offset distance between the transmitter/receiver pair that transmitted and detected the correlated incoming and outgoing light beams. The triangulation value may be determined via any triangulation method discussed herein or otherwise. In at least some embodiments, the triangulation value may be determined recursively and/or iteratively based on successive incoming/outgoing light beams and determinations of incoming and outgoing angles. For instance, the outgoing light beams may be outgoing pulsed beams. The determined triangulation value may be based on an average triangulation value that is averaged over a plurality of pulsed beams.

Figure 4C:
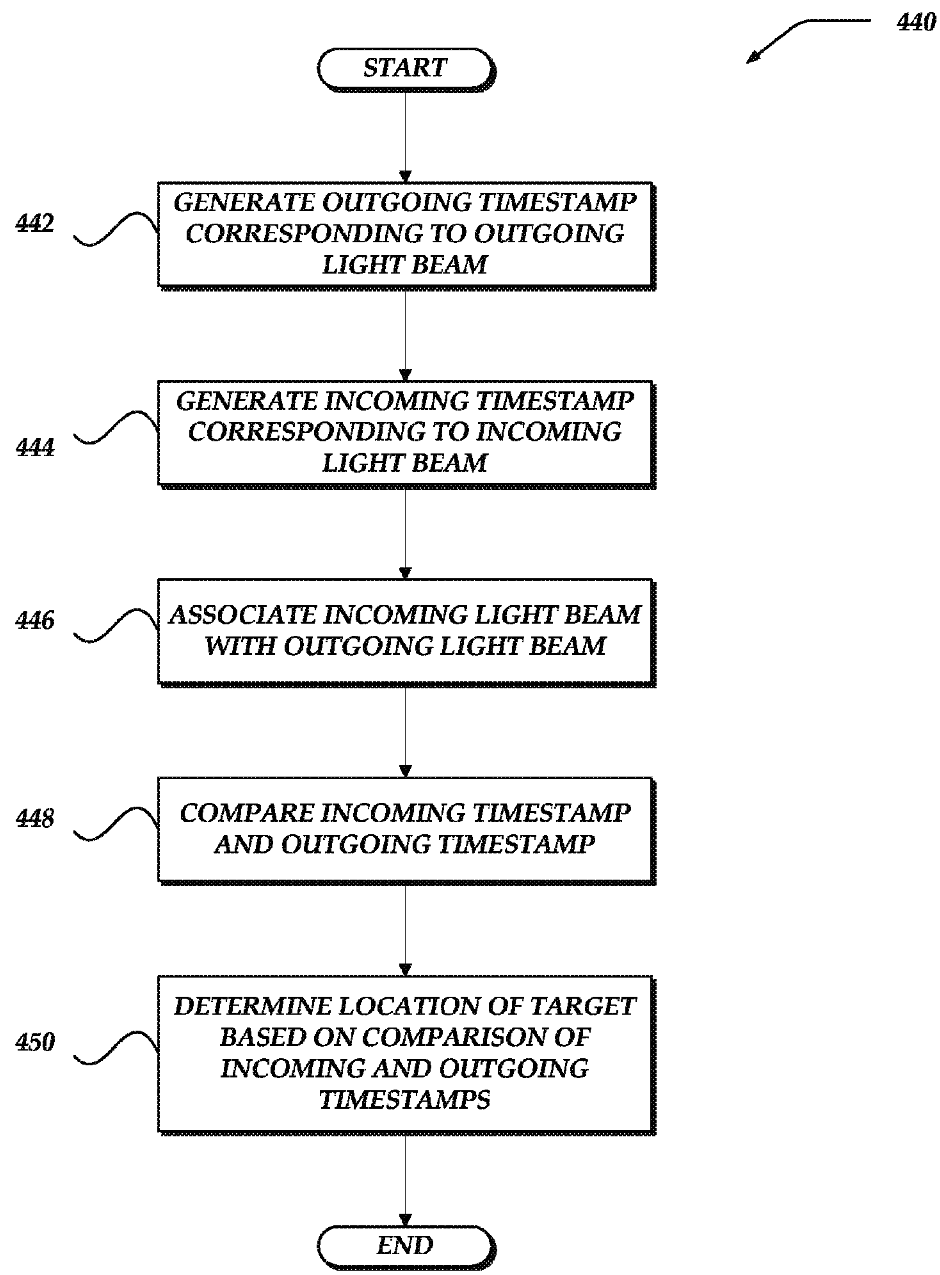
FIG. 4C shows a logical flow diagram generally showing one embodiment of a process for determining a location of a target based on a time interval corresponding to a time-of-flight (ToF) outgoing light beam.

FIG. 4C shows a logical flow diagram generally showing one embodiment of a process 440 for determining a location of a target based on a time interval corresponding to a time-of-flight (ToF) outgoing light beam. The determined location may be a proximate or a precision location. The location may be determined recursively and/or iteratively. At least portions of process 420 of FIG. 4B and process 440 may be performed recursively and/or iteratively to determine the proximate and/or precision locations. Process 420 and 440 may include feedback loops, i.e. determinations of process 420 may feedback to process 440 and vice-versa.

After a start block, process 440 begins at bock 442, where an outgoing timestamp corresponding to a transmitted outgoing light beam is generated. A tracking computer device or the transmitting transmitter/transceiver may generate the outgoing timestamp. At block 444, an incoming timestamp corresponding to a detected incoming light beam is generated. A tracking computer device or the detecting receiver/transceiver may generate the incoming timestamp. At block 446, the incoming and outgoing light beams are correlated.

At block 448, the correlated incoming and outgoing timestamps are compared. In at least one embodiment, a time interval corresponding to the ToF of the outgoing light beam is determined. The determination of the time interval may be determined via a difference between the incoming and outgoing timestamps.

At block 450, a location of the target is determined based on the comparison between the incoming and outgoing timestamps. In at least one embodiment, the location is determined based on the time interval and the speed of light through the medium that the outgoing and incoming light beams are transmitted through. In some embodiments, the speed of light in a vacuum is used to approximate the speed of light in the transmission medium. In various embodiments, the determined location is a proximate location. The determined location may be a precision location. In at least some embodiments, the time interval may be determined recursively and/or iteratively based on successive incoming/outgoing light beams and successive detections of the corresponding (and correlated) incoming light beams. For instance, the outgoing light beams may be outgoing pulsed beams. The determined time interval may be based on an average time interval that is averaged over a plurality of pulsed beams.

Figure 5:
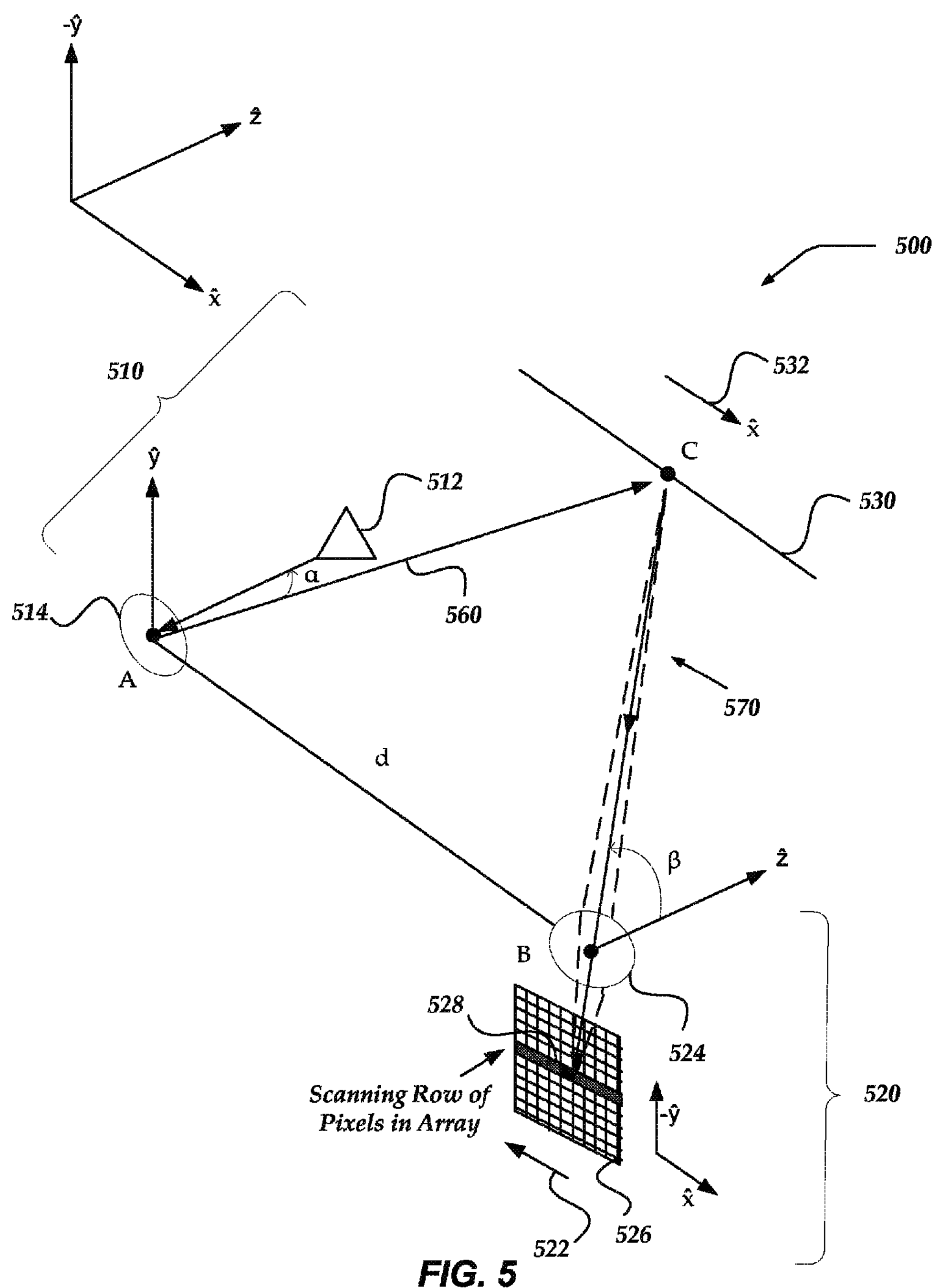
FIG. 5 shows a three-dimensional (3D) perspective on another exemplary embodiment of a position tracking system that is consistent with the embodiments disclosed herein.

FIGS. 5-14C illustrate various embodiments of position tracking systems and methods. Any of processes 400, 420, 440, 1500, 1600, and 1700 of FIGS. 4A-4C and 15-17 may be adapted and/or modified to include any of the embodiments discussed in the context of FIGS. 5-14C. FIG. 5 shows a three-dimensional (3D) perspective on another exemplary embodiment of a position tracking system 500 that is consistent with the embodiments disclosed herein. Tracking system 500 is similar to tracking system 300 of FIG. 3. As such, system 500 is tracking target 530 and includes a photon transmitter 510 and a photon receiver 520. Transmitter 510 includes a photon source 512 and a scanning transmitter optical system 514 to scan outgoing light beam 560 across the FoV of receiver 520.

Photon receiver 520 includes receiver optical system 524 and a photon detector 526. Photon detector includes a 2D array of pixels. As with system 300, transmitter optical system 514 directs outgoing light beam 560 at an outgoing azimuth angle $\alpha$. Outgoing light beam 560 illuminates point C on target 530. Point C scatters the outgoing light beam 560, such that incoming light beam 570 is received and detected by photon detector 520, at an incoming azimuth angle $\beta$. The transmitter 510 and the receiver 520 are offset along the $\hat{x}$ axis by an offset distance of d.

As transmitter optical system 514 scans the outgoing azimuth angle $\alpha$ (such that $\alpha$ is getting more positive as a function of time), point C is translated along a direction that is parallel to the $\hat{x}$ direction, as shown by target scanning line 532. As point C is translated along target scanning line 532, the incoming light beam 570 scans a corresponding 1D row of pixels 526 in the 2D array of photon detector 526. The detector scanning direction 522 is opposite to that of target scanning line 532, i.e. the detector scanning direction 522 is in the $-\hat{x}$ when the target scanning line is in the $\hat{x}$ direction, and vice-versa. Both the detector scanning direction 522 and the target scanning direction 532 are parallel to the base line, i.e. the line between the transmitter 510 and the receiver 520.

Figure 6A:
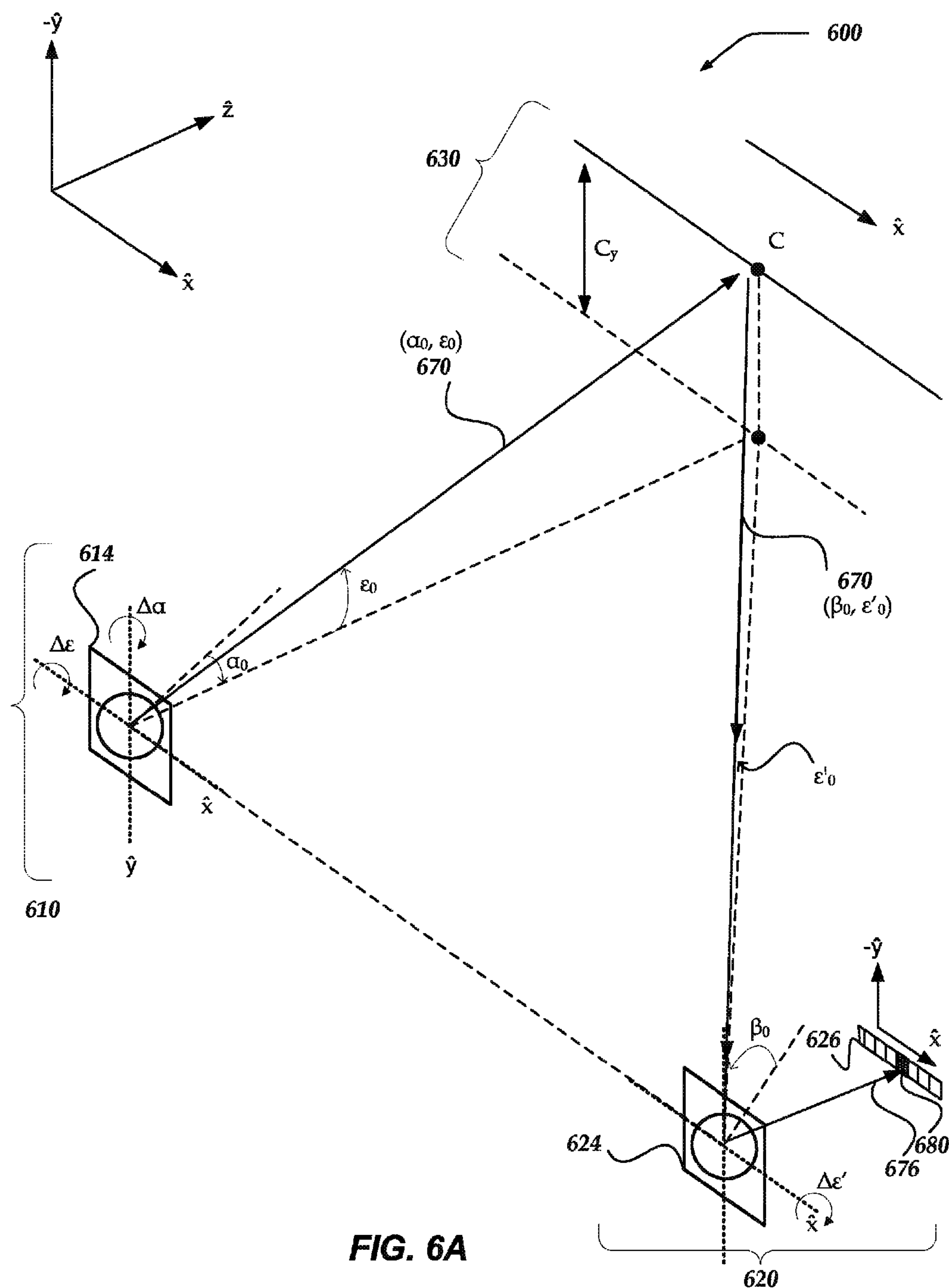
FIG. 6A provides a 3D perspective on an exemplary embodiment of a position tracking system that scans the target 630 in two dimensions (2D)

FIG. 6A provides a 3D perspective on an exemplary embodiment of a position tracking system 600 that scans the target 630 in two dimensions (2D). System 600 includes transmitter 610 and receiver 620. The transmitter optical system 614 enables the 2D scanning of target 630. Transmitter optical system 614 rotates along two independent orthogonal axes: an axis parallel to $\hat{y}$ to vary outgoing azimuth angle $\alpha$ (the azimuth rotational axis) and another axis that is parallel to $\hat{x}$ to vary the outgoing elevation (or altitude) angle $\epsilon$ (the elevation rotational axis). Accordingly, the target 630 is scanned along the $\hat{x}$-axis, as well as the $\hat{y}$-axis. In some embodiments, the azimuth rotational axis may be a fast scanning axis and the elevation rotational axis may be a slow scanning axis. On other embodiments, the elevation rotational axis is the fast scanning axis and the azimuth rotational axis is the slow scanning axis. In some embodiments, both axes are fast scanning axis. The two rotational axis sequentially scan the FoS, such as cathode ray tube (CRT)-type scanning, or may scan in other patterns, such as Lissajous scanning patterns.

Transmitter 610 transmits outgoing light beam 660 at outgoing azimuth and elevation angles ($\alpha_0$, $\epsilon_0$) respectively. Incoming light beam 670 is reflected from point C with Cartesian coordinates ($C_x$, $C_y$, $C_z$). Incoming light beam 670 is received by receiver 630 at incoming azimuth and elevation angles ($\beta_0$, $\epsilon'_0$) respectively. The projections of outgoing light beam 660 and incoming light beam 670 onto the $\hat{x}$-$\hat{z}$ plane are shown by the hashed projection lines.

Receiver 620 includes receiver optical system 624 and photon detector 626. Photon detector 626 includes a 1D array of photon-sensitive pixels. Receiver optical system 624 includes an "anti-epsilon" mirror that rotates to redirect and focus any out-of-plane (the $\hat{x}$-$\hat{z}$ plane) incoming light beam 660 to the plane of the 1D array of pixels. For instance, even though incoming light beam 670 has a non-zero value for $\epsilon'_0$, the anti-epsilon mirror rotates about the $\hat{x}$-axis such that focused beam 676 is focused onto the $\hat{x}$-$\hat{z}$ plane to strike pixel 628 of the 1D photon detector array 626.

The elevation rotations or configurations of transmitter optical system 614 and receiver optical system 624 are correlated in time so that the anti-epsilon mirror "corrects" for the out-of-plane projections of the outgoing 660 and the incoming 6703 beams. According, the employment of an anti-epsilon mirror obviates the need for a large 2D array of pixels for 2D scanning of the target 630. In one embodiment, photon detector 626 may include a fast array of sensors with only a few rows of pixels.

In some embodiments, at least the transmitter optical system 614 or the receiver optical system 624 is enabled via optical or mechanical alignment means, e.g. anti-epsilon mirrors, to focus or align the out-of-plane incoming light beam 670 back in the same plane $\hat{x}$-$\hat{z}$ plane.

Figure 6B:
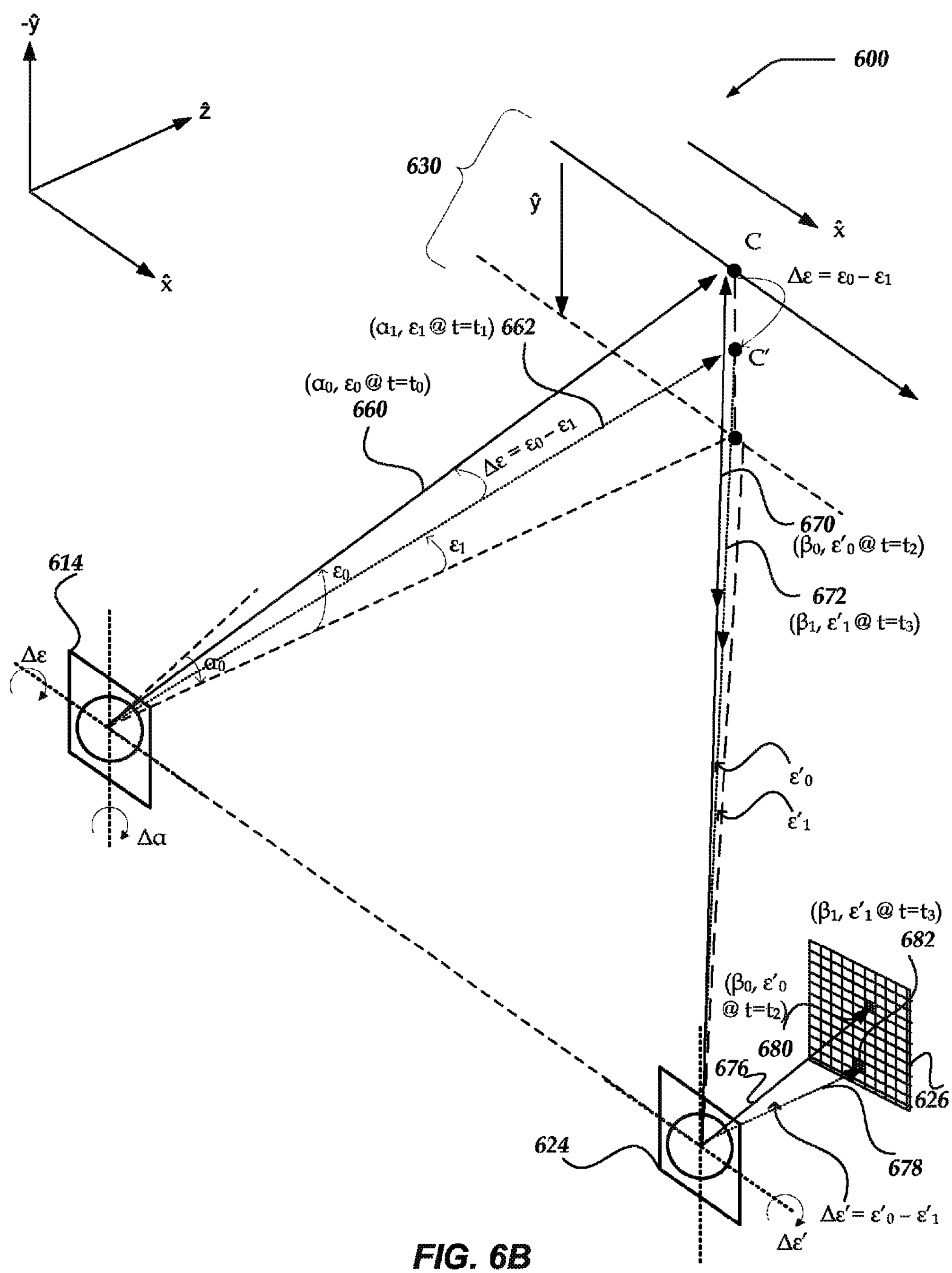
FIG. 6B illustrates the longer-range tracking capability of the system of FIG. 6A.

FIG. 6B illustrates the longer-range tracking capability (long-range mode) of system 600 of FIG. 6A. The photon detector 626 in FIG. 6B includes a 2D array of pixels. The same triangulation geometry of FIG. 6A is shown in 6B. However, the target 630 in FIG. 6B is far enough away from the transmitter/receiver pair that time lags associated with the outgoing and incoming light beams are significant.

At $t=t_0$, the transmitter optical system 614 is rotated at a first set of transmitter rotational angles and reflects a first outgoing pulsed beam 660 that is directed at first outgoing azimuth and elevation angles ($\alpha_0$, $\epsilon_0$). Additionally, system 600 generates a first transmission timestamp corresponding to $t=t_0$. First outgoing light beam 660 is scattered from point C.

First incoming light beam 670 is received at the receiver with first incoming azimuth and elevation angles ($\beta_0$, $\epsilon'_0$). The receiver optical system 624 is rotated to a first set of receiver rotational angles and directs/focuses first received beam 676 (corresponding to first incoming light beam 670) to illuminate first pixel 680.

At $t=t_2$, ($t_2>t_0$) first pixel 680 detects the first received beam 676. System 600 generates a first received timestamp at $t=t_2$. The first transmission timestamp and the first received timestamp are correlated to correspond to the ToF of the first pulsed outgoing light beam 660. System 600 generates a first ToF ($\Delta t_0=t_2-t_0$) associated with the first pulsed outgoing light beam 660.

Similarly, at $t=t_1$, ($t_1>t_0$) the transmitter optical system 614 is rotated at a second set of transmitter rotational angles and reflects a second outgoing pulsed beam 662 that is directed at second outgoing azimuth and elevation angles ($\alpha_1$, $\epsilon_1$). In the embodiment shown in FIG. 6B, the elevation rotational axis is the fast scanning axis such that $\Delta\epsilon=\epsilon_1-\epsilon_{0<0}$ and $\alpha_0\approx\alpha_1$. However, other embodiments may not be so constrained. Additionally, system 600 generates a second transmission timestamp corresponding to $t=t_1$. Second outgoing light beam 662 is scattered from point C', where $C_x\approx C'_x$, and $C_y>C'_y$.

Second incoming light beam 672 is received at the receiver with second incoming azimuth and elevation angles ($\beta_1$, $\epsilon'_1$), where $\Delta\epsilon'=\epsilon'_0-\epsilon'_1<0$. In the embodiment shown in FIG. 6B, because $\alpha_0\approx\alpha_1$, then $\beta_0\approx\beta_1$. The receiver optical system 624 is rotated to a second set of receiver rotational angles and directs/focuses second received beam 678 (corresponding to second incoming light beam 672) to illuminate second pixel 682.

At $t=t_3$ ($t_3>t_1$), second pixel 682 detects the second received beam 678. System 600 generates a second received timestamp at $t=t_3$. The second transmission timestamp and the second received timestamp are correlated to correspond to the ToF of the second pulsed outgoing light beam 662. System 600 generates a second ToF ($\Delta t_1=t_3-t_1$) associated with the second pulsed outgoing light beam 662.

Pulsed outgoing light beams 660/662 may be collimated pulsed beams or light bundles. In FIG. 6B, both $C_z$ and $C'_z$ are large enough (long-range tracking) such that the first determined ToF and the second determined ToF accurately resolve $C_z$ and $C'_z$. However, if the frequency of either of the azimuthal rotational axis or the elevation rotational axis of system 600 is great enough such that the first set of transmitter rotational angles (at $t=t_0$) is not closely correlated with the first set of receiver rotational angles (at $t=t_2$), then care must be taken to resolve at least one of $\beta_0$, $\epsilon'_0$ based on the position of the first hit pixel 680 in photon detector 636. For instance, if the angle of anti-epsilon mirror 624 is rotated significantly below $\epsilon_0$ at $t=t_2$, the information obtained by the first ToF determination must be used to correct the determination of at least $\epsilon'_0$ when mapping the position of first hit pixel 680 to the determination of $\epsilon'_0$. Likewise, if the second set of transmitter rotational angles (at $t=t_1$) is not closely correlated with the second set of receiver rotational angles (at $t=t_3$), then care must be taken to resolve at least one of $\beta_1$, $\epsilon'_1$ based on the position of the first hit pixel 680 in photon detector 636.

Figure 17:
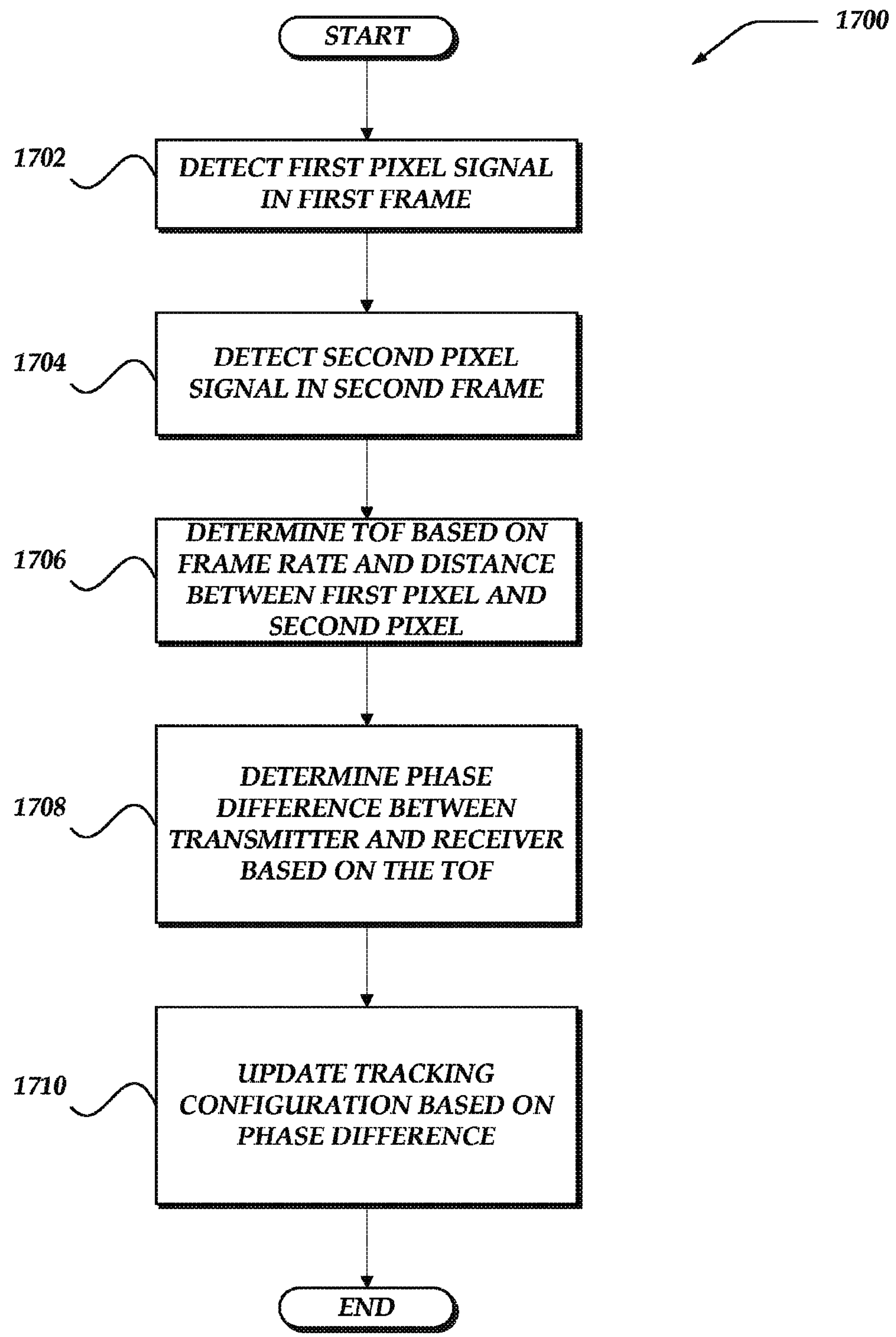
FIG. 17 shows a logical flow diagram generally showing one embodiment of a process for controlling the optical systems of transmitters and receivers based on ToF observations.

In at least some embodiments, the receiver rotational angles may lag (or be offset by a lagging phase difference) or be delayed from the transmitter rotational parameter to compensate for the long ToFs of the transmitted light beams. Thus, system 600 may be tuned and/or calibrated to a selected range (~$C_z$ and $C'_z$). At least process 1700 of FIG. 17 shows a process for determining a phase difference to compensate for the transmission time of long range targets. The tracking configuration of system 600 may be updated to include the phase difference between the optical systems of the transmitter and receiver. In such embodiments, a 1D array of pixels may be employed because the out-of-phase, or lagging, anti-epsilon mirror in the receives is configured to keep the incoming light beams focused on a single row of pixels, due to the precise determination of the phase difference. A determination of $\beta_0$, $\epsilon'_0$, $\beta_1$, $\epsilon'_1$, $t_0$, $t_1$, $t_2$, and $t_3$, in addition to knowledge of the corresponding $\alpha_0$ and $\alpha_1$ enables the accurate and precision determinations of ($C_x$, $C_y$, $C_z$) and (C'x, C'y, C'z) based on triangulation methods, ToF methods, or a combination thereof.

Figure 7:
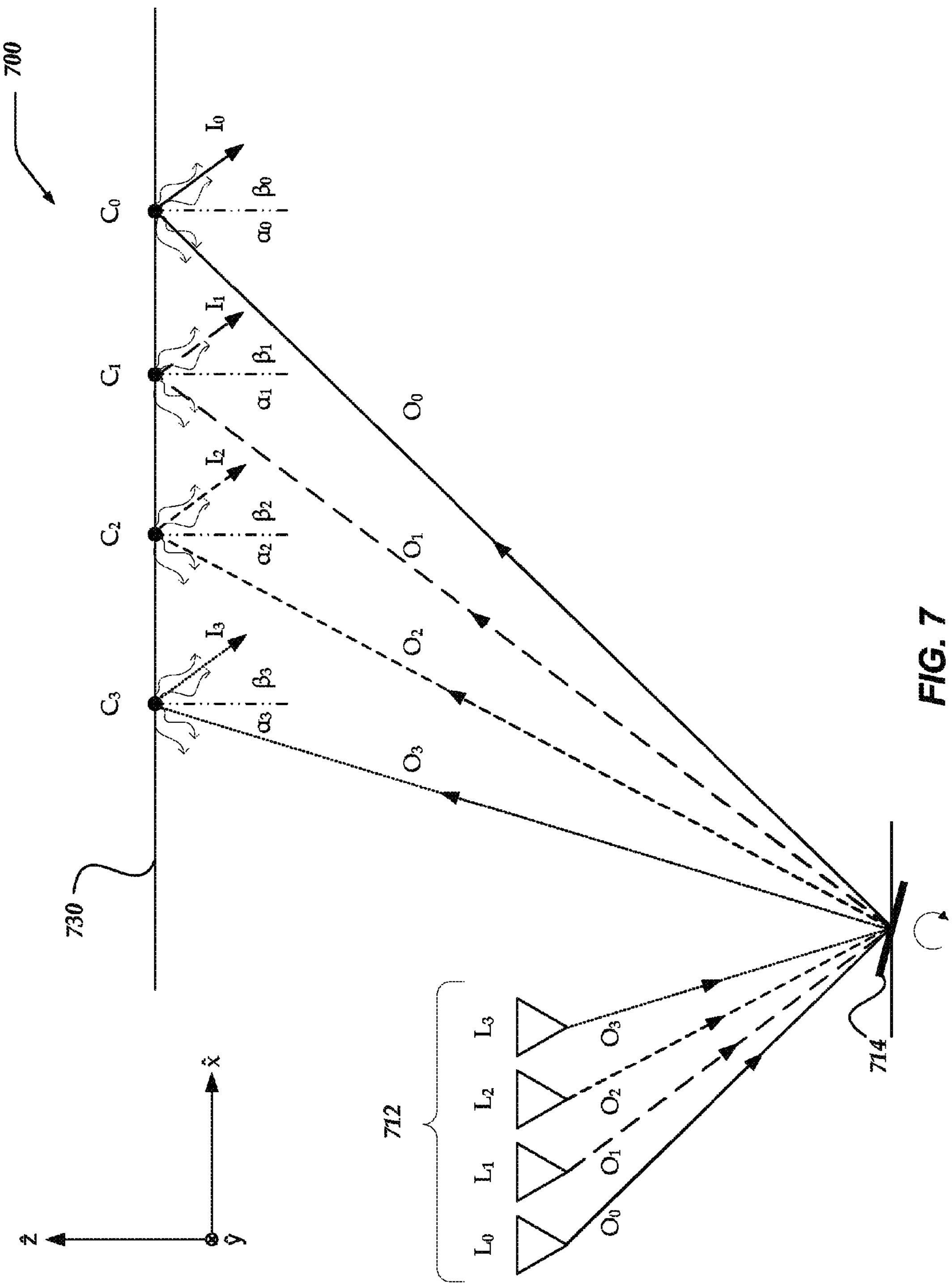
FIG. 7 shows a position tracking system that includes multiple light sources that is consistent with the embodiments disclosed herein.

FIG. 7 shows a position tracking system 700 that includes multiple photon sources 712 that is consistent with the embodiments disclosed herein. Multiple photon sources and/or multiple photon transmitters may be employed in any of the embodiments disclosed herein. As shown in FIG. 7, multiple photon sources 712 include four light sources: $L_0$, $L_1$, $L_2$, and $L_3$. Other embodiments that employ multiple light sources or multiple photon transmitters may employ more or less than four light sources/photon transmitters. In some embodiments, each of $L_0$, $L_1$, $L_2$, and $L_3$ provide photons of a unique frequency or wavelength (or narrow range of wavelengths/frequencies), i.e. each of $L_0$, $L_1$, $L_2$, and $L_3$ correspond to a frequency that is different from the corresponding frequencies of each of the other light sources. In other embodiments, at least one of $L_0$, $L_1$, $L_2$, and $L_3$ provides photons of a frequency that overlaps with the frequency of at least one of the other light sources.

$L_0$ transmits outgoing light beam $O_0$, $L_1$ transmits outgoing light beam $O_1$, $L_2$ transmits outgoing light beam $L_2$, and $L_3$ transmits outgoing light beam $O_3$. Each of $O_0$, $O_1$, $O_2$, and $O_3$ are incident upon and reflected via scanning mirror 714. At least one of $O_0$, $O_1$, $O_2$, and $O_3$ may be a collimated light beam. The scanning mirror 714 scans target 730 with each of $O_0$, $O_1$, $O_2$, and $O_3$ and along the $\hat{x}$ direction, i.e. the scanning direction. Each of $L_0$, $L_1$, $L_2$, and $L_3$ may be arranged in the same plane that is substantially orthogonal to the scanning direction. Thus, when scanning across the FoV of the photon transmitter, the beam spots corresponding to $L_0$, $L_1$, $L_2$, and $L_3$ travel along the same direction during the scanning. The outgoing light beams are trailing beams in that, when scanning, $L_3$ trails or follows $L_2$, which trails $L_1$, which trails $L_0$.

$O_0$, $O_1$, $O_2$, and $O_3$ are incident on scan points $C_0$, $C_1$, $C_2$, and $C_3$ (each located on target 730) respectively. Points $C_0$, $C_1$, $C_2$, and $C_3$ scatter outgoing light beams $O_0$, $O_1$, $O_2$, and $O_3$. One or more photon receivers receive and detect the scattered incoming light beams $I_0$, $I_1$, $I_2$, and $I_3$. In some embodiments, each light source $L_0$, $L_1$, $L_2$, and $L_3$ is paired with a corresponding photon detector and/or photon receiver. In other embodiments, more than one light source $L_0$, $L_1$, $L_2$, and $L_3$ is detected by the same photon detector and/or receiver.

At least one of $L_0$, $L_1$, $L_2$, and $L_3$ may be a trigger light source. In some embodiments, only the trigger light source is providing photons and scanning the FoV of the transmitter. For instance, $L_0$ may be a trigger light source. In some embodiments, the trigger light source may provide photons outside of the visible range. In at least one embodiment, $L_0$ is a near-infrared (NIR) triggering light source. Accordingly, when $L_0$ is scanning the FoV of the transmitter, the scanning process is not detectable via the human eye, i.e. the scanning is a stealthy scanning.

When photons corresponding to the $L_0$ are detected, i.e. the triggering light source is scattered from $C_0$, the other light sources are successively and briefly flashed on, at short successive intervals to illuminate point $C_1$, $C_2$, and $C_3$ In some embodiments, $L_1$, $L_2$, and $L_3$ may be visible light sources, for instance these triggered light sources may include red, green, blue (RGB) components to provide a color snapshot of the target. In at least one embodiment, $C_0$ initially detects the target. $C_1$ trails $C_0$ and confirms the detection via $C_0$. The trailing outgoing light beams may be a stronger pulse of be a different wavelength than $C_0$.

In other embodiments, system 700 may simultaneously traverse multiple scan points $C_0$, $C_1$, $C_2$, and $C_3$ to track the target at a higher successive or repeat detections rate. i.e the outgoing light beams are not trailing beams. Rather the outgoing light beams simultaneously track scan points on the target to increase the detection event rate. Increasing the number of detection events per scanned frame enables a lower latency for an initial detection of the target.

In such embodiments, a Kalman filter may be employed to determine the trajectory of the target. By employing a Kalman filter, system 700 may quickly converge on an accurate determination of the trajectory, resulting in a further increase in the zooming operations.

In multi-outgoing light beam systems, such as system 700, the fan-out configuration ($\alpha_0$, $\alpha_1$, $\alpha_2$, $\alpha_3$) may be calibrated, configured, updated, or otherwise varied across the transmitter's FoS and receiver's FoV for to enable successive detections of small targets with a greater accuracy than a single outgoing light beam system would enable. Successive multiple outgoing light beams at half the scanning rate provide a greater tracking resolution than a single outgoing light beam scanning at twice the scan rate. Furthermore, multiple outgoing light beams provide more energy within a shorter interval, establishing the tracked object speed and range with a lower system latency.

Above incorporated U.S. Pat. Nos. 8,282,222 and 8,430,512, as well as U.S. Pat. No. 8,430,512, entitled PHOTONJET SCANNER PROJECTOR, the contents of which are incorporated in its entirety by reference herein, disclose various embodiments of full duplex illumination scanning imagining systems. Various disclosed systems may be full color Lidar triangulating systems. Any of the features disclosed within these patents may be adapted to be included in the various systems disclosed herein.

Figure 15:
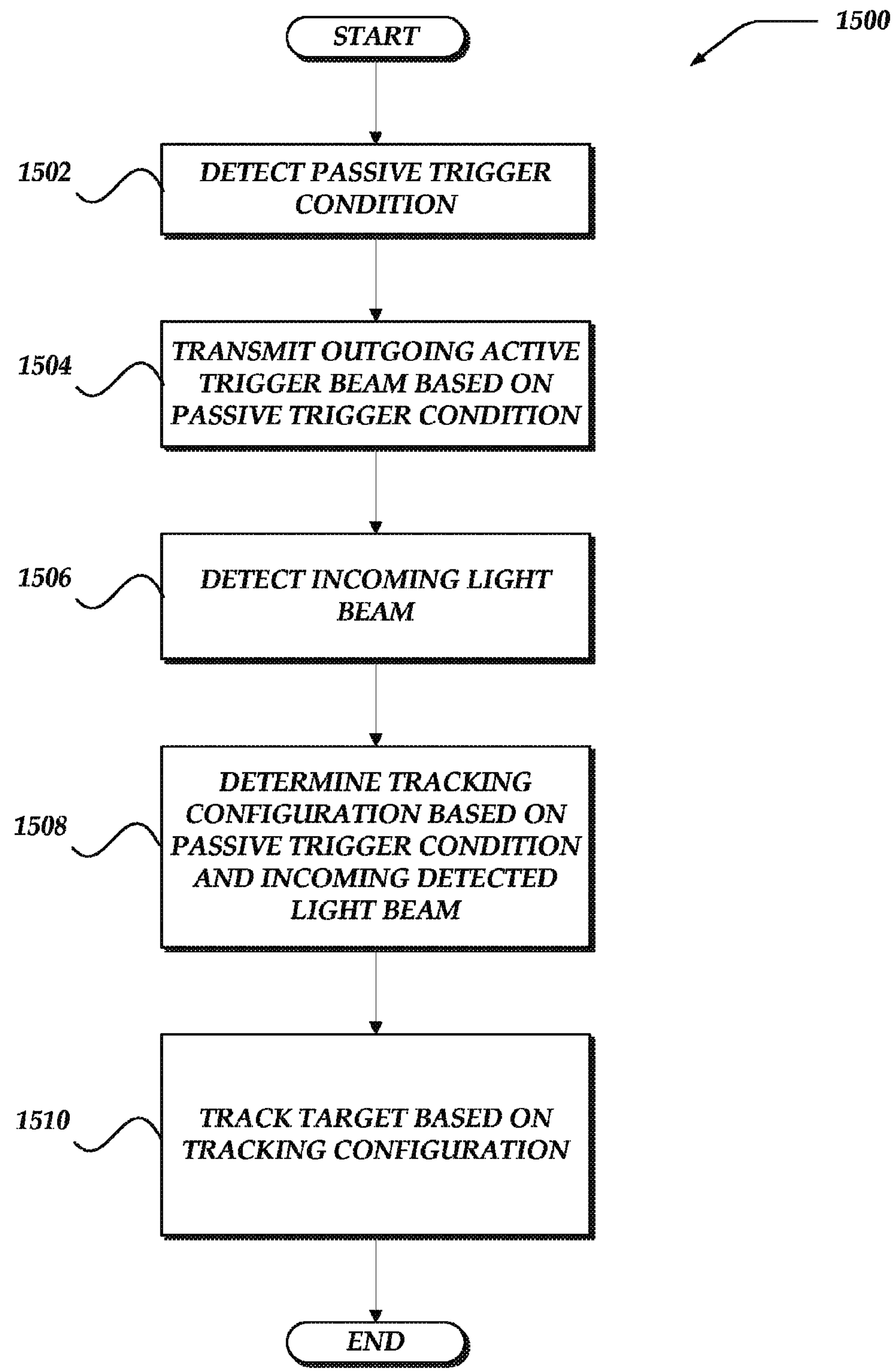
FIG. 15 shows a logical flow diagram generally showing one embodiment of a process for tracking a target based on passive and active trigger conditions.

For instance, systems 700 may employ a non-visible trigger outgoing light beam, i.e. an NIR trigger beam or an ultraviolet (UV) beam, trailed by a plurality of outgoing light beams of visible wavelengths, i.e. red, green, and blue (R, G, and B) beams. The visible beams may be intense pulses aimed at the target, in response to the detection of the trigger beam returning from the target. Systems that employ a non-visible trigger outgoing light beam are "stealthy" systems because the trigger beam is not detectable via a human eye and only the target is FoS for the visible trailing beams are limited to only illuminate the target. At least process 1500 of FIG. 15 show embodiments of passive and active trigger conditions.

Only during the brief illumination of the target via the visible beams would and a human eye detect the use of the system. The visible outgoing light beams may temporally be limited to short pulses (on the order of microseconds). Such systems have significant advantages in a hostile action-response environments, or any environment where detecting a target without being detected is advantageous.

In various embodiments, specific portions in the receiver's FoV may be excluded from the transmitters FoS, to prevent detection of the outgoing or incoming light beams, to limit the FoV to areas of interest, or to "stitch together" an array of like transmitters to prevent overlap and interference. For instance, as described in U.S. Pat. No. 8,282,222, the FoV may be limited by cloaking a camera lens from view during scanning. These methods additionally prevent the scanning beam from saturating the pixels in the receiver.

Figure 8:
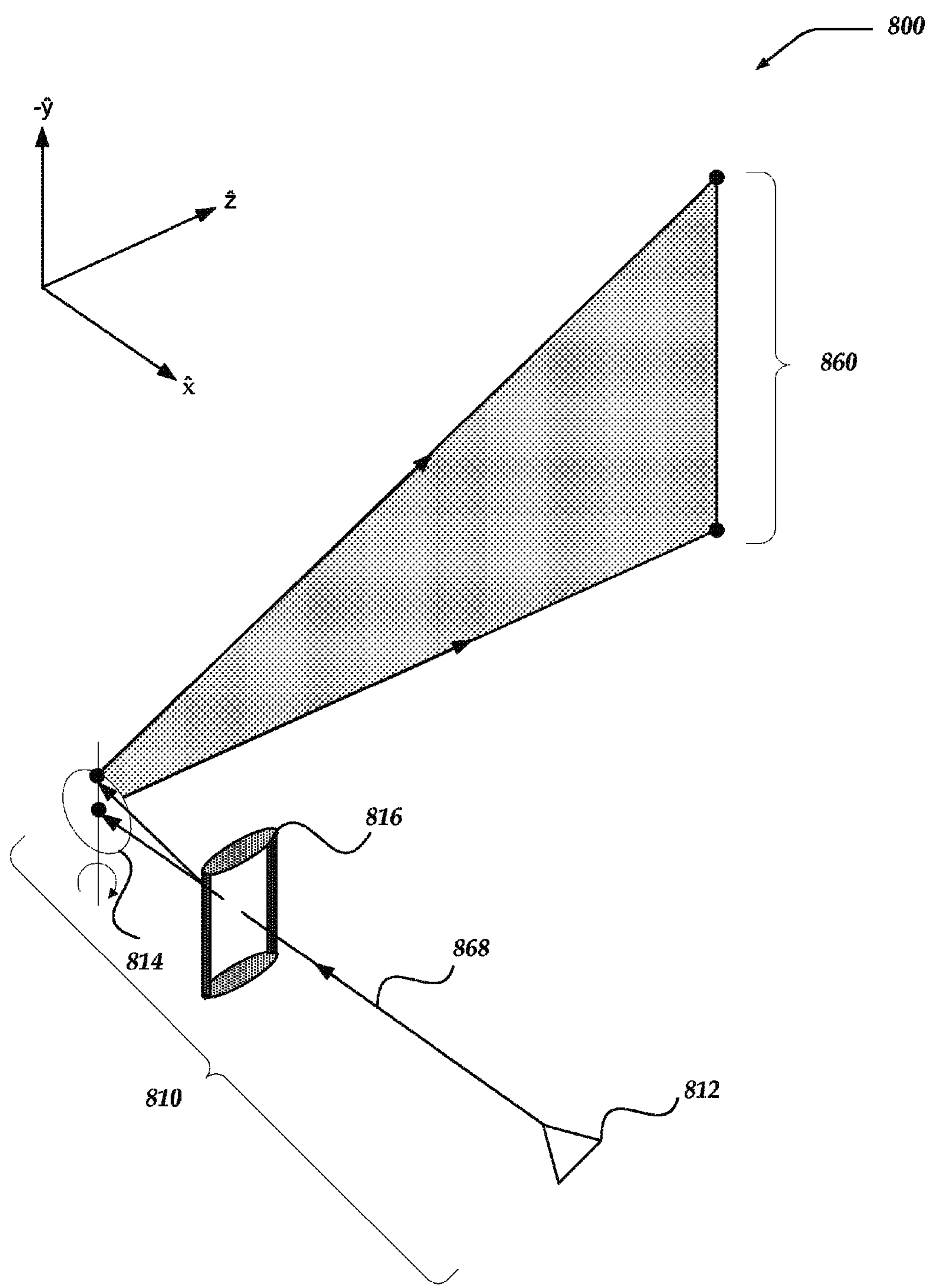
FIG. 8 illustrates a scanning light transmitter that transmits a fanned-out light beam.

FIG. 8 illustrates a scanning photon transmitter 810 that transmits a fanned-out light beam. Photon source 812 provides upstream beam 868, which is passed through a 1D collimator 816. 1D collimator 816 is positioned intermediate the light source 812 and the scanning mirror 814. 1D collimator 816 collimates upstream beam 868 in one dimension that is orthogonal to the transmission direction of upstream beam 868. However, upstream beam 868 fans-out in the dimension that is orthogonal to both the transmission direction and the collimated dimension of upstream beam 868. Scanning mirror 814 reflects upstream beam 868. Outgoing light beam 860 thus fans-out in the dimension that is not collimated. In preferred embodiments, the fan-out dimension is transverse to the scanning dimension. System 800 fans-out beam 860 at a specified opening angle. The opening angle may be varied based on trigger conditions, a proximate location or the target, and the like. The opening angle may be varied in response to the elevation or azimuth angles that are to be scanned. Note that the power density in fanned outgoing light beam decreases with the inverse square power law, were n=1. Accordingly, in embodiments where a fanned outgoing light beam is employed, the power of the transmitter may be increased. In at least one embodiment, 1D collimator 816 may be a cylindrical lens within the $\hat{y}$-$\hat{z}$ plane, where the cylindrical axis is parallel to the $\hat{y}$ axis.

Figure 9:
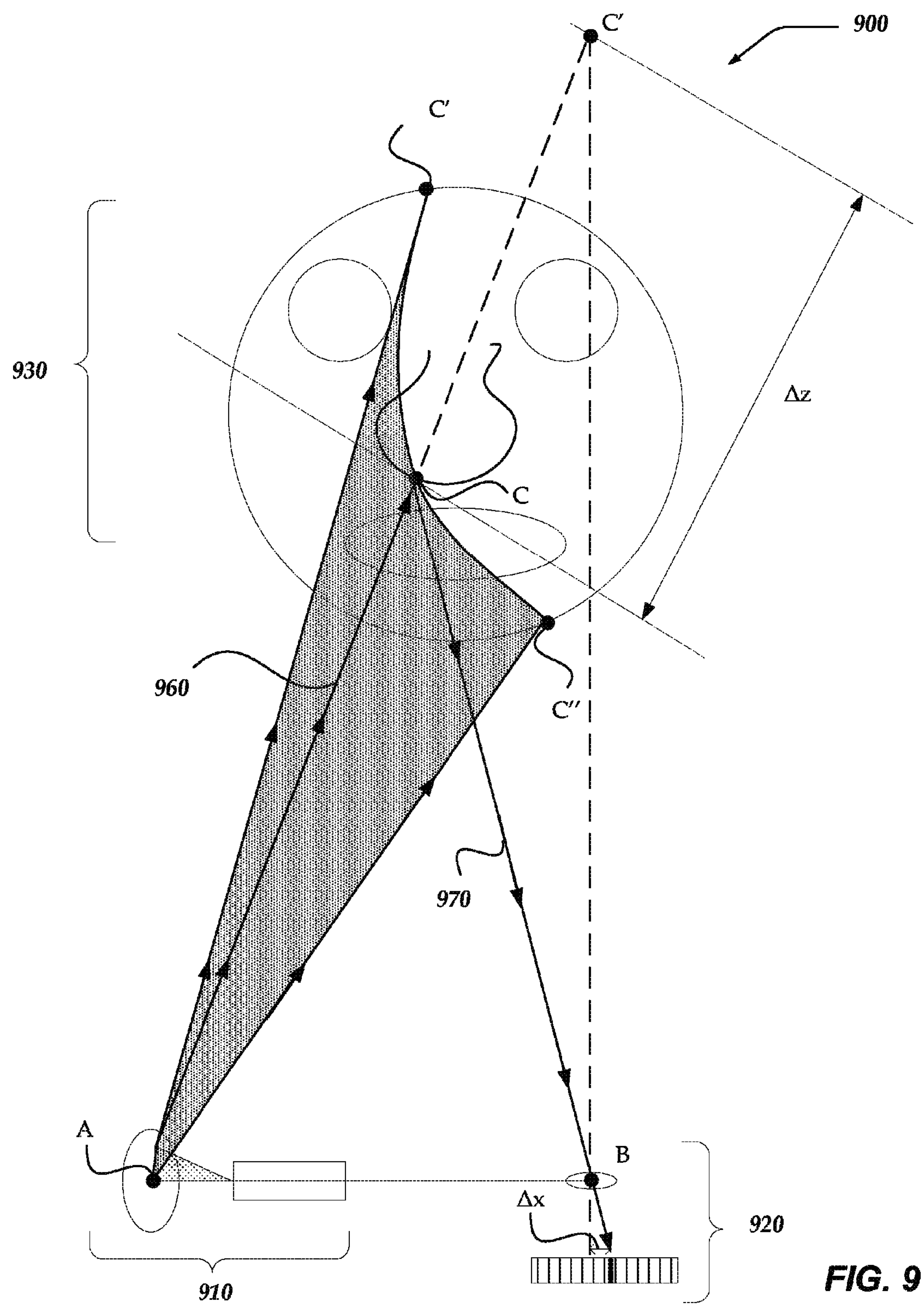
FIG. 9 illustrates a position tracking system, consistent with embodiments disclosed herein, that utilizes a fanned outgoing light beam to scan a 3D target.

FIG. 9 illustrates a position tracking system 900, consistent with embodiments disclosed herein, that utilizes a fanned outgoing light beam 960 to scan a 3D target 930. Transmitter 910 transmits fanned outgoing light beam 960. As shown in FIG. 9, 3D target 930 distorts the fanned outgoing light beam 960 along the $\hat{z}$ dimension. The $\hat{z}$ coordinates of the beam profile on target 930 generate at distortion of $\Delta z$ at point C (as shown by the hashed beam projections). $\Delta z$ may be a depth disparity between reflections from target points closer to the transmitter/receiver pair 910/920 (point C) and points farther away from the transmitter/receiver pair 910/920 (points C' and C").

Individual pixels in the asynchronous pixel array in receiver 920 detect the incident positions of the geometrically distorted incoming light beam 970. As shown by the hashed beam projections, when detected by the pixels in receiver 920, the depth disparity ($\Delta z$) results in an offset ($\Delta x$) in the pixel array, along the scanning direction. Because $\Delta x$ is a function of $\Delta z$, $\Delta x$ may be corrected for to accurately triangulated point C.

Figures 10A, 10B, 10C:
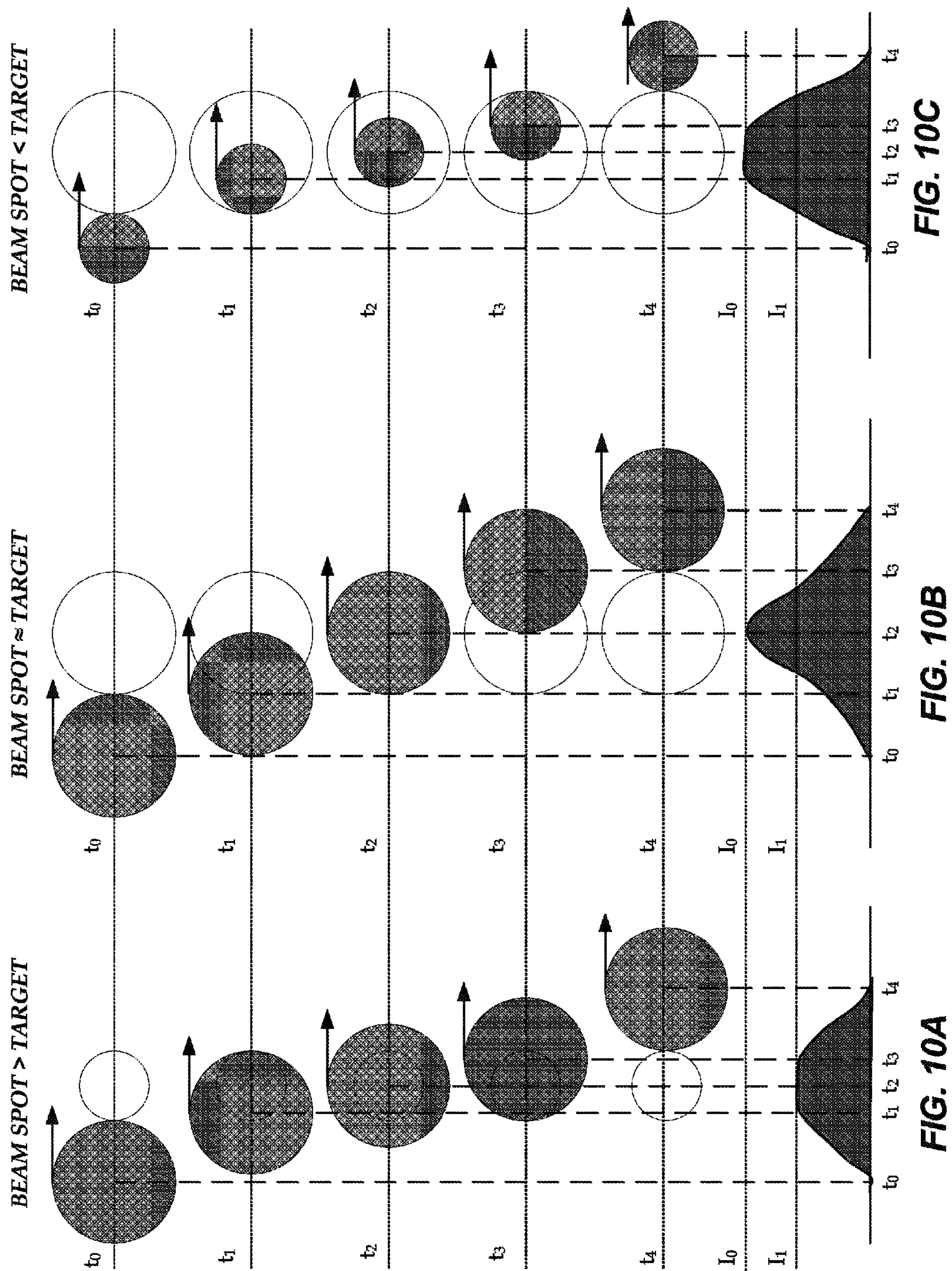
FIG. 10A illustrates the detection of a scanning beam spot, where the physical dimensions of the beam spot are substantially greater than the cross-section of the illuminated target.
FIG. 10B illustrates the detection of a scanning beam spot, where the physical dimensions of the beam spot are approximately equivalent to the cross-section of the illuminated target.
FIG. 10C illustrates the detection of a scanning beam spot, where the physical dimensions of the beam spot are substantially less than the cross-section of the illuminated target.

FIG. 10A illustrates the detection of a scanning beam spot, where the physical dimensions of the beam spot are substantially greater than the cross-section of the illuminated target. FIG. 10B illustrates the detection of a scanning beam spot, where the physical dimensions of the beam spot are approximately equivalent to the cross-section of the illuminated target. FIG. 10C illustrates the detection of a scanning beam spot, where the physical dimensions of the beam spot are substantially less than the cross-section of the illuminated target.

A comparison between FIGS. 10A, 10B, and 10C demonstrate a method of determining the size of the target relative to the size of the beam spot based on the response of the photon receiver in any of the embodiments disclosed herein. Thus, the systems disclosed herein may achieve a higher accuracy in tracking the target than otherwise would be enabled for a given pixel resolution of the employed photon receivers. By combining adjacent and successive pixel data within the photon detectors, using temporal and special interpolation and oversampling methods, for pixel data during when the scanning beam spot arrives at and leaves the target. As showing in FIGS. 10A-10C, the temporal and signal strengths of the beam profile may be employed to increase tracking resolution.

In each of FIGS. 10A, 10B, and 10C, the cross-section of the beam spot is represented by solid discs and the cross-section of the target is represented by the non-solid discs. The beam spot may be collimated or fanned in one or more dimensions, as shown in FIGS. 8 and 9. The position of the scanning beam spot, relative to the target, is shown at five consecutive time-slices: $t_0$, $t_1$, $t_2$, $t_3$, and $t_4$. The arrows at the top of each of the beam spots demonstrate the scanning direction. The bottom portion of each of FIGS. 10A, 10B, and 10C show the detected photon intensity (via a photon receiver as disclosed herein) as a function of time. The incoming (reflected from target) may be detected by a SPAD pixel array. $I_0$ represents the maximum detectable intensity (when the target is larger than the beam) of the incoming light beam and $I_1$ represents some detected intensity that is less than $I_0$.

As a comparison of the detected intensity curves of FIGS. 10A, 10B, and 10C, any of the systems and methods disclosed herein may determine the size of the target relative to the beam spot. For instance, as show in FIG. 10C, when the beam spot is smaller than the target, the detected beam profile (as a function of time) includes a “flat-top” at peak-intensity $I_0$. In contrast, when the size of the beam spot is approximately equivalent to the size of the target, the detected beam profile includes a characteristic sharp peak ($I \approx I_0$) occurring when the beam spot substantially illuminates the entire target. When the beam spot is larger than the target, the detected beam profile includes a “flat-top” at intensity $I_1 < I_0$. Thus, when the beam spot and the target are of disparate sizes, the beam profile is characteristically clipped, at intensities $I_1$ and $I_0$ respectively.

Figure 11:
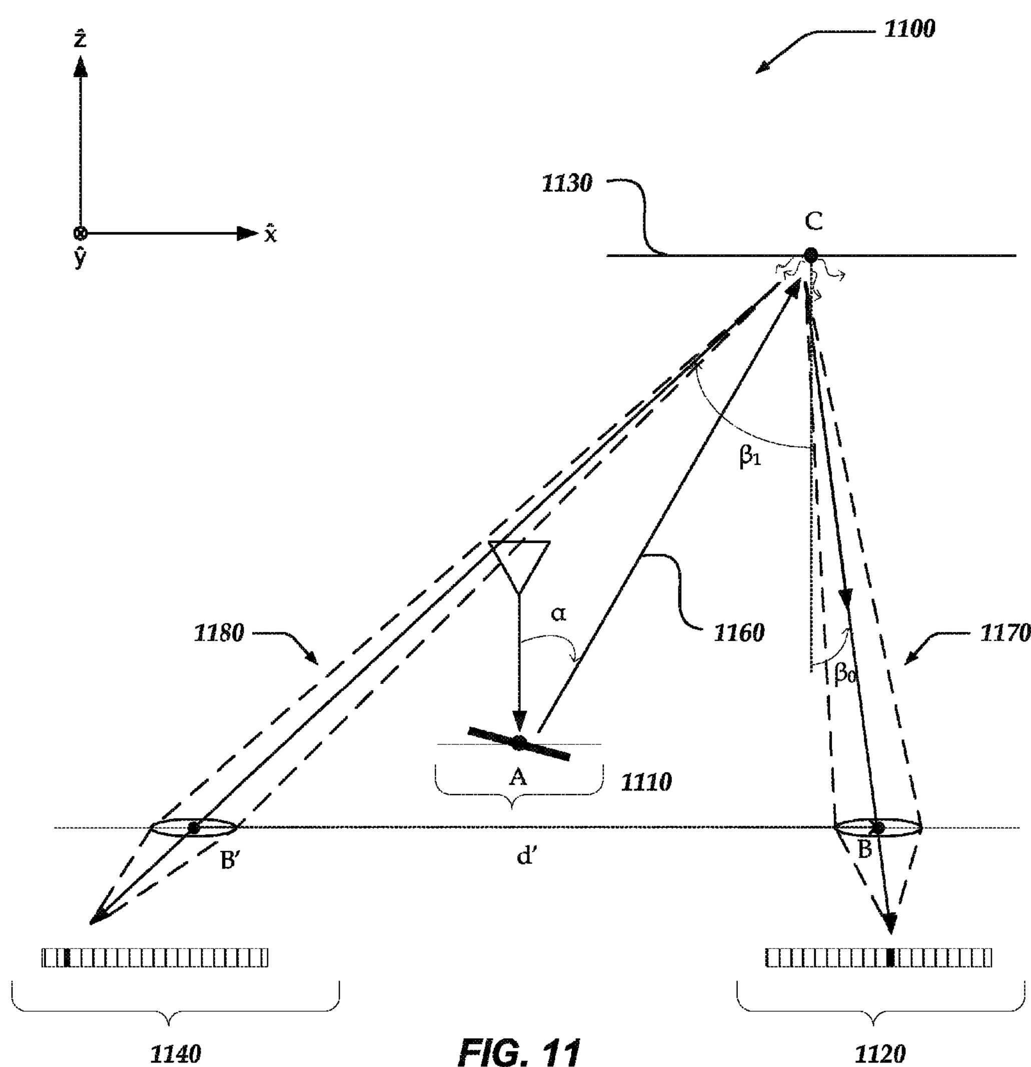
FIG. 11 shows a position tracking system 1100 that includes a plurality of light receivers that is consistent with the embodiments disclosed herein.

FIG. 11 shows a position tracking system 1100 that includes a plurality of photon receivers that is consistent with the embodiments disclosed herein. System 1100 includes photon transmitter 1110 (positioned at point A), a first photon receiver 1120 (positioned at point B), and a second photon receiver 1140 (positioned at point B'). First and second receivers 1120/1140 are offset (along the scanning direction) by a predetermined receiver offset distance d'. In some embodiments, system 1100 includes additional photon receivers. In at least one embodiment, system 1100 includes an array of photon receivers.

First photon receiver 1120 and second photon receiver 1140 may be a stereoscopic pair of photon receivers, i.e. a stereo camera system may be implemented in system 1100 by employing first and second photon receivers 1120/1140. As such, first receiver 1120 may be a “left” receiver and second receiver 1140 may be a “right” receiver, or vice-versa. At least one of first or second receivers 1120/1140 may include an array of SPAD pixels.

By employing a plurality of photon receivers, system 1100 is operative to generate a 3D image of target 1110, i.e. resolve the $\hat{z}$ component for points of the surface of target 1110, by a comparison between the left and right photon receivers via stereoscopic photogrammetry methods. Briefly, transmitter transmits a scanning outgoing light beam 1160. As shown in FIG. 11, currently scanning outgoing light beam 1110 is at an outgoing azimuth angle $\alpha$. Point C on target 1130 scatters outgoing light beam 1160. First receiver 1120 receives and detects first incoming light beam 1170 that is directed at a first incoming azimuth angle of $\beta_0$. Likewise, second receiver 1140 receives and detects second incoming light beam 1180 that is directed at a second incoming azimuth angle of $\beta_1$.

The first and second incoming light beams 1170/1180 are correlated with each other and the outgoing light beam 1160. The first and second incoming azimuth angles $\beta_0/\beta_1$ are determined based on which pixels the incoming light beams 1170/1180 illuminates in each of the corresponding SPAD sensor arrays. The position of point C ($C_x$, $C_y$, $C_z$) may be accurately determined based on knowledge of d' and the determination of first and second incoming azimuth angles $\beta_0/\beta_1$, i.e. triangulation methods employed on triangle B'CB. By employing at least a pair of photon receivers, system 1100 obviates the requirement for knowledge of the outgoing azimuth angle $\alpha$ to determine point C and track target 1130. Accordingly, system 1100 does not require a precise position feedback signal regarding the scanning mirror in the photon transmitter 1110.

Each of the first and the second receivers 1120/1140 has a unique perspective on target 1130. Accordingly, simultaneous use of both receivers 1120/1140 enables the resolution of ambiguities associated with both triangulation and ToF position tracking methodologies. System 1100 is operative to differentiate between multiple target positioned at similar azimuth angles, i.e. multiple targets positioned approximately at C.

Although not shown in FIG. 11, at least one of first or second receivers 1120/1140 may be approximately co-located with transmitter 1110, i.e. point A≈point B or point A≈point B'. In one exemplary embodiment point A and point B are approximately co-located and d'≈1 meter (m), i.e. second receiver 1140 is offset from first receiver 1120 and transmitter 1110 by about 1 m. Each of first and second receivers 1120/1140 includes an SPAD array of pixels with 20,000 pixels of resolution in the scanning direction (along the $\hat{x}$ axis). System 1100 is operative to determine $C_z$ in real or near-real time via triangulation based on the initial incoming photons detected from first and second incoming light beams 1170/1180.

System 1100 may optionally generate a timestamp for each of outgoing light beam 1160, first incoming light beam 1170, and second incoming light beam 1180 to generate a ToF for each detected beam. Accordingly, in addition to triangulation tracking, ToF tracking may be also be enabled. The out-of-plane techniques disclosed herein may be incorporated into system 1100.

Employing multiple photon receivers yields additional advantages. For instance, arrangements of multiple photon receivers enables “zooming-in” on a target of interest, in a similar manner to human visions. The multiple receivers may be correlated to perform vergence and/or foveation, similar to lifeforms with two eyes, i.e the simultaneous movement or restriction of the FoV of two or more photon receivers to obtain or maintain binocular tracking of the target. The movement or restriction of the FoV may be in opposite or the same directions for the two or more photon receivers. Trigger beams and/or multiple outgoing beams, such as those discussed in at least the context of FIGS. 7 and 15-16 may be used to recursively zoom-in from proximate locations to precision locations. Retro-reflection, such as that discussed in the context of at least FIG. 16 may be used to zoom-in on targets.

Figure 12:
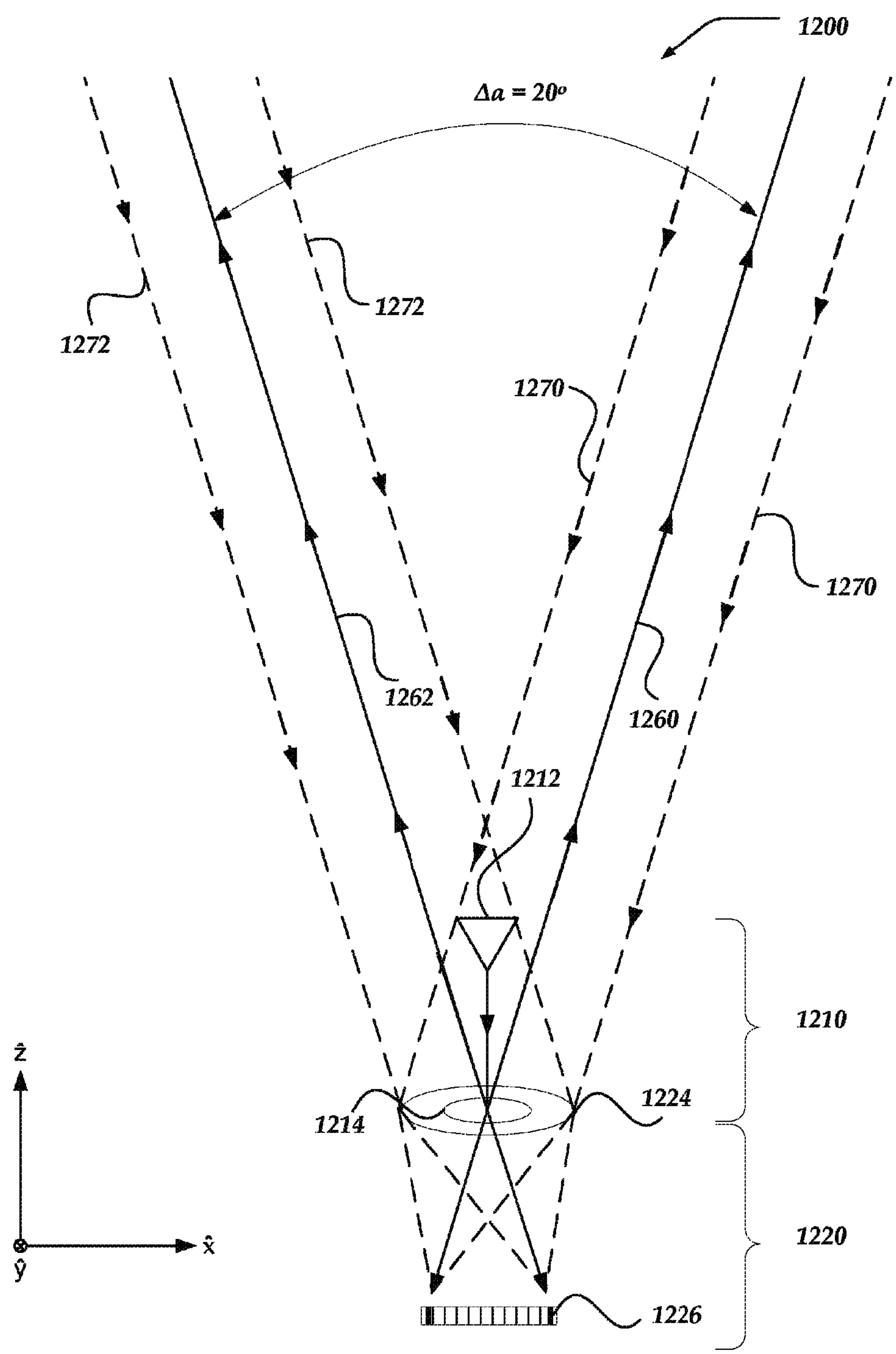
FIG. 12 illustrates another embodiment of a tracking system where the light transmitter is approximately co-located with the light receiver.

FIG. 12 illustrates another embodiment of a tracking system 1200 where the photon transmitter 1210 is approximately co-located with the photon receiver 1220. Because they are co-located, in at least one embodiment, the transmitter 1210 and the receiver 1220 are integrated together into a transceiver. System 1200 is an ultra-fast scanning ToF system. In some embodiments, the scanning frequency of system 1200 is at least 250 kHz. The transmitter includes a photon source 1212. The receiver includes a photon detector 1226. Photon detector includes a linear (1D array of 2000 SPAD pixels. In at least one embodiment, transmitter 1210 may include at least one scanning mirror 1214. Scanning mirror 1214 may include solid-state scanning optics, such as an optical phased array. Receiver may include a lens 1224. Optical elements in the optical systems of the transmitter 1210 and the receiver 1220, such as mirror 1214 and lens 1224 may be aligned, as shown in FIG. 12. In at least one embodiments, mirror 1214 is smaller than lens 1224. The physical dimensions of the scanning mirror 1214 may be on the order of ~1 mm. Scanning mirror 1214 may be placed in the center of system 1200. In at least one embodiments, mirror 1214 is placed just above photon detectors 1226 but with its central rotational axis going through the center of the aperture of system 1200.

The azimuth FoS of transmitter 1210 is $\Delta\alpha=20°$. The azimuth FoV of the receiver covers the same $\Delta\alpha=20°$. FIG. 12 shows the transmitter 1210 transmitting a first outgoing light beam 1260 at the right-most edge of the azimuth FoS. Upon being scattered by a target (not shown in FIG. 12) the corresponding first incoming light beam 1270 is shown. Like, transmitter 1210 is shown transmitting a second outgoing light beam 1262 at the leftmost edge of the azimuth FoS. The corresponding second incoming light beam 1272 is shown. Thus, the first and second outgoing light beams 1260/1262 are separated by a 20° azimuth angle.

With 2000 pixels, the line of sight of each pixel covers approximately 0.01° of the 20° FoV (and FoS). Thus, the spatial resolution of system 1200 is approximately 0.01°. At a target distance of about 5000 feet, system 1200 can resolve features on the order of 1 foot. Likewise, at a target distance of 1000 feet, system 1200 can resolve features on the order of ⅕ of foot.

At a scanning frequency of 250 kHz, the azimuth FoS and FOV is scanned every 2 μs. Thus, on average, each pixel is illuminated for approximately 1 nanosecond (the temporal resolution of system 1200). The temporal resolution scales with the scanning frequency. In preferred embodiments, the scanning frequency is decreased for longer-range targets. For instance, for targets that are approximately 5000 feet away, a scanning frequency of 50 kHz may be employed. For targets that are approximately 1000 feet away, a scanning frequency of 250 kHz may be employed. ToF issues and power losses of the incoming light beam may require a smaller scanning speed for long-range targets.

Figure 13:
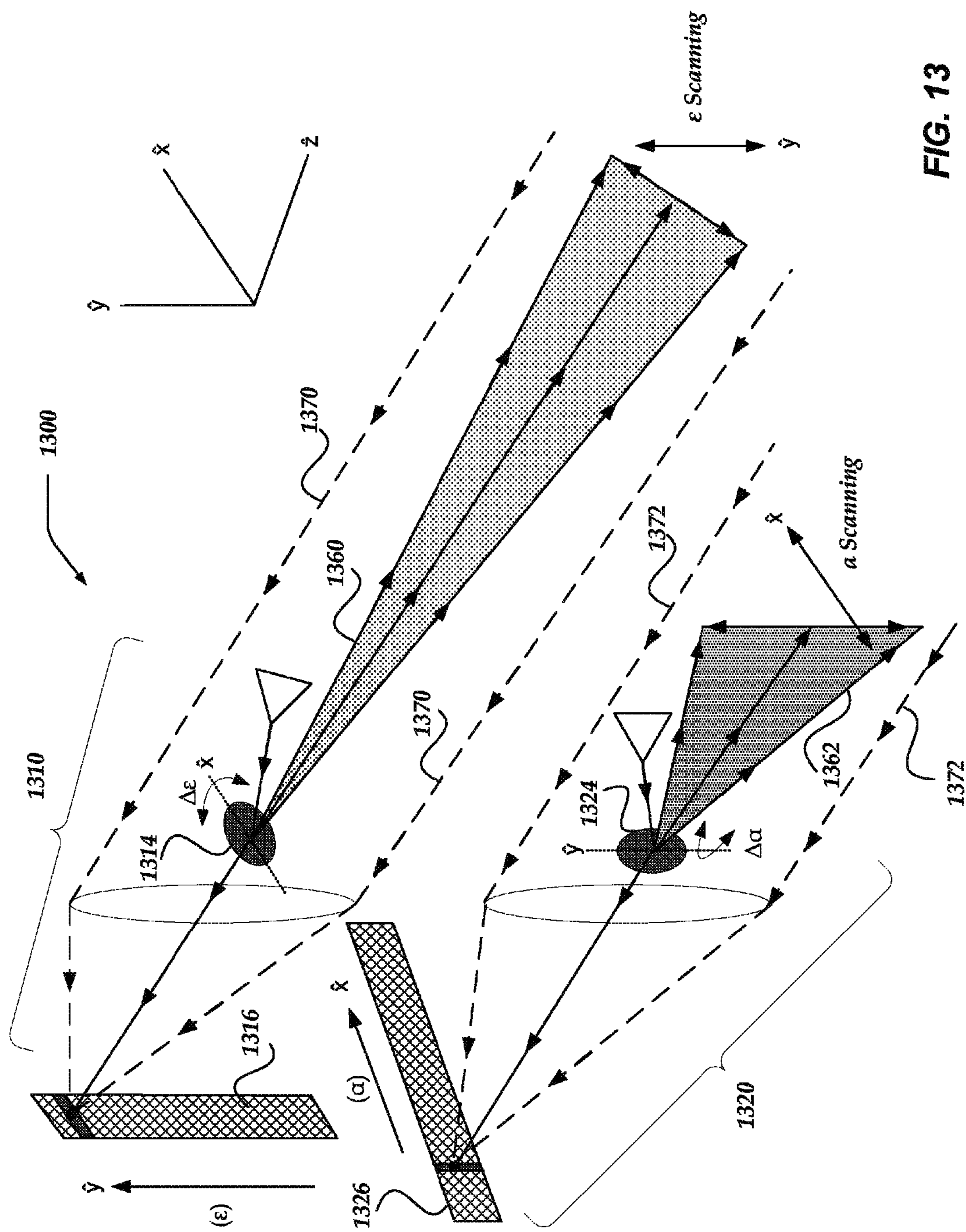
FIG. 13 shows a tracking system that employs a plurality of transceivers to generate orthogonally scanning beams and detect the incoming scattered beams.

FIG. 13 shows a tracking system 1300 that employs a plurality of transceivers to generate orthogonally scanning beams and detect the incoming scattered beam. System 1300 is operative to quickly determine precision target location. In various embodiments, system 1300 may accurately determine the location ($\hat{x}$, $\hat{y}$, and $\hat{z}$ coordinates) of the target in less than 2 microseconds.

System 1300 employs an elevation scanning transceiver 1310 to transmit an outgoing elevation scanning beam 1360. Elevation scanning transceiver 1310 includes an elevation-scanning mirror 1314 that is configured and arranged to rotate about a rotation axis that is parallel to the $\hat{x}$-axis. In some embodiments the outgoing elevation scanning beam 1360 is fanned-out in the $\hat{x}$ direction. Elevation scanning transceiver 1310 is operative to receive and detect incoming elevation scanning beam 1370, reflected from the target (not shown).

System 1300 employs an azimuth scanning transceiver 1320 to transmit an outgoing azimuth scanning beam 1362. Azimuth scanning transceiver 1320 includes an azimuth-scanning mirror 1324 that is configured and arranged to rotate about a rotation axis that is parallel to the $\hat{y}$-axis. In some embodiment, the outgoing azimuth scanning beam 1362 is fanned-out in the $\hat{y}$ direction. Azimuth scanning transceiver 1320 is operative to receive and detect incoming azimuth scanning beam 1372, reflected from the target (not shown).

Such systems are enabled to make two determinations of the location of the target. For instance, at least the $\hat{z}$ coordinate of the target may be determined by each transceiver 1310/1320, via the cross-hair intercept, resulting in an increased accuracy of the tracking. In some embodiments, epsilon scanning transceiver 1310 include a first photon detector 1316 that is operative to detect the incoming elevation scanning beam 1370 and resolve the corresponding incoming elevation ($\epsilon$) angle. Azimuth scanning transceiver 1320 includes a second photon detector 1326 that is operative to detect the incoming azimuth scanning beam 1372 and resolve the corresponding azimuth ($\alpha$) angle. At least one of first and second photon detectors 1316/1326 may include a 1D array of SPAD pixels. In some embodiments, at least one of first and second photon detectors 1316/1326 may include a 2D array of pixels.

In some embodiments, the pair of "cross angled" (orthogonal) transceivers 1310/1320 may transmit different wavelengths (with matching narrow band filters) to prevent interference if so required. In some embodiments, the pair of orthogonal transceivers 1310/1320 may include polarized photon sources and polarization filters. For instance, a diode laser may be employed to generate polarized beams.

Figure 14A:
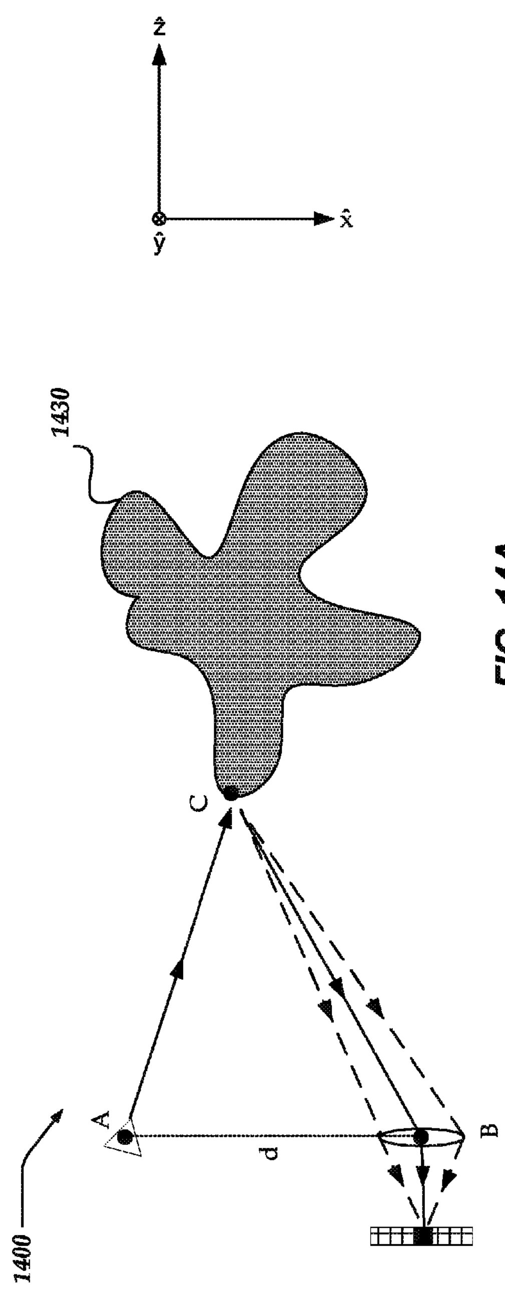
FIGS. 14A-14C shows a three-way hybrid tracking system 1400 that is consistent with the various embodiments disclosed herein.
Figure 14B:
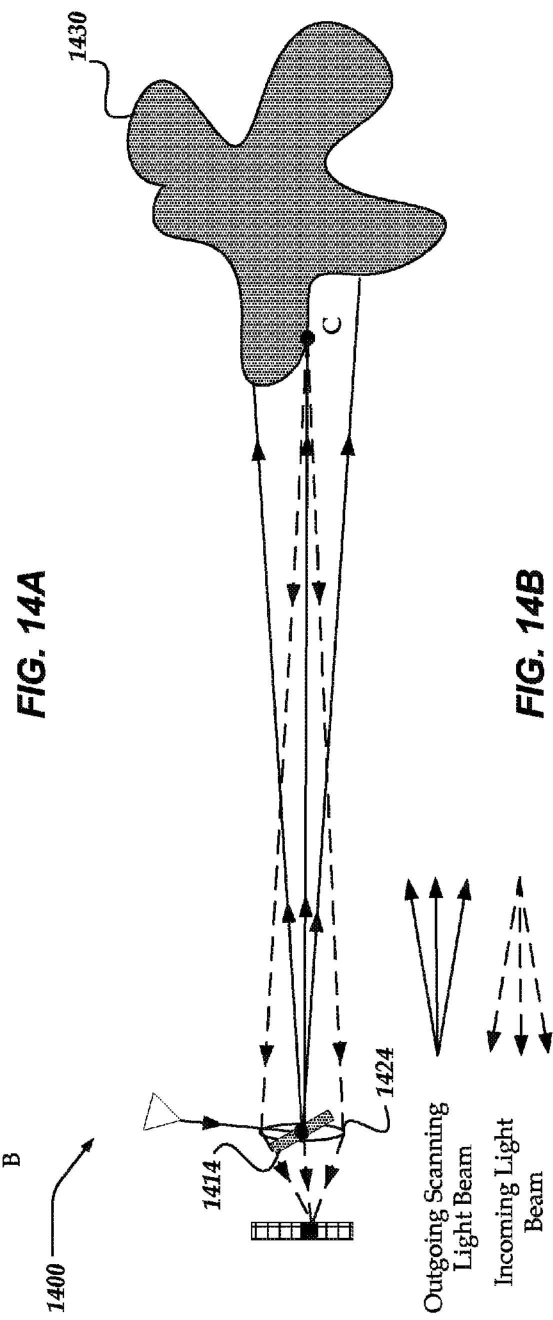
Figure 14C:
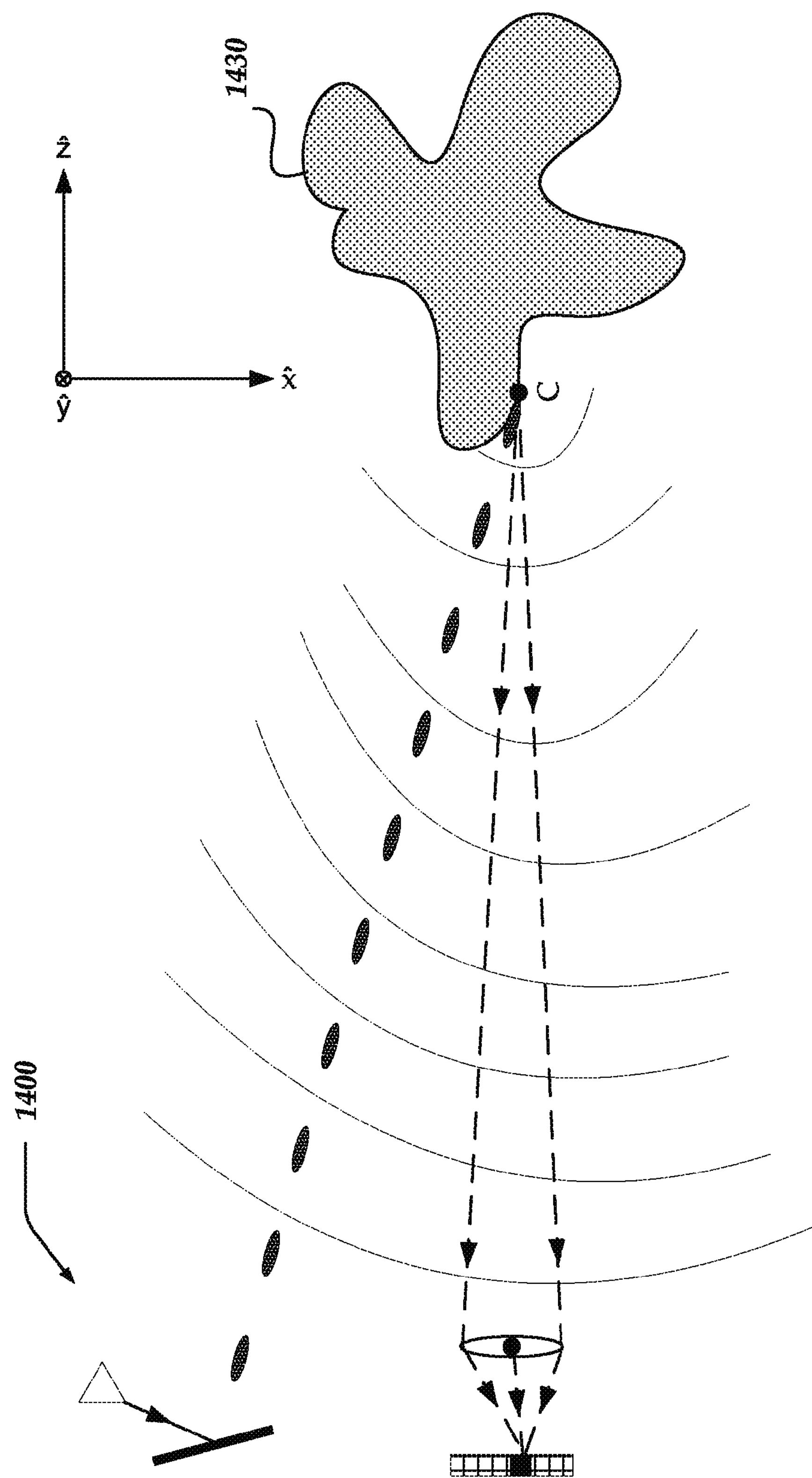

FIGS. 14A-14C shows a three-way hybrid tracking system 1400 that is consistent with the various embodiments disclosed herein. System 1400 is operative to track 3D target 1410 using photon triangulation, scanning ToF, and traditional ToF methods as described herein. These methods are combined within system 1400 to produce an ultra-compact tracking or ranging system that increase resolution, latency, and efficiency across the range of short, medium, and long distance 3D detection and motion tracking.

FIG. 14A demonstrates system 1400 tracking target 1430 at short range, i.e. that is the target distance is less than 500 feet. In FIG. 14A, system 1400 is being operated in a short-range mode based on the proximate short-range location of target 1430. At least $C_z$ is determined via triangulation based in the outgoing angles of the outgoing light beam and the incoming angles of the incoming light beam.

FIG. 14B demonstrates system 1400 tracking target 1430 at medium range, i.e. that is the target distance is between 500 feet and 1500 feet. In FIG. 14B, system 1400 is being operated in a medium-range mode based on the proximate medium-range location of target 1430. In FIG. 4B, the substantially co-located scanning mirror 1414 and the lens 1424 are shown. At least $C_z$ is determined via ToF. The specific embodiment employs temporal and spatial correlation of the outgoing angles of the outgoing light beam at the receiver and the incoming angles of the incoming light beam at a first receiver that is co-located at the transmitter (or at least the transmitter is a transceiver capable of transmitting and detecting light beams). The ultra-fast scanning system 1400 employs the first receiver to correlate the spatial and temporal coordinates (nanosecond precise arrival time and 1/100 degree precise azimuth direction) (incoming azimuth and elevation angles and incoming timestamp) of each incoming detected pulse uniquely with the corresponding prior departure (outgoing timestamp) and outgoing azimuth and elevation angles during a recent scan period.

FIG. 14C demonstrates system 1400 tracking target 1430 at long range, i.e. that is the target distance is greater than 1500 feet. In FIG. 14C, system 1400 is being operated in a long-range mode based on the proximate long-range location of target 1430. A plurality of low duty cycle, high-intensity pulses (short photon bullets ~100 picosecond long) are transmitted via the transmitter and reflected back from the target 1430. The return pulsed wave fronts are detected by the receiver and correlated with the outgoing bullets. The ToF of the bullets are used to determine the distance of the target. Optionally, a stereoscopic pair of receivers may be used to triangulate the target using this ToF method, whereby each receiver measures its distance to the targets, yielding two sides of a triangle and the known baseline separation distance between the receivers then enables the triangulation.

Illustrative Use Cases

Figure 16:
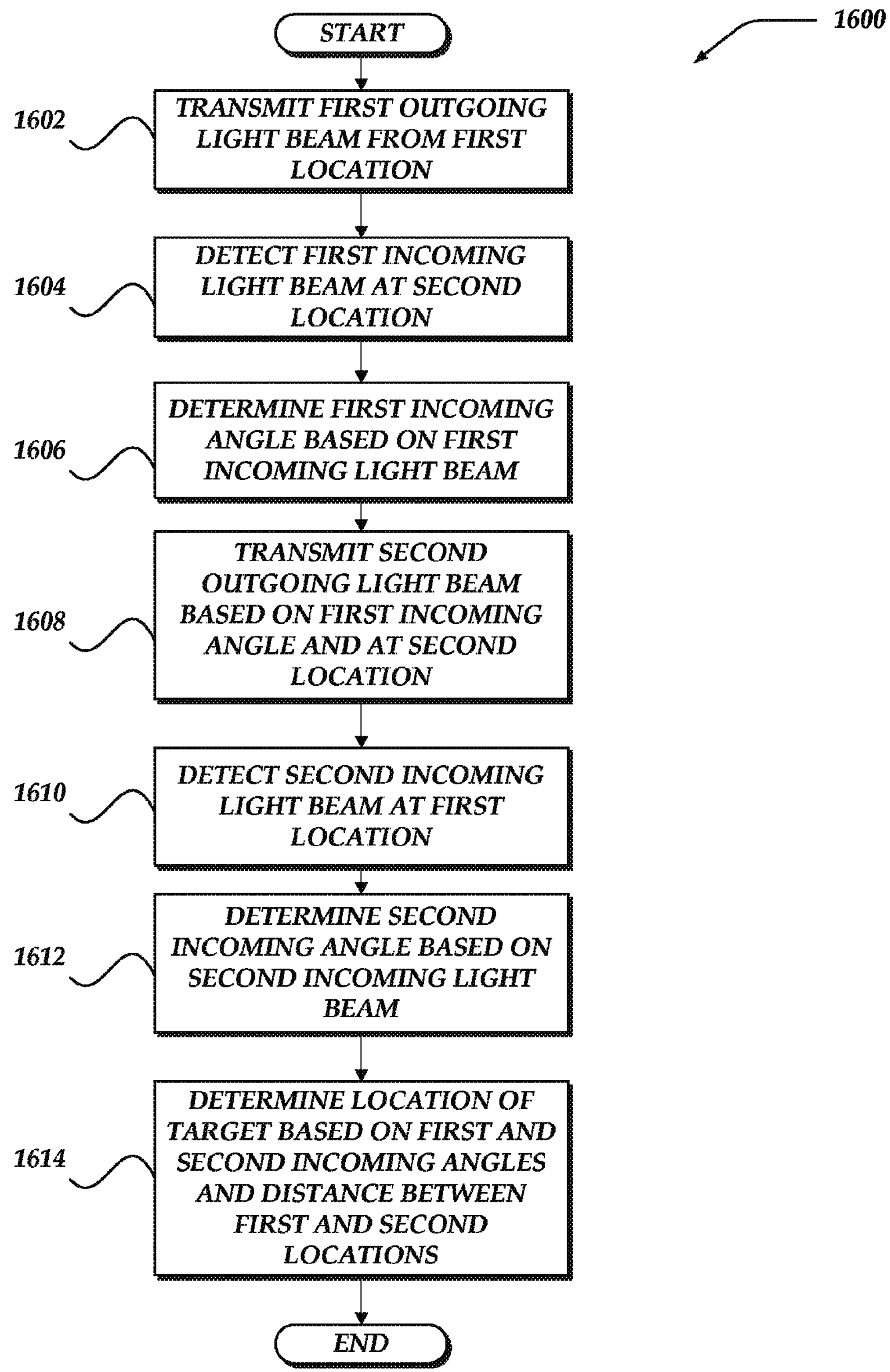
FIG. 16 shows a logical flow diagram generally showing one embodiment of a process for determining a triangulation value based on retro-reflection of outgoing and incoming light beams.

FIGS. 15-17 illustrate logical flow diagrams showing embodiments of various processes (processes 1500, 1600, and 1700 respectively) for determining tracking a target. It should be noted that any of processes 400, 420, and 440 of FIGS. 4A-4B may be adapted ot modified to incorporate any of processes 1500, 1600, and 1700. Likewise, any of processes 1500, 1600, and 1700 may be adapted and/or modified to incorporate any of processes 400, 420, and 420.

FIG. 15 shows a logical flow diagram generally showing one embodiment of a process 1500 for tracking a target based on passive and active trigger conditions. At least system 700 of FIG. 7 shows an embodiment of system that may include one or more trigger conditions. As discussed herein, various embodiments of tracking systems may be triggered via one or more trigger condition, i.e. an initial detection of an incoming light beam that may correspond to a target of interest. The trigger incoming light beam may have been previously transmitted by a tracking system (an active trigger condition) or the trigger incoming light beam may have originated from some other source (a passive trigger condition).

In response to an initial potential target detection, one or more (scanning) outgoing light beams may be deployed. These trailing outgoing light beams may confirm the detection of a target of via successive determinations of the position or location of the target. As discussed herein, these successive determinations of proximate and precision locations may be based on ToF and/or triangulation methodologies. The successive determinations quickly converge on an accurate and precision determination of the target's location or position.

FIG. 3 illustrates triangulation via triangle ABC, where the scanning is performed in one dimension (scanning in the azimuth angles). FIGS. 6A-6B demonstrate triangulation, where the scanning is performed in two dimensions (fast scanning in azimuth angles and slow scanning in the elevation angles). As shown in FIGS. 8 and 9, an outgoing active trigger beam may be a vertical light blade that is fanned-out in the elevation angles to detect a potential target positioned within a few degrees of the $\hat{x}$-$\hat{z}$ plane. In other embodiments, the active beam is fanned out in the azimuth angles and collimated in the direction corresponding to the elevation angles. Fanning-out the triggering beam may provide early detection of an incoming long-range target, such as a missile. However, fanning-out an outgoing light beam over long ranges requires additional energy, as the fan-out induces 1/r power losses. The outgoing active trigger beam may be a visible or a non-visible beam.

A passive trigger condition may include the detection of photons emitted by or reflected from a target, wherein the detected photons did not originate from the tracking system. The detected photons may have been emitted from the target, e.g. the target may be a photon source on the target, or photons reflected by the target, e.g. the target may be drone aircraft that is illuminated by star light.

Process 1500 begins at block 1502, where a passive trigger event is detected. For a cloaked early detection trigger, a tracking system may employ a cloaked early detection passive trigger. A scanning pixel array that is sensitive to short wave infrared (SWIR) photons may scan the sky. The system may detect a passive trigger condition in the sky (FoV), such as a "hot spot" generated by rocket or missile exhaust, via the SWIR array. Such a system may employ a high powered scanning telescope. The system is cloaked because the trigger is passive, i.e. the system is not required to transmit a triggering signal and is thus stealthy. i.e. less likely to be detected by another party.

The 2D SWIR-sensitive pixel array passively (in the absence of an outgoing illuminating beam) detects the hot spot within a cold background. The SWIR-sensitive array may be a SWIR SPAD pixel array. A few pixels in the SWIR SPAD array are triggered (avalanche) in response to incoming photons originating for the hot spot. The system determines the incoming azimuth and elevation angles based on the optical line of sights of the triggered pixels within the FoV, e.g. $\alpha \approx +13°$ and $\epsilon \approx +5°$. Accordingly, a proximate position of the target within the FoV is approximately known. Additional observations, performed by trailing transmitted beams, may be employed to determine the distance to the target. Additional observations enable the accurate resolution of the $\hat{x}$, $\hat{y}$, and $\hat{z}$ coordinates of the target accurately be resolved.

A fast missile may be detected across several SWIR pixels at approximately similar elevations. An incoming timestamp is generated for each triggered pixel, e.g. several SWIR pixels are triggered asynchronously and/or sequentially. Accordingly, the tracking system may rapidly determine the azimuth velocity (horizontal rotational speed) across the horizon. A plurality of software-defined trigger condition may be configured. The software trigger conditions enable filtering and prioritizing the detection of high speed objects (such as missiles or rockets).

In some embodiments, a fanning array detector with a passive SWIR trigger is employed. A combination of SWIR-sensitive array of pixels and scanning optics scan through elevation angles. For example, a slow scanning, large aperture (to increase the likelihood of detecting a photon) vertically scans the sky. Anti-elevation or anti-epsilon mirrors direct the incoming SWIR photons into the horizontal plane. The passive trigger may be a SWIR boot trigger.

In at least one embodiment, a combination of active and passive triggers are employed in the tracking system. At block 1504, an outgoing active trigger beam is transmitted. In at least one embodiment, the active beam is transmitted in response to detecting the passive trigger condition at block 1502. The outgoing active trigger beam may be based on the detected passive trigger condition. In response to triggering the SWIR array, the active trigger beam may be a non-visible beam scanned in a limited area of the receiver's FoV based on the line-of-sight of the illuminated pixels in the SWIR passive trigger array. The sequence of detecting an initial passive trigger condition and transmitting an outgoing active trigger beam may a trigger escalation sequence.

Upon, and in response to the detection of the passive SWIR trigger condition, the outgoing active trigger beam may be configured to scan to relevant portions of the receiver's FoV, i.e. based on the passive trigger condition. In the above example, the FoS for the trigger beam to scan the outgoing elevation angles $+3° \leq \epsilon \leq +7°$. Narrowing the relevant FoV to 40 decreases the required system power and response time. In at least one embodiment, the outgoing active trigger beam may be fanned-out to illuminate these elevation angles. In various embodiments, the active trigger beam is configured to perform high speed scanning (~25 kHz) across the entire outgoing azimuth FoS.

At block 1506, an incoming light beam is detected. The beam corresponds to the outgoing active trigger beam that is reflected at the target. Accordingly, the detected incoming light beam may be an incoming active trigger beam. At block 1508, the tracking configuration may be determined based on at least one of the passive trigger condition or the detected incoming light beam. The passive trigger condition and the incoming light beam may provide proximate target locations, velocities, and the lack. As discussed in at least the context of blocks 402 and 414 of process 400 of FIG. 4A, the tracking configuration may be determined or updated based on proximate locations, velocities, and the like of the target.

For instance, detecting the incoming light beam that corresponds to the outgoing active trigger beam will confirm the proximate location of the target at $\alpha\approx+13°$ and $\epsilon\approx+5°$ within at most 40 microseconds. In another embodiment, the active trigger beam flashes a NIR pulse in the outgoing azimuth angles near the proximate azimuth angles where the SWIR boot trigger initially detected the target, i.e. $\alpha\approx+13°$. Such embodiments are stealthy and require less power due to the reduction in outgoing trigger beams. However, these embodiments may be preferred for slow moving targets where the target's azimuth position has not significantly changed between the detection of the SWIR passive trigger condition and the transmission of the active trigger beam.

Accordingly, the time interval between detecting the SWIR passive trigger condition and the confirmation of the target's proximate location via the detecting the incoming light beam that corresponds to the active trigger beam is in the order of 40 microseconds (the system's maximum latency). This maximum latency may also include the transmission time and the return time of the trigger beam (~6 microseconds per km). The system confirms the proximate location of the target within the receiver's FoV ($\alpha\approx+13°$ and $\epsilon\approx+5°$). The receiver is configured to update the tracking configuration, including at least the active pixels in the receiver's FoV and the scanning angles in the transmitter, in response to the confirmation of the target's proximate location.

At block 1510, the system tracks the target based on the determined and/or updated tracking configuration, as discussed in at least the context of processes 400, 420, and 440 of FIGS. 4A, 4B, and 4C respectively. The system's transmitter may scan the target with an outgoing scanning beam. Scanning in two dimensions at frequency of 25 kHz, the system detects the target twice every 40 microseconds. When scanning in one a single direction (the outgoing light beam is turned off when the rotating mirror rotates back at the end of a scan line) target detection occurs approximately once every 40 microseconds. The determination of the precision location of the target (determining each of the $\hat{x}$, $\hat{y}$, and $\hat{z}$ coordinates) is based on the optical line of sight (the incoming azimuth and elevation angles) of the avalanched pixels and the corresponding outgoing azimuth and elevation angles of the corresponding outgoing light beam, e.g. triangulation methods.

In addition to determining the target's position via triangulation, the position may be determined via various ToF methods. One such ToF method includes a "boomerang" method. In response to detecting the return of the outgoing light beam, via scattering from the target, the system terminates the transmission of the outgoing light beam. The decay time of the detected signal corresponds to the time interval between terminating the transmission of the outgoing light beam and the loss of the corresponding signal at the receiver. The decay time corresponds to the ToF of the returned outgoing light beam. The boomerang method for ToF may be preferred when the cross section of the target is larger than the FoS, i.e. when the target subtends angles larger than the angular range of the FoS. Otherwise, uncertainty in the ToF may be introduced due to the phase of the scanning beam. Thus, larger targets, slower scan speeds (hundreds of microseconds), and target distances less than 1 km are preferred when employing boomerang ToF determinations.

Another embodiment to determine to the ToF includes the employment of one or more additional photon sources that are of a different wavelength than the first outgoing light beam. In response to the receiver detecting the return of the first outgoing light beam, the transmitter (or another light source) transmits a second outgoing light beam of a different wavelength than the first outgoing light beam (at the same outgoing azimuth and elevation angles). The time interval between the receiver detecting the return of the first outgoing light beam and the receiver detecting the arrival of the second outgoing light beam (of the different wavelength) corresponds to the ToF of the outgoing light beams.

This method may introduce phase ambiguities into the determination of the ToF. For instance, if a target is approximately 2 km away, the second outgoing light beam takes approximate 12 microseconds to return to the receiver. However, the second outgoing light beam may be delayed by another 10 microsecond if the scanning second beam was scanned off the target just before the arrival of the first beam. These phase ambiguities may be corrected for via other methods discussed herein. For instance, by narrowing the outgoing FoS to correspond with receiver's line of sight of the target.

FIG. 16 shows a logical flow diagram generally showing one embodiment of a process 1600 for determining a triangulation value based on retro-reflection of outgoing and incoming light beams. Preferred embodiments employ retro-reflection to determine a triangulation value. In such embodiments, each of the transmitters and the receivers may be transceivers. That is, the transmitter and the receiver are each operative to transmit outgoing light beams, as well as receive and detect incoming light beams (or pairs of transmitter/receivers are co-located).

After a start block, process 1600 proceeds to block 1602, where a first outgoing light beam is transmitted from a first location. At block 1604, a first incoming light beam is detected at a second location. The first incoming light beam corresponds to the first outgoing light beam that is reflected at the target. At block 1606, a first incoming angle of the first incoming light beam is determined. Accordingly, determining the first incoming angle may be based on detecting the first incoming light beam. At block 1608, a second outgoing light beam is transmitted at an outgoing angle that is based on the first incoming angle and at a second location. The first and second locations are separated by a non-zero distance. The second outgoing light beam may be a retro-reflected, or a return-to-sender beam.

When the receiver detects the first incoming light beam (sent from a transmitter at the first location) in a particular location within its FoV (for instance the first incoming angle, which may be $\alpha\approx+13°$ and $\epsilon\approx+5°$), the receiver (positioned at the second location) is operative to transmit the second outgoing light beam in a direction centered on the detected direction (the first incoming angle, thus retro-reflecting). If the trajectory of the target is known, the receiver may correct and send the second outgoing light beam in a direction where the target is expected to be, i.e. based on the first incoming angle. Thus, he receiver, at the second location, transmits a return-to-sender ping or echo.

At block 1610, a second incoming light beam is detected at the first location. The second incoming light beam corresponds to the second outgoing light beam that is reflected at the target. The transmitter that transmitted the first outgoing light beam may be operative to receive and detect the second incoming light beam. At block 1612, a second incoming angle of the second incoming light beam is determined. Accordingly, determining the second incoming angle may be based on detecting the second incoming light beam.

At block 1614, a location of the target is determined. The location may be determined based on the first and second incoming angles and the distance between the first and second locations. The location of the target may be a proximate location or a precision location. A triangulation value may be determined based on the first and second incoming angles and the distance between the first and second locations.

If the target is still within the corresponding angular range when the second outgoing light beam arrives at the target, the transmitter, at the first location, will detect the returned second outgoing light beam. Thus, two triangulation-based determinations of the target position may be determined. Additionally, two ToF determination may be made. The multiple determinations enable a more accurate resolution of the tracking system. The resolution of the triangulation based determinations depends on the offset distance between the transmitter(s) and the receiver(s) (distance between the first and the second locations) and the resolution of the determination of the incoming angles of the incoming light beams. Note that the precise determination of the outgoing angle of the first outgoing light beam is not required (as it is in standard triangulation). Accordingly, similar to stereoscopic pairs of transmitter and receivers, discussed in the context of at least FIG. 11, position feedback loops for scanning MEMS mirrors are not required. The resolution of the ToF based determination depends on the accurate correlation between the outgoing and incoming timestamps. As discussed in at least the context of FIG. 7, a sequence of (R,G,B) outgoing light beams may trail the trigger beam, to generate color images of the target. Color illumination, and the resulting increased (color) contrast observations may also be used to create clearer fiducial image pair correspondences required for a more accurate stereoscopic photogrammetry.

In an exemplary embodiment for determining the position, via triangulation, of a short-ranged target (target distance≈300 meters (m)), the offset distance between the transmitter/receiver pair is 1 meter, i.e. d=1 m, and the FoV in the azimuth incoming angles is 20°. If a SPAD array includes 20,000 pixels, then each degree in the azimuth is 1000 pixels wide. So the azimuthal resolution (Δβ) is 1E-3 of a degree. Accordingly, at 300 meters, the triangulation accuracy≈156 cm.

To estimate the ToF range ambiguity, consider a 50 kHz scanning system across a 20° azimuth FoV. The receiver's pixels are scanned every 10 microseconds (bi-directional scanning). If the elevation angles are scanned over, the period to return to a specific pixel is increased based on the elevation scan frequency and range. For instance, if the elevation angles include 1000 scan lines, then the period increases to 10 milliseconds (ms) (or 10 million nanoseconds). Outgoing and incoming photons would make a 1000 mile round trip in 10 ms. Thus, the signal doubles up at a target distance of about 1500 km. Due to the r^2 power loss of the reflected beam, a target at 500 km would provide a returning signal that is 16×s stronger than a target at 2000 km. So, the intensity of the incoming light beam provides a basis to discriminate the ToF for doubled up signals.

In various embodiments, the intensity of the outgoing light beams are adjusted to match a target range, or spatial-temporal combination of outgoing light beam pulses. The intensities of the outgoing light beams may be varied as a function of time, e.g. low intensity pulses at a high spatial frequency combined with high intensity (or energy) pulses at a lower frequency for early detection of targets at longer ranges.

In 1D scanning embodiments, for targets positioned at about a range of 1.5 km, there is no ambiguity on the tracking. The ToF for the 3 km round trip is about 10 microsecond. A scanning frequency of 50 kHz would result in hitting illuminating each pixels about every 10 microseconds, i.e. the receiver would detect about 100,000 signals or hits per second. Thus, resulting in substantially no range ambiguity.

Some embodiments perform bi-directional triangulation of the target by employing a stereoscopic pair of transmitters and receivers. For instance, see FIG. 11. U.S. Patent Publication No. 2013/0300637, entitled SYSTEM AND METHOD FOR 3-D PROJECTION AND ENHANCEMENTS FOR INTERACTIVITY, the contents of which are incorporated in its entirety herein, describe head-mounted stereoscopic pairs of receivers and transmitters (or projectors and detector pairs) also describe stereoscopic photogrammetry methods.

In 2D scanning (azimuth and elevation) embodiments, Lissajous scanning may be employed. In such embodiments, triangulation-based tracking may be combined with ToF-based tracking to accurately track the target. An anti-elevation or anti-epsilon mirror may be employed in the receiver. The optical components that scan the elevation in the transmitter and the receiver may be out of phase to correct for ToF effects, i.e. the receiver's anti-epsilon mirror may lag the transmitter's mirror. The Lissajous loops may be open or closed loops.

In some scanning embodiments, one of the two scanning axes (azimuth or elevation) is scanned at a high frequency, while a second axis is scanned (elevation or azimuth) at a lower frequency. The fast axis scan may employ a MEMS mirror in a high speed resonance scanning motion, e.g. azimuth (i direction) as in cathode-ray-tube (CRT) systems (e.g. 25 kHz scanning left to right in 20 microseconds and back again in another 20 microseconds for a total harmonic oscillating scan period of 40 microseconds). In such embodiments, the elevation ($\hat{y}$ direction) scan is slower and insures that the line spacing is sufficient to ensure coverage and resolution vertically across the FoV.

In contrast to CRT-type scanning, Lissajous scanning may obviate the need to scan each pixel in the entire FoV in each scanning period. Lissajous scanning provides several advantages over CRT-type 2D scanning. One advantage of Lissajous scanning is that when both azimuth and elevation axes are fast axes, there is a more uniform "coverage" across the FoV. Essentially, in contrast to CRT-type scanning, Lissajous scanning need not illuminate the pixels in a contiguous fashion. This results in a smaller average system latency, or gap between detection beam sweeps. The scan illuminates the FoV more uniformly. Thus, the probability of resolving the target location is increased. Lissajous scanning may generate scanning gaps in the FoV based on whether the azimuth and elevation scan frequencies are multiples of each other, and whether the phase angle offset between the beams results in a closed or open Lissajous scan pattern.

Lissajous scanning may be advantageous to track long range targets that are relatively small, i.e. the angular extent of the target is less than the size of the beam spot at the target (see FIG. 10A). As shown in FIG. 10A, the power of the signal returned to the receiver is relatively low. Such a target may be difficult to detect. By employing Lissajous scanning, early detection favors a coarser (wider) scan patter, thus illuminating the FoV with a fast, broad 2D, non-sequential scanning patterns in the horizontal and vertical scanning directions.

A high scan rate in the elevation axis enables faster detection of the target within the FoV. The travel time of the outgoing and incoming light beams introduce an offset from the transmitter's elevation direction at the time of transmittance and the receiver's elevation direction at the time of detection. See FIG. 6B.

FIG. 17 shows a logical flow diagram generally showing one embodiment of a process 1700 for controlling the optical systems of transmitters and receivers based on ToF observations. After a start block, process 1700 proceeds to block 1702, where a first pixel signal is detected in a first frame. The first pixel signal is triggered from a first incoming light beam corresponding to a first outgoing light beam. At block 1704, a second pixel signal is detected in a second frame. The second pixel signal is triggered from a second incoming light beam corresponding to a second. outgoing light beam. In block 1706, a ToF is determined based on a frame rate and a distance between the first and second pixels that generate the first and second pixel signals. Determining the ToF may include determining a time interval. At block 1708, a phase difference ($\Delta\epsilon$) is determined between the transmitter and the receiver based on the ToF. At block 1710, the tracking configuration is updated based on the phase difference.

At least FIG. 6B discusses embodiments, where including a phase difference between the optical systems of the transmitter and the receiver is preferred. For instance, the receiver detects a first incoming light beam, reflecting from a previous elevation angle of the transmitter. This offset in transmitter/receiver elevation angles is a function of the ToF on the outgoing and incoming light beams. Thus, the phase between the transmitter's and the receiver's elevation angles may be adjusted based on the ToF information, i.e. determining the phase difference. Accordingly, various embodiments may filter on ToF range using anti-epsilon mirrors in the receivers, that are out of phase, or lag, the elevation angles in the transmitter. Such a phase difference may be represented by $\Delta\epsilon$, which corresponds to the ToF tracking measurements.

In some embodiments, a receiver includes a precisely controlled anti-epsilon mirror and a 1D 1000 SPAD pixel array. When an incoming light beam is detected, the position of the illuminated pixel may be used to determine $\Delta\epsilon$ (ToF estimation), as discussed in the context of FIGS. 5-6B. If the system scans 1000 lines per frame in 10° (elevation resolution is 100 lines per degree) runs at 50 frames per second (fps) (50,000 lines per second @20 microsecond per line), then a two-line lag (1/50° vertical offset) signals a 40 microsecond ToF, i.e. the range of the target is ≈20,000 ft.

In various embodiments that employ a high scanning frequency, and at medium tracking ranges (>500 feet), a mezzanine ToF method is employed to precisely track the target. The transmitter scans a highly collimated pencil beam, or alternatively a fanned-out beam (See FIGS. 8-9), through the receiver's FoV at a high scanning frequency. For instance, $\Delta\alpha$=10° at a scanning frequency of 25 kHZ. Accordingly, the outgoing light beam scans about 1° per microsecond. The instantaneous azimuth angle of the outgoing light beam is determinable based on position feedback loops in the transmitter's MEMs scanning mirror.

Such embodiments may employ a 1D 1000 SPAD pixel array. Such embodiments include an angular resolution of 1E-2° per pixel. A comparison of correlated outgoing angles and incoming angles (as observed by the receiver), an accurate time of departure (via outgoing timestamp) is determinable. The position feedback within the transmitter and the nanosecond response time of the SPAD array enable extremely accurate and precise outgoing and incoming timestamps to determine the ToF.

Fast-scanning, look-ahead ToF methods may be employed in various embodiments to further decrease system latency. The line of sight, i.e. the incoming azimuth and elevation angles, for each pixel in the receiver has been predetermined and stored in look-up table. Accordingly, in response to an anticipated arrival of a reflected outgoing light beam, at an approximate incoming angle, various parts of the look-up tables may be cached for fast access. These values may be accessed within nanoseconds, upon confirmation of the triggered SPAD pixel. Each receiver pixel is correlated with a previously observed transmitter outgoing time during a scan over the FoV. Thus, pre-calculating the anticipated triangulation values and TOF time intervals, and caching the results in look-up tables, enables the low-latency systems to converge on the precision location when the anticipated results are confirmed.

Such embodiments do not require an offset between the transmitter/receiver pair, i.e, the transmitter may be co-located with the receiver, or an transceiver may be employed. In preferred embodiments, the receiver is co-located on the transmitter's scanning axis of rotation. Such an arrangement enables a precise alignment between the outgoing and incoming angles. For instance, see FIG. 14B.

Solid state scanning optical components (electro-optical beam stearing) enable the precise defining of a phase difference between the receiver and the transmitter's scanning optics, i.e. an angular phase delay between the receiver's elevation scanning component and the receiver's anti-epsilon mirror. Such systems provide precise triangulation and ToF determinations of the target's location. A ultra-fast scanning frequency of 250 kHz across scans across a 20° FoV every 2000 nanoseconds. Employing a high density linear (1D) SPAD array (2000 pixels) results in an azimuth angular resolution of 1E-2°. Each triggered pixel may be temporally correlated (to within a nanosecond of temporal resolution) to the instance when the transmitter was transmitting an outgoing light beam at an outgoing angle that corresponds (based on the target's distance) to the pixel's line-of-sight. Each SPAD pixel may be calibrated, in real-time, to a corresponding outgoing time for the detected beam that was reflected from the target (observed in the last 2000 nanoseconds, i.e. 2000 positions–2000 outgoing pulses/timestamps). Such embodiments enable depth resolution of approximately 1 foot, at a target range up to 1000 feet, and with near zero detection and computational latency.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for tracking a target, comprising:

one or more transmitters that transmit one or more outgoing light beams at one or more outgoing angles towards the target;

one or more receivers that detect one or more incoming light beams at one or more incoming angles, wherein the one or more incoming light beams correspond to the one or more outgoing light beams that are reflected at the target;

a memory device for storing instructions; and a processor device that executes the instructions to enable actions, comprising:

transmitting, by the one or more transmitters, the one or more outgoing light beams at the one or more outgoing angles towards the target;

detecting, by the one or more receivers, the one or more incoming light beams at the one or more incoming angles;

determining a proximate location of the target based on one or more of a location or a velocity of the target;

modifying the one or more outgoing angles based on the proximate location of the target; and determining a precision location of the target based on iteratively determining one or more of a triangulation value for the one or more incoming light beams that correspond to the one or more outgoing light beams transmitting at the one or more modified outgoing angles, a time interval corresponding to a time-of-flight (ToF) of the one or more outgoing light beams transmitting at the one or more modified outgoing angles, or a combination of the triangulation value and the time interval.

2. The system of claim 1, wherein the one or more transmitters include one or more transmitting optical components that scan the one or more outgoing light beams across a range of outgoing azimuth angles and a range of outgoing elevation angles of the one or more outgoing angles;

the one or more receivers include one or more receiving optical components that receive the one or more incoming light beams within a range of incoming elevation angles of the one or more incoming angles and focus the one or more incoming light beams to within a range of focused elevation angles that is less than the range of incoming elevation angles; and a phase difference between the one or more receiving optical components and the one or more transmitting optical components is based on the time interval.

3. The system of claim 1, wherein transmitting the one or more outgoing light beams includes:

transmitting a first outgoing light beam of the one or more outgoing light beams, wherein wavelengths included in the first outgoing light beam are outside of a visible portion of an electromagnetic (EM) spectrum;

determining one or more first incoming angles based on detecting a first incoming light beam of the one or more incoming light beams, wherein the first incoming light beam corresponds to the first outgoing light beam that is reflected at the target; and in response to detecting the first incoming light beam, transmitting a second outgoing light beam of the one or more outgoing light beams, wherein the second outgoing light beam is transmitted at one or more second outgoing angles based on the one or more first incoming angles.

4. The system of claim 1, wherein the one or more transmitters include one or more transmitting optical components that collimate and scan the one or more outgoing light beams in a first direction and fan-out the one or more outgoing light beams in a second direction that is substantially orthogonal to the first direction.

5. The system of claim 1, wherein the actions further comprise:

determining one or more physical dimensions of the target, relative to one or more physical dimensions of a beam spot of the one or more outgoing light beams at the target, based on at least an intensity-temporal profile of the one or more incoming light beams.

6. The system of claim 1, wherein the actions further comprise:

determining a first incoming angle of a first incoming light beam of the one or more incoming light beams, wherein the first incoming light beam is detected at a first detection location;

determining a second incoming angle of a second incoming light beam of the one or more incoming light beams, wherein the second incoming light beam is detected at a second detection location and both the first and the second incoming light beams correspond to a first outgoing light beam of the one or more outgoing light beams that is reflected at the target; and determining the triangulation value based on the first incoming angle, the second incoming angle, and a distance between the first detection location and the second detection location.

7. The system of claim 1, wherein the actions further comprise:

transmitting a first outgoing light beam of the one or more outgoing light beams, wherein the first outgoing light beam is transmitted at a first location;

determining a first incoming angle based on a first incoming light beam of the one or more incoming light beams, wherein the first incoming light beam is detected at a second location and corresponds to the first outgoing light beam that is reflected at the target;

transmitting a second outgoing light beam of the one or more outgoing light beams, wherein the second outgoing light beam is transmitted at the first incoming angle and the second location;

determining a second incoming angle of a second incoming light beam of the one or more incoming light beams, wherein the second incoming light beam is detected at the first location and corresponds to the second outgoing light beam that is reflected at the target; and determining the triangulation value based on the first incoming angle, the second incoming angle, and a distance between the first and the second locations.

8. The system of claim 1, wherein the one or more outgoing light beams are scanned in a Lissajous scanning pattern based on at least one of a proximate distance or a proximate physical dimension of the target.

9. A method for tracking a target, comprising:

transmitting, by one or more transmitters, one or more outgoing light beams at one or more outgoing angles towards the target;

detecting, by one or more receivers, one or more incoming light beams at one or more incoming angles;

determining a proximate location of the target based on one or more of a location or a velocity of the target;

modifying the one or more outgoing angles based on the proximate location of the target; and determining a precision location of the target based on iteratively determining one or more of another triangulation value for the one or more incoming light beams that correspond to the one or more outgoing light beams transmitting at the one or more modified outgoing angles, a time interval corresponding to a time-of-flight (ToF) of the one or more outgoing light beams transmitting at the one or more modified outgoing angles, or a combination of the other triangulation value and the time interval.

10. The method of claim 9, wherein the one or more transmitters include one or more transmitting optical components that scan the one or more outgoing light beams across a range of outgoing azimuth angles and a range of outgoing elevation angles of the one or more outgoing angles;

the one or more receivers include one or more receiving optical components that receive the one or more incoming light beams within a range of incoming elevation angles of the one or more incoming angles and focus the one or more incoming light beams to within a range of focused elevation angles that is less than the range of incoming elevation angles; and a phase difference between the one or more receiving optical components and the one or more transmitting optical components is based on the time interval.

11. The method of claim 9, wherein transmitting the one or more outgoing light beams includes:

transmitting a first outgoing light beam of the one or more outgoing light beams, wherein wavelengths included in the first outgoing light beam are outside of a visible portion of an electromagnetic (EM) spectrum;

determining one or more first incoming angles based on detecting a first incoming light beam of the one or more incoming light beams, wherein the first incoming light beam corresponds to the first outgoing light beam that is reflected at the target; and in response to detecting the first incoming light beam, transmitting a second outgoing light beam of the one or more outgoing light beams, wherein the second outgoing light beam is transmitted at one or more second outgoing angles based on the one or more first incoming angles.

12. The method of claim 9, wherein the one or more transmitters include one or more transmitting optical components that collimate and scan the one or more outgoing light beams in a first direction and fan-out the one or more outgoing light beams in a second direction that is substantially orthogonal to the first direction.

13. The method of claim 9, further comprising:

determining one or more physical dimensions of the target, relative to one or more physical dimensions of a beam spot of the one or more outgoing light beams at the target, based on at least an intensity-temporal profile of the one or more incoming light beams.

14. The method of claim 9, further comprising:

determining a first incoming angle of a first incoming light beam of the one or more incoming light beams, wherein the first incoming light beam is detected at a first detection location;

determining a second incoming angle of a second incoming light beam of the one or more incoming light beams, wherein the second incoming light beam is detected at a second detection location and both the first and the second incoming light beams correspond to a first outgoing light beam of the one or more outgoing light beams that is reflected at the target; and determining the triangulation value based on the first incoming angle, the second incoming angle, and a distance between the first detection location and the second detection location.

15. The method of claim 9, further comprising:

transmitting a first outgoing light beam of the one or more outgoing light beams, wherein the first outgoing light beam is transmitted at a first location;

determining a first incoming angle based on a first incoming light beam of the one or more incoming light beams, wherein the first incoming light beam is detected at a second location and corresponds to the first outgoing light beam that is reflected at the target;

transmitting a second outgoing light beam of the one or more outgoing light beams, wherein the second outgoing light beam is transmitted at the first incoming angle and the second location;

determining a second incoming angle of a second incoming light beam of the one or more incoming light beams, wherein the second incoming light beam is detected at the first location and corresponds to the second outgoing light beam that is reflected at the target; and determining the triangulation value based on the first incoming angle, the second incoming angle, and a distance between the first and the second locations.

16. The method of claim 9, wherein the one or more outgoing light beams are scanned in a Lissajous scanning pattern based on at least one of a proximate distance or a proximate physical dimension of the target.

17. A computer readable non-transitory storage medium that includes instructions for tracking a target, wherein the execution of the instructions by a processor enables actions, comprising:

transmitting, by one or more transmitters, the one or more outgoing light beams at the one or more outgoing angles towards the target;

detecting, by one or more receivers, the one or more incoming light beams at the one or more incoming angles;

determining a proximate location of the target based on one or more of a location or a velocity of the target;

modifying the one or more outgoing angles based on the proximate location of the target; and determining a precision location of the target based on iteratively determining one or more of another triangulation value for the one or more incoming light beams that correspond to the one or more outgoing light beams transmitting at the one or more modified outgoing angles, a time interval corresponding to a time-of-flight (ToF) of the one or more outgoing light beams transmitting at the one or more modified outgoing angles, or a combination of the other triangulation value and the time interval.

18. The medium of claim 17, wherein the one or more transmitters include one or more transmitting optical components that scan the one or more outgoing light beams across a range of outgoing azimuth angles and a range of outgoing elevation angles of the one or more outgoing angles;

the one or more receivers include one or more receiving optical components that receive the one or more incoming light beams within a range of incoming elevation angles of the one or more incoming angles and focus the one or more incoming light beams to within a range of focused elevation angles that is less than the range of incoming elevation angles; and a phase difference between the one or more receiving optical components and the one or more transmitting optical components is based on the time interval.

19. The medium of claim 17, wherein transmitting the one or more outgoing light beams includes:

transmitting a first outgoing light beam of the one or more outgoing light beams, wherein wavelengths included in the first outgoing light beam are outside of a visible portion of an electromagnetic (EM) spectrum;

determining one or more first incoming angles based on detecting a first incoming light beam of the one or more incoming light beams, wherein the first incoming light beam corresponds to the first outgoing light beam that is reflected at the target; and in response to detecting the first incoming light beam, transmitting a second outgoing light beam of the one or more outgoing light beams, wherein the second outgoing light beam is transmitted at one or more second outgoing angles based on the one or more first incoming angles.

20. The medium of claim 17, wherein the one or more transmitters include one or more transmitting optical components that collimate and scan the one or more outgoing light beams in a first direction and fan-out the one or more outgoing light beams in a second direction that is substantially orthogonal to the first direction.

21. The medium of claim 17, the actions further comprising:

determining one or more physical dimensions of the target, relative to one or more physical dimensions of a beam spot of the one or more outgoing light beams at the target, based on at least an intensity-temporal profile of the one or more incoming light beams.

22. The medium of claim 17, the actions further comprising:

determining a first incoming angle of a first incoming light beam of the one or more incoming light beams, wherein the first incoming light beam is detected at a first detection location;

determining a second incoming angle of a second incoming light beam of the one or more incoming light beams, wherein the second incoming light beam is detected at a second detection location and both the first and the second incoming light beams correspond to a first outgoing light beam of the one or more outgoing light beams that is reflected at the target; and determining the triangulation value based on the first incoming angle, the second incoming angle, and a distance between the first detection location and the second detection location.

23. The medium of claim 17, the actions further comprising:

transmitting a first outgoing light beam of the one or more outgoing light beams, wherein the first outgoing light beam is transmitted at a first location;

determining a first incoming angle based on a first incoming light beam of the one or more incoming light beams, wherein the first incoming light beam is detected at a second location and corresponds to the first outgoing light beam that is reflected at the target;

transmitting a second outgoing light beam of the one or more outgoing light beams, wherein the second outgoing light beam is transmitted at the first incoming angle and the second location;

determining a second incoming angle of a second incoming light beam of the one or more incoming light beams, wherein the second incoming light beam is detected at the first location and corresponds to the second outgoing light beam that is reflected at the target; and determining the triangulation value based on the first incoming angle, the second incoming angle, and a distance between the first and the second locations.

24. The medium of claim 17, wherein the one or more outgoing light beams are scanned in a Lissajous scanning pattern based on at least one of a proximate distance or a proximate physical dimension of the target.

* * * * *